United States Patent
Higashi et al.

(10) Patent No.: US 8,454,710 B2
(45) Date of Patent: Jun. 4, 2013

(54) PROCESS FOR PRODUCING AZO COMPOUNDS, PIGMENT DISPERSION, COLORING COMPOSITION, INK FOR INKJET RECORDING, COLORING COMPOSITION FOR COLOR FILTER, AND COLOR FILTER

(75) Inventors: Masahiro Higashi, Shizuoka (JP); Nobuo Seto, Shizuoka (JP); Yoshihiro Jimbo, Shizuoka (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/522,276

(22) PCT Filed: Jan. 14, 2011

(86) PCT No.: PCT/JP2011/051026
§ 371 (c)(1),
(2), (4) Date: Sep. 10, 2012

(87) PCT Pub. No.: WO2011/087147
PCT Pub. Date: Jul. 21, 2011

(65) Prior Publication Data
US 2012/0328984 A1    Dec. 27, 2012

(30) Foreign Application Priority Data
Jan. 15, 2010 (JP) .................... 2010-007533

(51) Int. Cl.
*C09B 67/22* (2006.01)
*C09D 11/02* (2006.01)

(52) U.S. Cl.
USPC ................ 8/637.1; 8/639; 8/690; 106/31.8

(58) Field of Classification Search
USPC ............. 8/637.1, 639, 690; 106/31.8
See application file for complete search history.

(56) References Cited

U.S. PATENT DOCUMENTS

| 5,194,597 A | 3/1993 | Rieper |
| 2006/0229439 A1 * | 10/2006 | Ueno ................ 534/573 |

FOREIGN PATENT DOCUMENTS

| GB | 1336898 | 11/1973 |
| JP | 63-158561 A | 7/1988 |
| JP | 63-218960 A | 9/1988 |
| JP | 4-27959 A | 1/1992 |
| JP | 4-88349 A | 3/1992 |
| JP | 4-227765 A | 8/1992 |
| JP | 10-36692 A | 2/1998 |
| JP | 63-148267 A | 6/1998 |
| JP | 2001-19880 A | 1/2001 |
| JP | 2009-73978 A | 4/2009 |

OTHER PUBLICATIONS

STIC Search Report dated Oct. 12, 2006.*
Written Opinion (PCT/ISA/237) of the International Searching Authority, issued in corresponding International Application No. PCT/JP2011/051026 on Apr. 19, 2011.
International Search Report (PCT/ISA/210), issued by the International Searching Authority in corresponding International Application No. PCT/JP2011/051026 on Apr. 19, 2011.

* cited by examiner

*Primary Examiner* — Eisa Elhilo
(74) *Attorney, Agent, or Firm* — Sughrue Mion, PLLC

(57) ABSTRACT

To provide a process for producing an azo pigment showing excellent coloring characteristics such as tinctorial strength and hue and showing excellent fastness such as light fastness and ozone fastness, an azo pigment dispersion, a coloring composition, and an ink for inkjet recording. process for producing, for example, an azo pigment represented by the general formula (9), which includes a step of preparing a solution containing a compound represented by the following general formula (7) and an acid, and a step of bringing the solution in contact with a diazonium salt (8) derived from a heterocyclic amine,

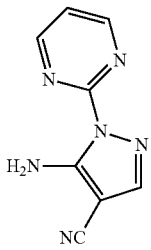
(7)
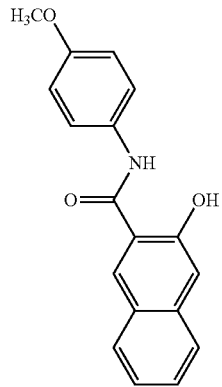
(8)
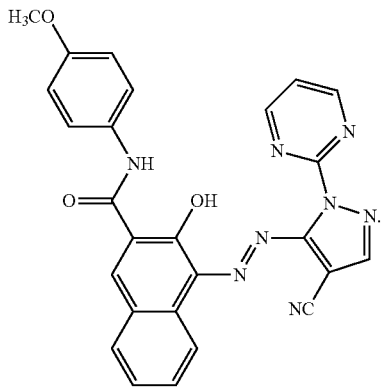
(9)
14 Claims, 3 Drawing Sheets

PROCESS FOR PRODUCING AZO COMPOUNDS, PIGMENT DISPERSION, COLORING COMPOSITION, INK FOR INKJET RECORDING, COLORING COMPOSITION FOR COLOR FILTER, AND COLOR FILTER

TECHNICAL FIELD

The present invention relates to novel nitrogen-containing heterocyclic azo compounds, azo pigments, a pigment dispersion containing the azo pigment, a coloring composition containing the azo pigment, and an ink for inkjet recording containing the azo pigment.

BACKGROUND ART

In recent years, as image-recording materials, materials for forming color images have been predominant and, specifically, recording materials for an inkjet system, recording materials for a thermal transfer system, recording materials for an electro-photographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

Dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics shown in a molecularly dispersed state even when used as particles. Although the required properties described above can be controlled by adjusting the intensity of intermolecular mutual action, both of them are in a trade-off relation with each other, thus being difficult to allow them to be compatible with each other.

Further, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable.

However, since the azo pigment shows different structural isomerization and crystal polymorphism depending upon the production process, and hence it has been difficult to produce an azo pigment having structural isomerization and crystal polymorphism capable of exhibiting desired characteristics with high reproducibility and high purity.

In JP-A-4-227765, a process for producing a yellow pigment by conducting diazo coupling by adding a diazonium salt solution to a suspension of a coupling component or in an aqueous medium at a pH of 7 or less is described.

Also, in JP-A-2009-73978, a process for producing an azo pigment by conducting coupling reaction between a diazonium compound prepared by diazotizing a heterocyclic amine and a heterocyclic amine in the presence of sulfuric acid.

However, there has strongly been desired a process for producing, with high efficiency, a pigment having more purity, showing good hue, having high tinctorial strength (coloring power), and having high fastness against light, moist heat, and active gases in the environment.

SUMMARY OF INVENTION

An object of the present invention is to provide a process for producing azo pigments having excellent coloring characteristics such as tinctorial strength and hue and excellent fastness such as light fastness and ozone fastness, an azo pigment dispersion, a coloring composition, and an ink for inkjet recording.

Another object of the invention is to provide a coloring composition for a color filter which composition has good hue, exhibits good light fastness, heat fastness, and ozone fastness, shows good dispersibility, and can provide a color filter having high transparency, excellent spectral properties, excellent contrast, and excellent dispersion stability with time; and a process for preparing the coloring composition for a color filter.

A further object of the invention is to provide a color filter having high transparency, excellent spectral properties, and excellent contrast, which is obtained by using the above-described coloring composition for a color filter.

As a result of intensive investigations, the inventors have found a production process for obtaining specific nitrogen-containing, heterocyclic azo pigments showing a good hue and exhibits good light fastness, heat fastness, and ozone fastness with good reproducibility and high efficiency by conducting azo coupling in the presence of an acid while controlling polymorphism.

Specific means will be described below.

[1] A method for producing an azo pigment represented by the general formula (1), having: preparing a solution comprising a compound represented by the following general formula (2) and an acid; and conducting azo coupling by bringing the solution into contact with a diazonium salt derived from a heterocyclic amine.

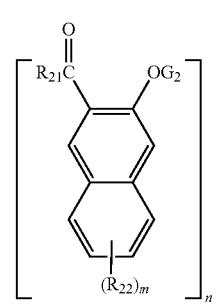

(2)

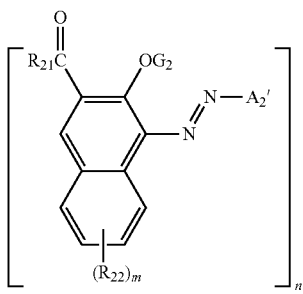

(1)

In formula (1), $G_2$ represents a hydrogen atom, an aliphatic group, an aryl group, or a heterocyclic group; $R_{21}$ represents an amino group, an aliphatic oxy group, an aliphatic group, an aryl group, or a heterocyclic group; $R_{22}$ represents a substituent; $A_2'$ represents the following general formulae (A-1) to (A-18), (A-20) to (A-28), and (A-30) to (A-32); m represents an integer of from 0 to 5; n represents an integer of from 1 to 4; when n=2, the general formulae (1) and (2) each represents a dimer formed through $R_{21}$, $R_{22}$, $G_2$, or $A_2'$; when n=3, each of the general formulae represents a trimer formed through $R_{21}$, $R_{22}$, $G_2$, or $A_2'$; and when n=4, each of the general formulae represents a tetramer formed through $R_{21}$, $R_{22}$, $G_2$, or $A_2'$.

(A-1)

(A-2)

(A-3)

(A-4)

(A-5)

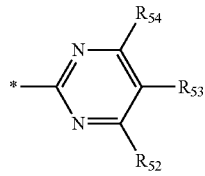 (A-6)

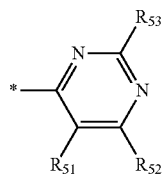 (A-7)

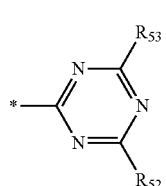 (A-8)

(A-9)

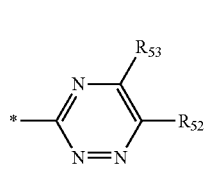 (A-10)

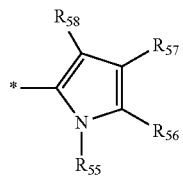 (A-11)

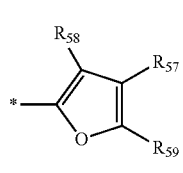 (A-12)

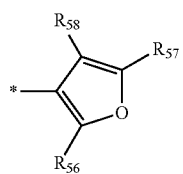 (A-13)

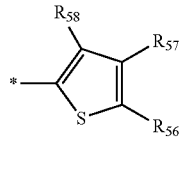 (A-14)

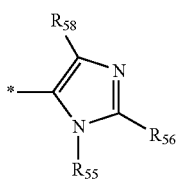 (A-15)

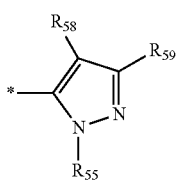 (A-16)

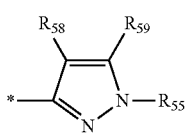 (A-17)

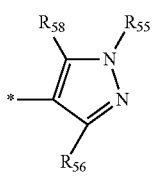 (A-18)

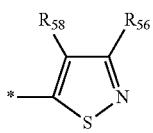 (A-20)

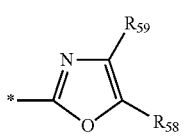 (A-21)

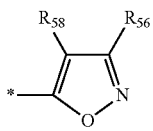 (A-22)

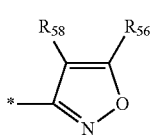 (A-23)

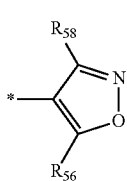 (A-24)

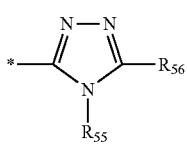 (A-25)

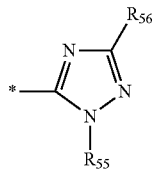 (A-26)

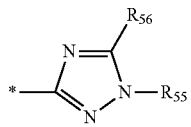 (A-27)

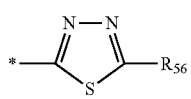 (A-28)

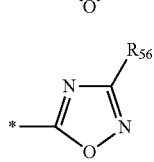 (A-30)

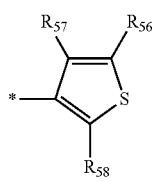 (A-31)

(A-32)

In formulae (A-1)-(A-18), (A-20)-(A-28), (A-30)-(A-32), $R_{51}$ to $R_{59}$ each represents a hydrogen atom or a substituent, and adjacent substituents may be connected to each other to form a 5- or 6-membered ring; and * shows a site connected to the azo group in the general formula (1).

[2] The method for producing an azo pigment according to [1], wherein the compound represented by the formula (1) is a compound represented by the following general formula (1-0).

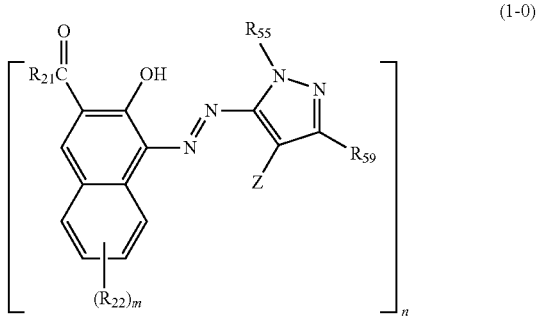 (1-0)

In formula (1-0), $R_{21}$ represents an amino group, an aliphatic oxy group, an aliphatic group, an aryl group, or a heterocyclic group; $R_{22}$ represents a substituent; m represents an integer of from 0 to 5; Z represents an electron-withdrawing group having a Hammett σp value of 0.2 or more; $R_{55}$ and $R_{59}$ each represents a hydrogen atom or a substituent; n represents an integer of from 1 to 4; when n=2, the general formula (1-0) represents a dimer formed through $R_{21}$, $R_{22}$, $R_{55}$, $R_{59}$, or Z; when n=3, the general formula represents a trimer formed through $R_{21}$, $R_{22}$, $R_{55}$, $R_{59}$, or Z; and when n=4, the general formula represents a tetramer formed through $R_{21}$, $R_{22}$, $R_{55}$, $R_{59}$, or Z.

[3] The method for producing an azo pigment according to [1], wherein the diazonium salt derived from the heterocyclic amine is a compound represented by the following formula (7), the compound represented by the general formula (2) is a compound represented by the following formula (8), and the compound represented by the general formula (1) is a compound represented by the following formula (9).

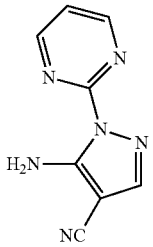

(7)

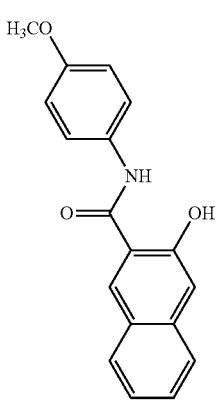

(8)

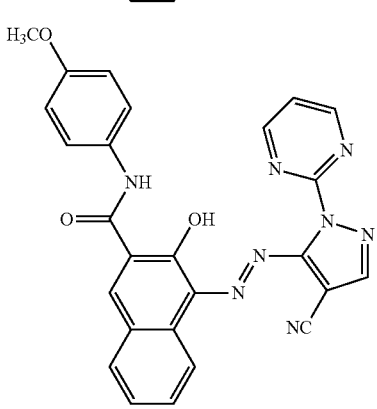

(9)

[4] The method for producing an azo pigment according to [3], wherein the azo pigment represented by the general formula (9) has characteristic peaks at Bragg angles (2θ±0.5°) of 7.1°, 25.3°, 26.0°, and 27.2 in X-ray diffraction with characteristic Cu Kα line.

[5] The method for producing an azo pigment according to any one of [1] to [3], wherein the solution containing a compound represented by the general formula (2) and an acid, further contains a compound represented by the general formula (3a).

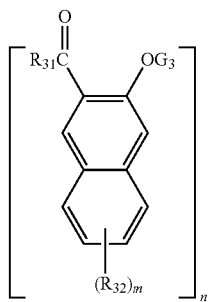

(3a)

In formula (3a), $G_3$ represents a hydrogen atom, an aliphatic group, an aryl group, or a heterocyclic group; $R_{31}$ represents an amino group, an aliphatic oxy group, an aliphatic group, an aryl group, or a heterocyclic group; $R_{32}$ represents a substituent; m represents an integer of from 0 to 5; n represents an integer of from 1 to 4; when n=2, the general formula (3a) represents a dimer formed through $R_{31}$, $R_{32}$, or $G_3$; when n=3, the general formula represents a trimer formed through $R_{31}$, $R_{32}$, or $G_3$; and when n=4, the general formula represents a tetramer formed through $R_{31}$, $R_{32}$, or $G_3$.

[6] The method for producing an azo pigment according to [5], wherein the compound represented by the general formula (3a) is a compound represented by the general formula (3b).

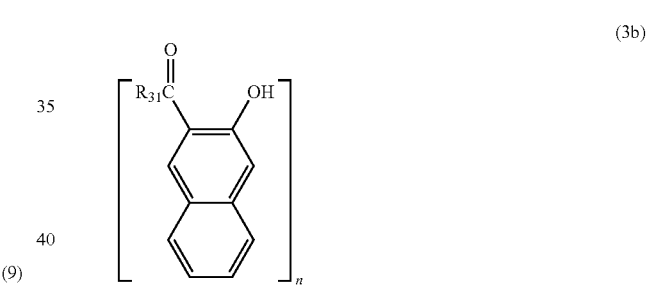

(3b)

In formula (3b), $R_{31}$ represents an amino group, an aliphatic oxy group, an aliphatic group, an aryl group, or a heterocyclic group; n represents an integer of from 1 to 4; when n=2, the general formula (3b) represents a dimer formed through $R_{31}$; when n=3, the general formula represents a trimer formed through $R_{31}$; and when n=4, the general formula represents a tetramer formed through $R_{31}$.

[7] The method for producing an azo pigment according to [5] or [6], wherein the content of the compound represented by the general formula (3a) or (3b) is from 1% by weight to 30% by weight, based on the weight of the compound represented by the general formula (2).

[8] The method for producing an azo pigment according to any one of [1] to [7], wherein the acid is at least one member selected from among phosphoric acid, acetic acid, methanesulfonic acid, and sulfuric acid.

[9] A pigment dispersion containing an azo pigment according to any one of [1] to [8] or the tautomer thereof.

[10] A coloring composition containing a pigment dispersion according to [9].

[11] An ink for inkjet recording containing the coloring composition according to [10].

[12] A coloring composition for color filter containing the coloring composition according to [10].

[13] A color filter produced by using the coloring composition for color filter according to [12].

The process of the present invention can produce azo pigments having excellent coloring characteristics such as high tinctorial strength and hue, and have excellent fastness, such as light fastness, ozone fastness, and heat fastness.

The azo pigments produced by the production process of the invention have excellent coloring characteristics such as high tinctorial strength and hue, and have excellent fastness, such as light fastness, ozone fastness, and heat fastness.

Further, the pigment dispersion of the invention contains the azo pigment produced by the production process of the invention dispersed in various media, and show excellent coloring characteristics, excellent fastness, excellent ink liquid stability, and excellent dispersion stability.

Also, according to the invention, there can be provided a coloring composition for use in a color filter capable of providing high contrast and excellent transparency required for color liquid crystal displays in various applications and for camera modules, which composition has good dispersibility, good dispersion stability with time, excellent heat fastness, and excellent light fastness; a color filter; and a process for its preparation.

DESCRIPTION OF EMBODIMENTS

Figure 1:
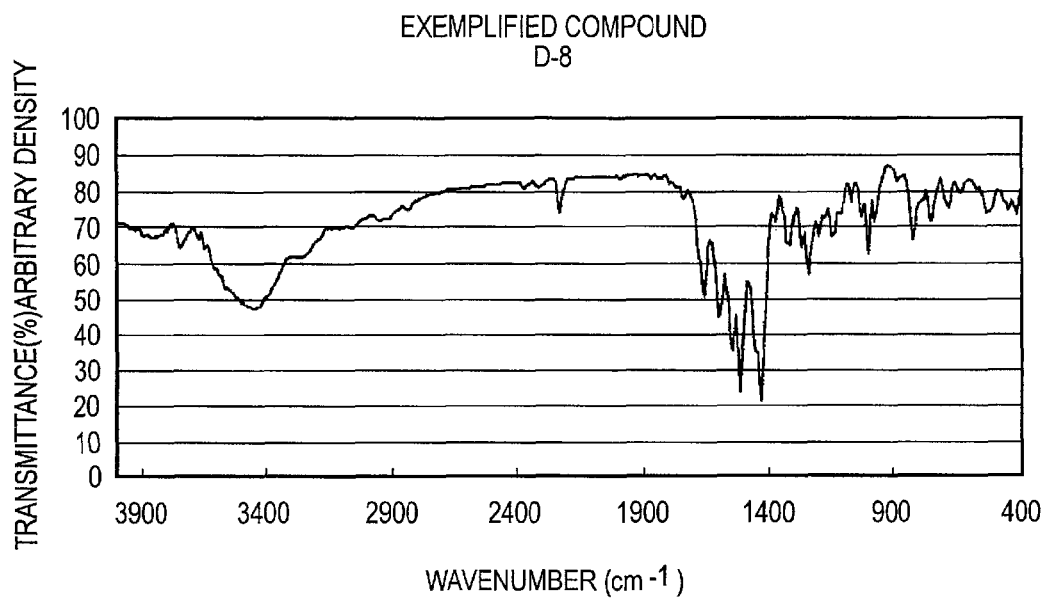
FIG. 1 is an infrared absorption spectrum of a specific illustrative compound D-8 synthesized according to Synthesis Example 1.
Figure 2:
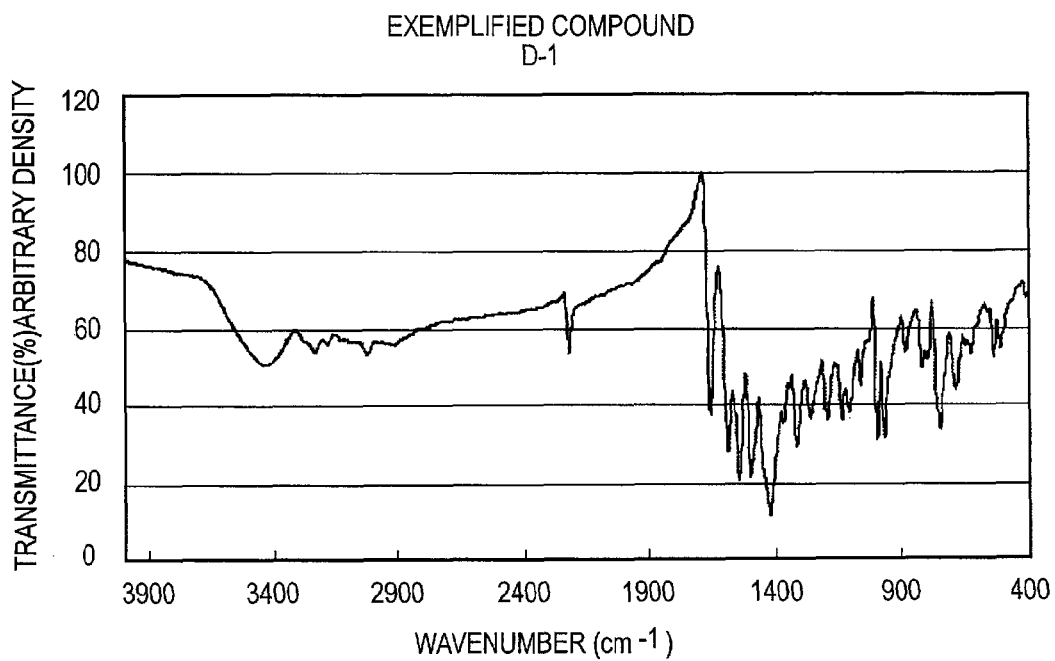
FIG. 2 is an infrared absorption spectrum of a specific illustrative compound D-1.
Figure 3:
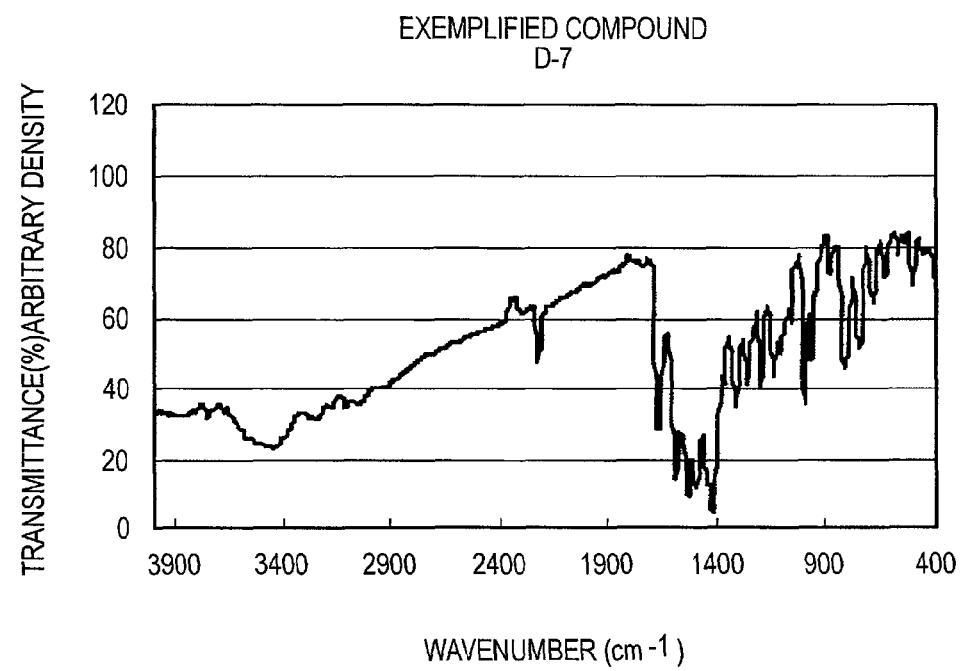
FIG. 3 is an infrared absorption spectrum of a specific illustrative compound D-7.
Figure 4:
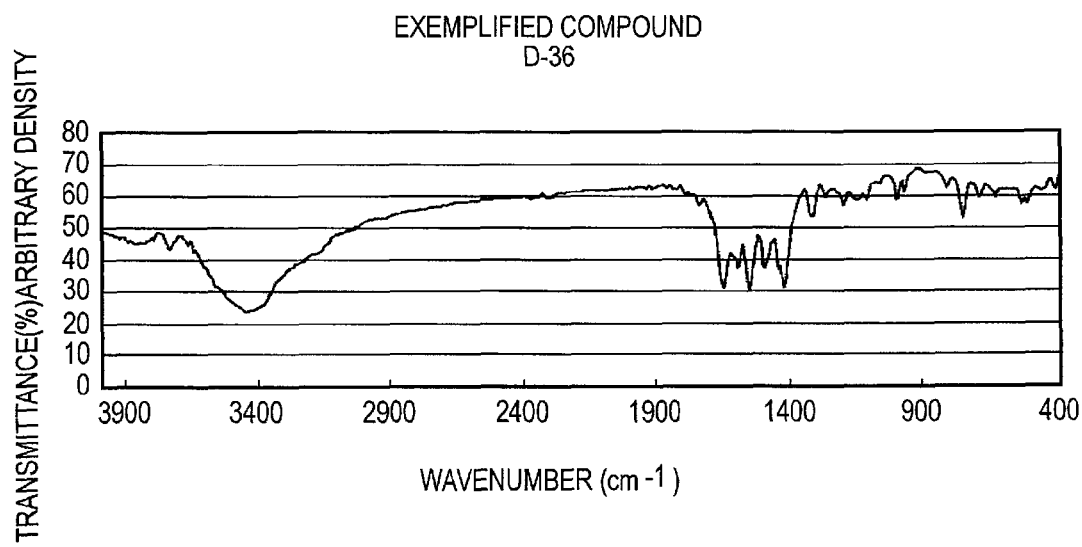
FIG. 4 is an infrared absorption spectrum of a specific illustrative compound D-36.
Figure 5:
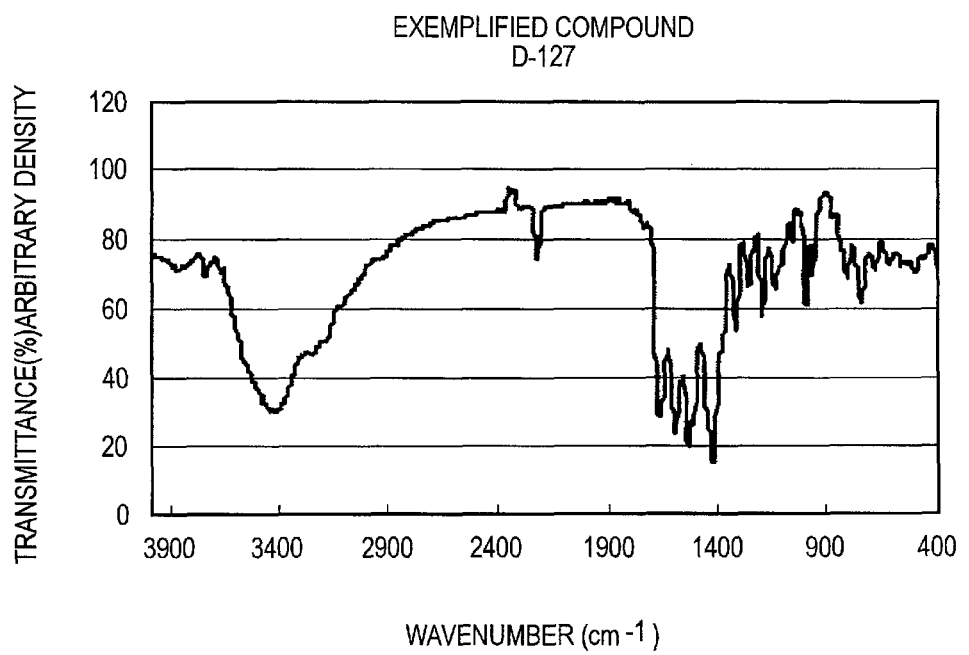
FIG. 5 is an infrared absorption spectrum of a specific illustrative compound D-127.
Figure 6:
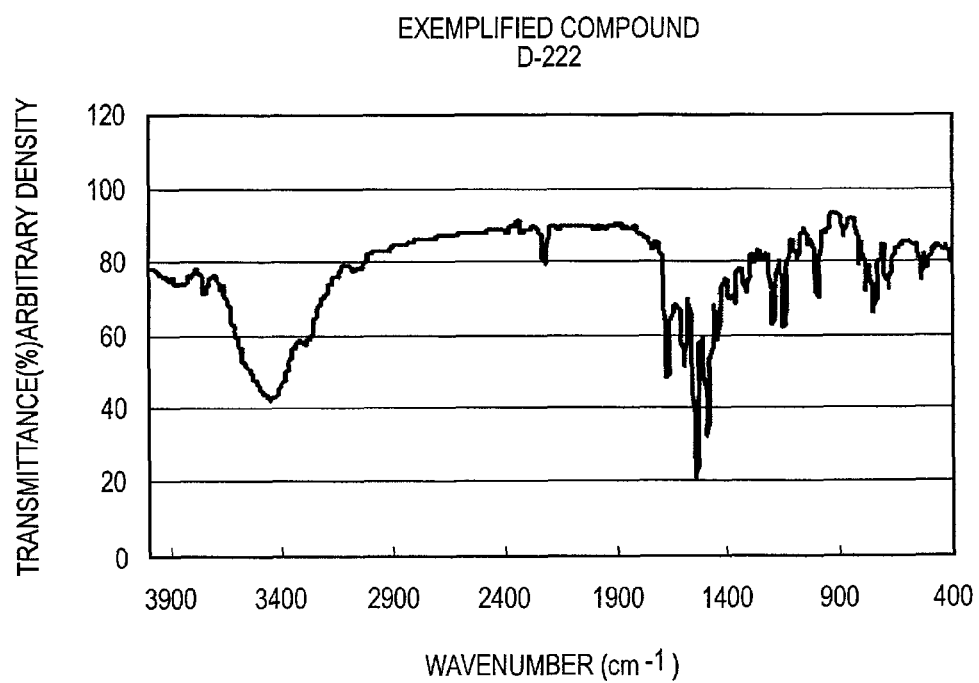
FIG. 6 is an infrared absorption spectrum of a specific illustrative compound D-222.

First, the terms "aliphatic group", "aryl group", "acyl group", "heterocyclic group", and "substituent" as used in the present invention will be described below.

In the aliphatic group in the invention, the aliphatic moiety thereof may be straight, branched, or cyclic, and may be saturated or unsaturated. Specifically, there can be illustrated an alkyl group, an alkenyl group, a cycloalkyl group, and a cycloalkenyl group. Further, the aliphatic group may be unsubstituted or may have a substituent.

Also, the aryl group may be a monocyclic group or a condensed ring group, and may be unsubstituted or may have a substituent. Also, with the heterocyclic group, the heterocyclic moiety may be any ring that contains a hetero atom (e.g., a nitrogen atom, a sulfur atom, or an oxygen atom) in the ring, and may be a saturated ring or an unsaturated ring. Also, the ring may be a monocyclic ring or a condensed ring, and may be unsubstituted or may have a substituent.

The acyl group may be an aliphatic carbonyl group, an arylcarbonyl group, or a heterocyclic carbonyl group, and may have a substituent. As the substituent which the acyl group may have, any substitutable group that will be described in the following paragraph on substituents may be employed. For example, there are illustrated acetyl, propanoyl, benzoyl, and 3-pyridinecarbonyl.

Also, the substituent in the invention means any substitutable group, and examples thereof include an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxycarbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamido group, an arylsulfonamido group, a heterocyclic sulfonamido group, an amino group, an aliphatic amino group, an arylamino group, a heterocyclic amino group, an aliphatic oxycarbonylamino group, an aryloxycarbonylamino group, a heterocyclic oxycarbonylamino group, an aliphatic sulfinyl group, an arylsulfinyl group, an aliphatic thio group, an arylthio group, a hydroxyl group, a cyano group, a sulfo group, a carboxyl group, an aliphatic oxyamino group, an aryloxyamino group, a carbamoylamino group, a sulfamoylamino group, a nitro group, a halogen atom, a sulfamoylcarbamoyl group, a carbamoylsulfamoyl group, a dialiphatic oxyphosphinyl group, and a diaryloxyphosphinyl group.

In view of solubility, the azo pigment of the invention preferably does not contain an ionic hydrophilic group (e.g., a carboxyl group, a sulfo group, a phosphono group, or a quaternary ammonium group) as a substituent. In the case where it contains an ionic hydrophilic group, it is preferably a salt with a multi-valent metal cation (for example, magnesium ion, calcium ion, or barium ion), and is more preferably a lake pigment.

A Hammett substituent constant σp to be used in this specification is briefly explained below.

The Hammett's rule is an empirical rule advocated by L. P. Hammett in 1935 in an attempt to quantitatively discuss the influences of a substituent of a benzene derivative on the reaction or equilibrium, and the validity thereof has been widely accepted nowadays. Substituent constants obtained by the Hammett's rule include σp and σm values. These values are found in a number of general books. The details are given in, for example, J. A. Dean (ed.), *Lange's Handbook of Chemistry*, the 12th Ed., MacGraw-Hill, 1979 and *Kagakuno Ryoiki*, Extra No. 122, Nankodo, 1979, 96-103. While substituents are described in the invention by reference to their Hammett substituent constants σp, it is needless to say that such description applies to not only the substituents whose Hammett substituent constants σp are known from the literature but those whose Hammett substituent constants σp are unknown from the literature but are to fall within a range when determined in accordance with the Hammett's rule. Although compounds of the invention represented by the general formula (1) are not benzene derivatives, σp values are referred to as a measure of the electron effect of their substituents irrespective of the position of substitution. In the invention, the σp value will be used in this sense.

<Process for Producing an Azo Pigment Represented by the General Formula (1)>

The production process of the invention is a process for producing an azo pigment represented by the general formula (1), which is characterized by including a step of preparing a solution containing a compound represented by the following general formula (2) and an acid, and a step of conducting azo coupling between the aforesaid solution and a diazonium salt derived from a heterocyclic amine.

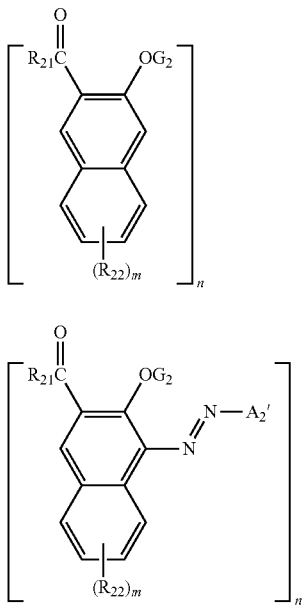

In the general formula (1) and the general formula (2), $G_2$ represents a hydrogen atom, an aliphatic group, an aryl group, or a heterocyclic group; $R_{21}$ represents an amino group, an aliphatic oxy group, an aliphatic group, an aryl group, or a heterocyclic group; and $R_{22}$ represents a substituent. $A_2'$ represents the following general formulae (A-1) to (A-18), (A-20) to (A-28), and (A-30) to (A-32). m represents an integer of from 0 to 5, and n represents an integer of from 1 to 4. When n=2, the general formulae (1) and (2) each represents a dimer formed through $R_{21}$, $R_{22}$, $G_2$, or $A_2'$. When n=3, each of the general formulae represents a trimer formed through $R_{21}$, $R_{22}$, $G_2$, or $A_2'$. When n=4, each of the general formulae represents a tetramer formed through $R_{21}$, $R_{22}$, $G_2$, or $A_2'$.

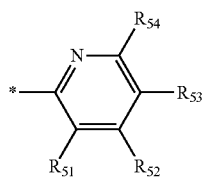

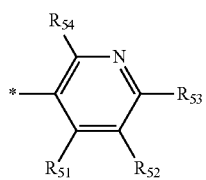

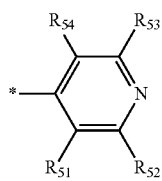

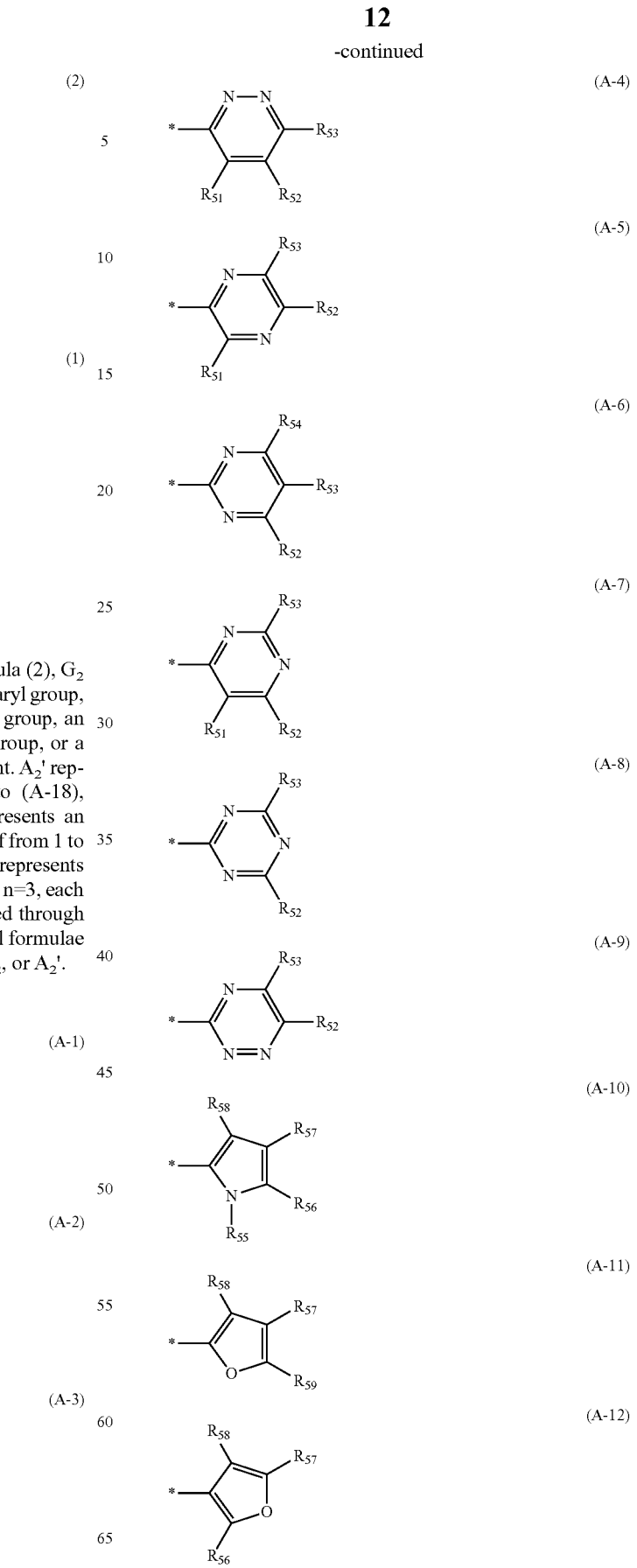

-continued (A-13) 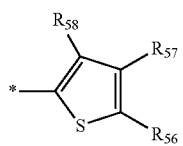

(A-14) 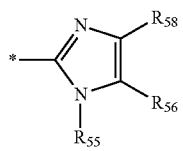

(A-15) 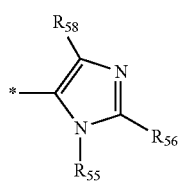

(A-16) 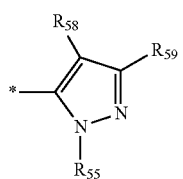

(A-17) 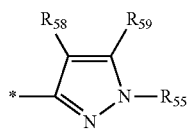

(A-18) 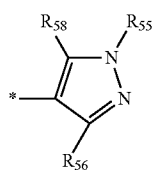

(A-20) 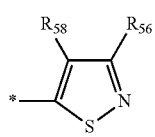

(A-21) 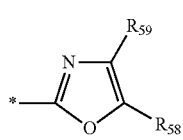

(A-22) 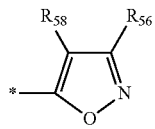

(A-23) 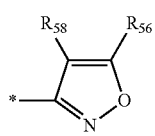

-continued (A-24) 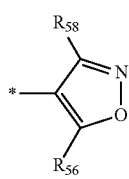

(A-25) 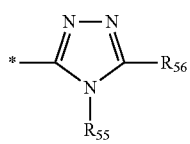

(A-26) 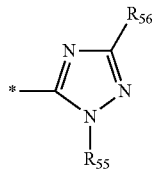

(A-27) 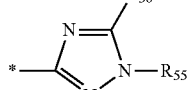

(A-28) 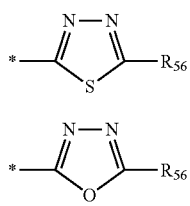

(A-30) 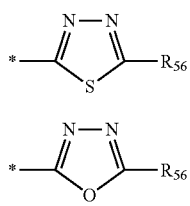

(A-31) 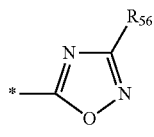

(A-32) 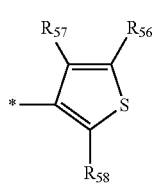

In the general formulae (A-1) to (A-18), (A-20) to (A-28), and (A-30) to (A-32), $R_{51}$ to $R_{59}$ each represents a hydrogen atom or a substituent, and adjacent substituents may be connected to each other to form a 5- or 6-membered ring. * shows the site connected to the azo group in the general formula (1).

Azo pigments produced by the production process of the invention will be described below.

<Azo Pigments>

Pigments are in a state wherein molecules constituting them are strongly connected to each other through aggregation energy produced by strong mutual action between pigment molecules. In order to realize this state, van der Waals force and intermolecular hydrogen bond are necessary as described in, for example, *The Imaging Society of Japan*, vol. 43, p. 10 (2004).

In order to increase the intermolecular van der Waals force, introduction of an aromatic group, a polar group and/or a hetero atom to a molecule may be considered. Also, in order to form intermolecular hydrogen bond, introduction of a substituent which contains a hydrogen atom connected to a hetero atom and/or introduction of an electron donative substituent into the molecule may be considered. Further, polarity of the entire molecule may preferably be considered to be higher. For these purposes, with a chain group such as an alkyl group, a shorter group may be considered to be preferred and, with respect to the value of molecular weight/azo group, a smaller value may be considered to be preferred.

From these standpoints, pigment particles preferably contain an amido bond, a sulfonamido bond, an ether bond, a sulfo group, an oxycarbonyl group, an imido group, a carbamoylamino group, a heterocyclic ring, a benzene ring, or the like.

The compounds produced by the production process of the invention and represented by the general formula (1) are liable to produce intermolecular mutual action between colorant molecules due to the unique structure thereof, and show a low solubility for water or for an organic solvent, thus being usable as azo pigments.

As is different from dyes which are used by dissolving in water or in an organic solvent in a molecular dispersion state, pigments are used by finely dispersing in a solvent as solid particles such as molecular aggregates.

Also, the pigments can show excellent coloring characteristics such as tinctorial strength and hue and excellent fastness such as light fastness and ozone fastness based on the particular structure represented by the following general formula (1).

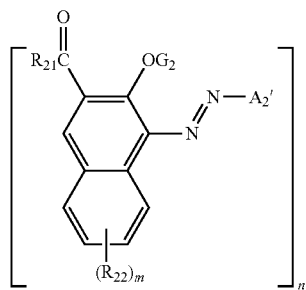
(1)

In the general formula (1), $G_2$ represents a hydrogen atom, an aliphatic group, an aryl group, or a heterocyclic group; $R_{21}$ represents an amino group, an aliphatic oxy group, an aliphatic group, an aryl group, or a heterocyclic group; and $R_{22}$ represents a substituent. $A_2'$ represents the following general formulae (A-1) to (A-18), (A-20) to (A-28), and (A-30) to (A-32). m represents an integer of from 0 to 5, and n represents an integer of from 1 to 4. When n=2, the general formula (1) represents a dimer formed through $R_{21}$, $R_{22}$, $G_2$, or $A_2'$. When n=3, the general formula represents a trimer formed through $R_{21}$, $R_{22}$, $G_2$, or $A_2'$. When n=4, the general formula represents a tetramer formed through $R_{21}$, $R_{22}$, $G_2$, or $A_2'$.

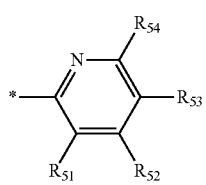
(A-1)

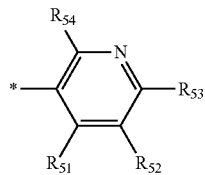
(A-2)

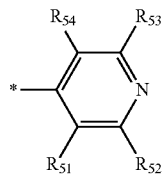
(A-3)

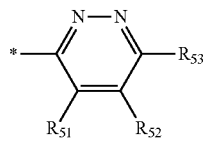
(A-4)

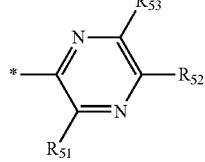
(A-5)

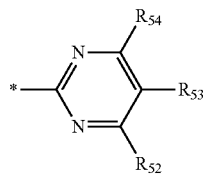
(A-6)

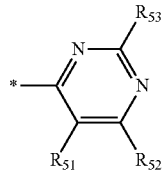
(A-7)

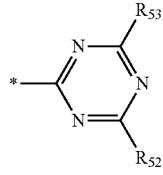
(A-8)

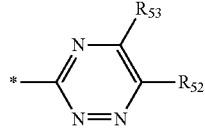
(A-9)

(A-10)

-continued
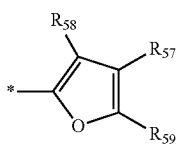 (A-11)
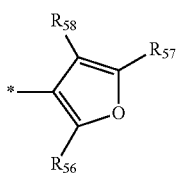 (A-12)
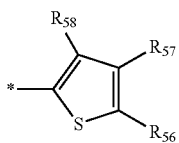 (A-13)
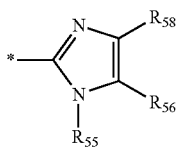 (A-14)
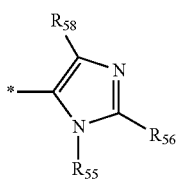 (A-15)
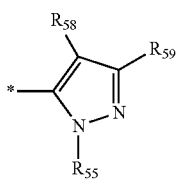 (A-16)
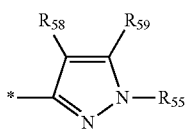 (A-17)
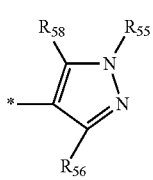 (A-18)
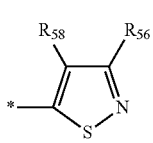 (A-20)
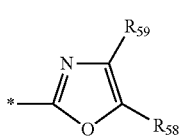 (A-21)
-continued
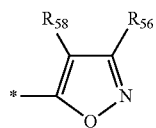 (A-22)
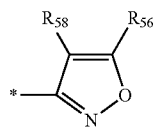 (A-23)
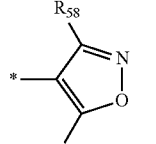 (A-24)
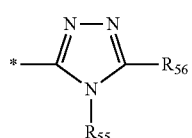 (A-25)
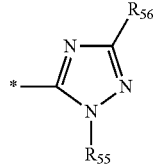 (A-26)
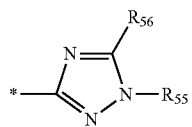 (A-27)
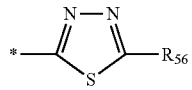 (A-28)
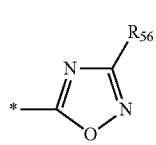 (A-30)
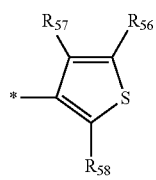 (A-31)
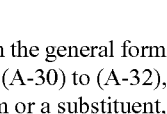 (A-32)
In the general formulae (A-1) to (A-18), (A-20) to (A-28), and (A-30) to (A-32), $R_{51}$ to $R_{59}$ each represents a hydrogen atom or a substituent, and adjacent substituents may be connected to each other so as to form a 5- or 6-membered ring. * shows the site connected to the azo group in the general formula (1).

The aliphatic group represented by $G_2$ may have a substituent, and may be saturated or unsaturated. As a group which may be the substituent, any group that has been described hereinbefore in the aforesaid paragraph on substituents and that is substitutable may be employed, and preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. As the aliphatic group represented by $G_2$, an aliphatic group containing a total of from 1 to 8 carbon atoms is preferred, and an alkyl group containing a total of from 1 to 4 carbon atoms is more preferred. Examples thereof include methyl, ethyl, vinyl, cyclohexyl, and carbamoylmethyl.

The aryl group represented by $G_2$ may be a condensed ring, and may have a substituent. As a group which may be the substituent, any group that has been described hereinbefore in the aforesaid paragraph on substituents and that is substitutable may be employed, and preferred substituents are a nitro group, a halogen atom, an aliphatic oxy group, a carbamoyl group, an aliphatic oxycarbonyl group, an aliphatic thio group, an amino group, an aliphatic amino group, an acylamino group, and a carbamoylamino group. As the aryl group represented by $G_2$, an aryl group containing a total of from 6 to 12 carbon atoms is preferred, and an aryl group containing a total of from 6 to 10 carbon atoms is more preferred. Examples thereof include phenyl, 4-nitrophenyl, 4-acetylaminophenyl, and 4-methanesulfonylphenyl.

The heterocyclic group represented by $G_2$ may have a substituent, may be saturated or unsaturated, and may be a condensed ring. As a group which may be the substituent, any group that has been described hereinbefore in the aforesaid paragraph on substituents and that is substitutable may be employed, and preferred substituents are a halogen atom, a hydroxyl group, an aliphatic oxy group, a carbamoyl group, an aliphatic oxycarbonyl group, an aliphatic thio group, an amino group, an aliphatic amino group, an acylamino group, and a carbamoylamino group. The heterocyclic group represented by $G_2$ is preferably a heterocyclic group containing a total of from 2 to 12 carbon atoms and being connected at a carbon atom, more preferably a 5- or 6-membered heterocyclic group containing a total of from 2 to 10 carbon atoms and being connected at a carbon atom. Examples thereof include 2-tetrahydrofuryl and 2-pyrimidyl.

$G_2$ is preferably a hydrogen atom, an aliphatic group, an aryl group, or a heterocyclic group, more preferably a hydrogen atom. Because, an intramolecular hydrogen bond or an intramolecular cross hydrogen bond is easily formed.

The amino group represented by $R_{21}$ may have a substituent. As a group which may be the substituent, any group that has been described hereinbefore in the aforesaid paragraph on substituents and that is substitutable may be employed, and preferred substituents are an aliphatic group, an aryl group, and a heterocyclic group.

These substituents may further have a substituent and, as such substituent, an aliphatic group, a hydroxyl group, and a substituent having, for example, an amido bond, an ether bond, an oxycarbonyl bond or a thioether bond are preferred, with substituents having a bond between a hetero atom and a hydrogen atom being more preferred in the point that they facilitate intramolecular mutual action such as intramolecular hydrogen bonding.

The amino group which is represented by $R_{21}$ and which may have a substituent is preferably an unsubstituted amino group, an alkylamino group containing a total of from 1 to 10 carbon atoms, a dialkylamino group containing a total of from 2 to 10 carbon atoms, an arylamino group containing a total of from 6 to 13 carbon atoms, or a saturated or unsaturated heterocyclic amino group containing a total of from 2 to 12 carbon atoms, more preferably an unsubstituted amino group, an alkylamino group containing a total of from 1 to 8 carbon atoms, an arylamino group containing a total of from 6 to 13 carbon atoms, or a saturated or unsaturated heterocyclic amino group containing a total of from 2 to 12 carbon atoms. Examples thereof include methylamino, N,N-dimethylamino, N-phenylamino, and N-(2-pyrimidyl)amino.

More preferred are an arylamino group optionally having a substituent and containing a total of from 6 to 13 carbon atoms, and a saturated or unsaturated heterocyclic amino group optionally having a substituent and containing a total of from 2 to 12 carbon atoms.

The aliphatic oxy group represented by $R_{21}$ may have a substituent and may be saturated or unsaturated. As the substituent, any group that has been described hereinbefore in the aforesaid paragraph on substituents and that is substitutable may be employed, and preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. As the aliphatic oxy group of $R_{21}$, an alkoxy group containing a total of from 1 to 8 carbon atoms is preferred, an alkoxy group containing a total of from 1 to 4 carbon atoms is more preferred, and an alkoxy group containing a total of 1 or 2 is still more preferred. Examples thereof include methoxy, ethoxy, (t)-butoxy, methoxyethoxy, and carbamoylmethoxy.

The aliphatic group represented by $R_{21}$ may have a substituent and may be saturated or unsaturated. As the substituent, any group that has been described hereinbefore in the aforesaid paragraph on substituents and that is substitutable may be employed, and preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. As the aliphatic group of $R_{21}$, an alkyl group containing a total of from 1 to 8 carbon atoms is preferred, and an alkyl group containing a total of from 1 to 4 carbon atoms is more preferred. Examples thereof include methyl, ethyl, (s)-butyl, methoxyethyl, and carbamoylmethyl.

The aryl group represented by $R_{21}$ may have a substituent. As the substituent, any group that has been described hereinbefore in the aforesaid paragraph on substituents and that is substitutable may be employed, and preferred substituents are an aliphatic group, an aliphatic oxy group, a halogen atom, a carbamoyl group, a heterocyclic group condensed with the aryl group, and an aliphatic oxycarbonyl group. The aryl group of $R_{21}$ is preferably an aryl group containing a total of from 6 to 12 carbon atoms, more preferably an aryl group containing a total of from 6 to 10 carbon atoms. Examples thereof include phenyl, 4-methylphenyl, and 3-chlorophenyl.

The heterocyclic group represented by $R_{21}$ may be a saturated heterocyclic group or an unsaturated heterocyclic group, may have a substituent, and may be condensed with other ring. As the substituent, any group that has been described hereinbefore in the aforesaid paragraph on substituents and that is substitutable may be employed, and preferred substituents are an aliphatic group, an aliphatic oxy group, a carbamoyl group, a heterocyclic group condensed with the heterocyclic group, and an aliphatic oxycarbonyl group. The heterocyclic group represented by $R_{21}$ is preferably a heterocyclic group containing a total of from 2 to 10 carbon atoms, more preferably a saturated heterocyclic group containing a total of from 2 to 8 carbon atoms and being connected through a nitrogen atom. Examples thereof include 1-piperidyl, 4-morpholinyl, 2-pyrimidyl, and 4-pyridyl.

$R_{21}$ is preferably an amino group which may have a substituent, an aliphatic oxy group, or a saturated heterocyclic group connected through a nitrogen atom, more preferably an amino group which may have a substituent or an aliphatic oxy group, still more preferably an amino group which may have a substituent.

The substituent represented by $R_{22}$ may be any group that has been described hereinbefore in the aforesaid paragraph on substituents and that is substitutable may be employed, and preferred substituents are an aliphatic group, an aryl group, a heterocyclic group, an aliphatic oxycarbonyl group, a carboxyl group, a carbamoyl group which may have a substituent, an acylamino group, a sulfonamido group, a carbamoylamino group which may have a substituent, a sulfamoyl group which may have a substituent, an aliphatic oxy group, an aliphatic thio group, a cyano group, a halogen atom, and a hydroxyl group, more preferred substituents are an aliphatic oxycarbonyl group, a carbamoyl group which may have a substituent, an acylamino group, a carbamoyl group which may have a substituent, an aliphatic oxy group, and a halogen atom, with an aliphatic oxy group being most preferred.

In the case where these substituents further have a substituent, an aliphatic group, a hydroxyl group, and a substituent having, for example, an amido bond, an ether bond, an oxycarbonyl bond or a thioether bond are preferred, with substituents having a bond between a hetero atom and a hydrogen atom being more preferred in the point that they facilitate intramolecular mutual action such as intramolecular hydrogen bonding.

The aliphatic group represented by $R_{22}$ may have a substituent, and may be saturated or unsaturated and, as a group which may be the substituent, any group that has been described hereinbefore as a substituent and that is substitutable may be employed. The aliphatic group of $R_{22}$ is preferably an alkyl group containing a total of from 1 to 8 carbon atoms, more preferably an alkyl group containing a total of from 1 to 6 carbon atoms, and examples thereof include methyl, ethyl, i-propyl, cyclohexyl, and t-butyl.

The aryl group represented by $R_{22}$ may have a substituent and, as a group which may be the substituent, any group that has been described hereinbefore as a substituent and that is substitutable may be employed. The aryl group of $R_{22}$ is preferably an aryl group containing a total of from 6 to 12 carbon atoms, more preferably an aryl group containing a total of from 6 to 10 carbon atoms, and examples thereof include phenyl, 3-methoxyphenyl, and 4-carbamoylphenyl.

The heterocyclic group represented by $R_{22}$ may have a substituent and may be saturated or unsaturated or condensed with other ring. As a group which may be the substituent, any group that has been described hereinbefore as a substituent and that is substitutable may be employed. The heterocyclic group of $R_{22}$ is preferably a heterocyclic group containing a total of from 2 to 16 carbon atoms, more preferably a 5- or 6-membered heterocyclic ring containing a total of from 2 to 12 carbon atoms. Examples thereof include 1-pyrrolidinyl, 4-morpholinyl, 2-pyridyl, 1-pyrrolyl, 1-imidazolyl, and 1-benzimidazolyl.

The aliphatic oxycarbonyl group represented by $R_{22}$ may have a substituent and may be saturated or unsaturated or condensed with other ring. As a group which may be the substituent, any group that has been described hereinbefore as a substituent and that is substitutable may be employed. The aliphatic oxycarbonyl group of $R_{22}$ is preferably an alkoxycarbonyl group containing a total of from 1 to 8 carbon atoms, more preferably an alkoxycarbonyl group containing a total of from 1 to 6 carbon atoms. Examples thereof include methoxycarbonyl, i-propyloxycarbonyl, and carbamoylmethoxycarbonyl.

The carbamoyl group represented by $R_{22}$ may have a substituent and, as a group which may be the substituent, any group that has been described hereinbefore as a substituent and that is substitutable may be employed. The substituent is preferably an aliphatic group, an aryl group, a heterocyclic group, etc. The carbamoyl group of $R_{22}$ which may have a substituent is preferably a carbamoyl group, an alkylcarbamoyl group containing a total of from 2 to 9 carbon atoms, a dialkylcarbamoyl group containing a total of from 3 to 10 carbon atoms, an arylcarbamoyl group containing a total of from 7 to 13 carbon atoms, or a heterocyclic carbamoyl group containing a total of from 3 to 12 carbon atoms, more preferably a carbamoyl group, an alkylcarbamoyl group containing a total of from 2 to 7 carbon atoms, a dialkylcarbamoyl group containing a total of from 3 to 6 carbon atoms, an arylcarbamoyl group containing a total of from 7 to 11 carbon atoms, or a heterocyclic carbamoyl group containing a total of from 3 to 10 carbon atoms. Examples thereof include carbamoyl, methylcarbamoyl, dimethylcarbamoyl, phenylcarbamoyl, and 4-pyridinecarbamoyl.

The acylamino group represented by $R_{22}$ may have a substituent and may be aliphatic, aromatic, or heterocyclic and, as a group which may be the substituent, any group that has been described hereinbefore as a substituent and that is substitutable may be employed. The acylamino group of $R_{22}$ is preferably an acylamino group containing a total of from 2 to 12 carbon atoms, more preferably an acylamino group containing a total of from 2 to 8 carbon atoms, still more preferably an alkylcarbonylamino group containing a total of from 2 to 8 carbon atoms. Examples thereof include acetylamino, benzoylamino, 2-pyridinecarbonylamino, and propanoylamino.

The sulfonamido group represented by $R_{22}$ may have a substituent and may be aliphatic, aromatic, or heterocyclic and, as a group which may be the substituent, any group that has been described hereinbefore as a substituent and that is substitutable may be employed. The sulfonamido group of $R_{22}$ is preferably a sulfonamido group containing a total of from 1 to 12 carbon atoms, more preferably a sulfonamido group containing a total of from 1 to 8 carbon atoms, still more preferably a sulfonamido group containing a total of from 1 to 8 carbon atoms. Examples thereof include methanesulfonamido, benzenesulfonamido, and 2-pyridinesulfonamido.

The carbamoylamino group represented by $R_{22}$ may have a substituent and, as a group which may be the substituent, any group that has been described hereinbefore as a substituent and that is substitutable may be employed. The substituent is preferably an aliphatic group, an aryl group, a heterocyclic group, etc. The carbamoylamino group of $R_{22}$ which may have a substituent is preferably a carbamoylamino group, an alkylcarbamoylamino group containing a total of from 2 to 9 carbon atoms, a dialkylcarbamoylamino group containing a total of from 3 to 10 carbon atoms, an arylcarbamoylamino group containing a total of from 7 to 13 carbon atoms, or a heterocyclic carbamoylamino group containing a total of from 3 to 12 carbon atoms, more preferably a carbamoylamino group, an alkylcarbamoylamino group containing a total of from 2 to 7 carbon atoms, a dialkylcarbamoylamino group containing a total of from 3 to 6 carbon atoms, an arylcarbamoylamino group containing a total of from 7 to 11 carbon atoms, or a heterocyclic carbamoylamino group containing a total of from 3 to 10 carbon atoms. Examples thereof include carbamoylamino, methylcarbamoylamino, N,N-dimethylcarbamoylamino, phenylcarbamoylamino, and 4-pyridinecarbamoylamino.

With the sulfamoyl group which is represented by $R_{22}$ and which may have a substituent, the substituent may be any group that has been described hereinbefore as a substituent and that is substitutable. The substituent is preferably an aliphatic group, an aryl group, a heterocyclic group, etc. The sulfamoyl group of $R_{22}$ which may have a substituent is preferably a sulfamoyl group, an alkylsulfamoyl group containing a total of from 1 to 9 carbon atoms, a dialkylsulfamoyl group containing a total of from 2 to 10 carbon atoms, an arylsulfamoyl group containing a total of from 7 to 13 carbon atoms, or a heterocyclic sulfamoyl group containing a total of from 2 to 12 carbon atoms, more preferably a sulfamoyl group, an alkylsulfamoyl group containing a total of from 1 to 7 carbon atoms, a dialkylsulfamoyl group containing a total of from 3 to 6 carbon atoms, an arylsulfamoyl group containing a total of from 6 to 11 carbon atoms, or a heterocyclic sulfamoyl group containing a total of from 2 to 10 carbon atoms. Examples thereof include sulfamoyl, methylsulfamoyl, N,N-dimethylsulfamoyl, phenylsulfamoyl, and 4-pyridinesulfamoyl.

The aliphatic oxy group represented by $R_{22}$ may have a substituent and may be saturated or unsaturated and, as a group which may be the substituent, any group that has been described hereinbefore as a substituent and that is substitutable may be employed. The aliphatic oxy group of $R_{22}$ is preferably an alkoxy group containing a total of from 1 to 8 carbon atoms, more preferably an alkoxy group containing a total of from 1 to 6 carbon atoms, and examples thereof include methoxy, ethoxy, i-propyloxy, cyclohexyloxy, and methoxyethoxy.

The aliphatic thio group represented by $R_{22}$ may have a substituent and may be saturated or unsaturated and, as a group which may be the substituent, any group that has been described hereinbefore as a substituent and that is substitutable may be employed. The aliphatic thio group of $R_{22}$ is preferably an alkyl thio group containing a total of from 1 to 8 carbon atoms, more preferably an alkyl thio group containing a total of from 1 to 6 carbon atoms, and examples thereof include methylthio, ethylthio, carbamoylmethylthio, and t-butylthio.

The halogen atom represented by $R_{22}$ is preferably a fluorine atom, a chlorine atom, or a bromine atom, more preferably a chlorine atom.

In view of the effect of the invention, $R_{22}$ is preferably an aliphatic oxy group, an aliphatic oxycarbonyl group, or a carbamoyl group which may have a substituent, more preferably an aliphatic oxy group.

The aromatic 5- or 6-membered heterocyclic group represented by A' may be condensed with other ring or may be monocyclic, and the other ring may be carbocyclic, heterocyclic, aromatic, or non-aromatic, and is preferably an aromatic 5- or 6-membered ring containing from 1 to 3 hetero atoms. The aromatic 5- or 6-membered heterocyclic group which is represented by A' and which may be condensed with other ring preferably contains a total of from 2 to 15 carbon atoms, more preferably from 2 to 10 carbon atoms. Examples thereof include a pyridine ring, a pyrazine ring, a pyrimidine ring, a pyridazine ring, a triazine ring, a pyrrole ring, a furan ring, a thiophene ring, an imidazole ring, a pyrazole ring, an oxazole ring, a thiadiazole ring, an isoxazole ring, an isothiazole ring, a triazole ring, a thiadiazole ring, an oxadiazole ring, and a condensed heterocyclic group wherein one of these groups is condensed with a benzene ring derivative or a heterocyclic derivative.

m is preferably from 0 to 3, more preferably from 0 to 1, still more preferably 0. n is preferably 1 or 2.

The general formulae (A-1) to (A-18), (A-20) to (A-28), and (A-30) to (A-32) represented by $A_2'$ will be described.

The substituents represented by $R_{51}$ to $R_{54}$ may be any group that has been described hereinbefore as a substituent and that is substitutable may be employed. The substituent of $R_{51}$ to $R_{54}$ is preferably an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably an aliphatic group, an aliphatic oxycarbonyl group, a carbamoyl group which may have a substituent, an aliphatic oxy group, a cyano group, or the like.

In view of the effects of the invention, $R_{51}$ to $R_{54}$ each is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably a hydrogen atom, an aliphatic group, an aliphatic oxycarbonyl group, a carbamoyl group which may have a substituent, an aliphatic oxy group, or a cyano group.

The substituent represented by $R_{55}$ may be any group that has been described hereinbefore as a substituent and that is substitutable may be employed. The substituent of $R_{55}$ is preferably an aliphatic group, an aryl group, a heterocyclic group, or the like, more preferably an aliphatic group, an aryl group, or an aromatic 5- or 6-membered heterocyclic group containing a nitrogen atom at a site adjacent to the site connected to the nitrogen atom.

In view of the effects of the invention, $R_{55}$ is preferably an aliphatic group, an aryl group, or a heterocyclic group, more preferably an aliphatic group, an aryl group, or an aromatic 5- or 6-membered heterocyclic group containing a nitrogen atom at a site adjacent to the site connected to the nitrogen atom, still more preferably an aromatic 5- or 6-membered heterocyclic group containing a nitrogen atom at a site adjacent to the site connected to the nitrogen atom. When $R_{55}$ is an aromatic 5- or 6-membered heterocyclic group containing a nitrogen atom at a site adjacent to the site connected to the nitrogen atom, not only the intermolecular mutual action of the colorant molecules but the intramolecular mutual action is easily strengthened. This is favorable in the point that it facilitates formation of a pigment having a stable molecular arrangement, which serves to show good hue and high fastness (light fastness, gas fastness, heat fastness, water fastness, etc.).

The aromatic 5- or 6-membered heterocyclic group containing a nitrogen atom at a site adjacent to the site connected to the nitrogen atom, which is preferred as $R_{55}$ in view of the effects of the invention, may have a substituent and, as a group which may be the substituent, any group that has been described hereinbefore as a substituent and that is substitutable may be employed. Preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. The heterocyclic group may be a saturated heterocyclic group or an unsaturated heterocyclic group, or may be a condensed heterocyclic group, and is preferably an aromatic 5- or 6-membered heterocyclic group containing a nitrogen atom at a site adjacent to the site connected to the nitrogen atom and containing a total of from 2 to 12 carbon atoms, more preferably an aromatic 5- or 6-membered heterocyclic group containing a nitrogen atom at a site adjacent to the site connected to the nitrogen atom and containing a total of from 2 to 10 carbon atoms. Examples thereof include 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, and 2-triazinyl. These heterocyclic groups may have a tautomer structure together with the substituent.

The aryl group preferred as $R_{55}$ in view of the effects of the invention may have a substituent and, as a group which may be the substituent, any group that has been described hereinbefore as a substituent and that is substitutable may be employed. Preferred substituents are a hydroxyl group, a nitro group, an aliphatic oxy group, a carbamoyl group, an aliphatic oxycarbonyl group, an aliphatic thio group, an amino group, an aliphatic amino group, an acylamino group, and a carbamoylamino group. The aryl group of $R_{55}$ is preferably an aryl group containing a total of from 6 to 12 carbon atoms, more preferably an aryl group containing a total of from 6 to 10 carbon atoms. Examples thereof include phenyl, 3-methoxyphenyl, 4-carbamoylphenyl, etc., with a phenyl group being preferred.

In the general formula (1), $R_{55}$ is preferably any one of the following (Y-1) to (Y-13) and, in order to form a structure which easily forms an intramolecular hydrogen bond structure, any one of the 6-membered following (Y-1) to (Y-6) is more preferred, any one of the following (Y-1), (Y-3), (Y-4), and (Y-6) is still more preferred, and the following (Y-1) or (Y-4) is particularly preferred. * in the general formulae (Y-1) to (Y-13) shows the site of attachment to the N atom of the pyrazole ring. $Y_1$ to $Y_{11}$ each represents a hydrogen atom or a substituent. $G_{11}$ in (Y-13) represents non-metallic atoms capable of framing a 5- or 6-membered heterocyclic ring. The heterocyclic ring represented by $G_{11}$ may be unsubstituted or may have a substituent, and may be a monocyclic ring or a condensed ring. Formulae (Y-1) to (Y-13) may have a tautomer structure together with the substituent.

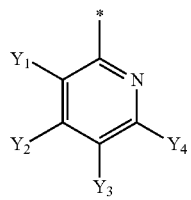

(Y-1)

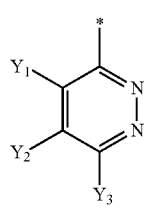

(Y-2)

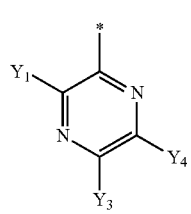

(Y-3)

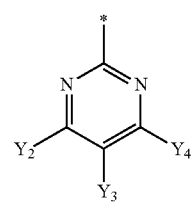

(Y-4)

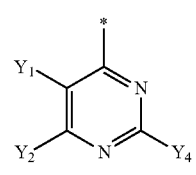

(Y-5)

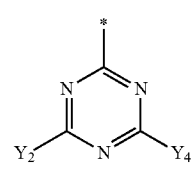

(Y-6)

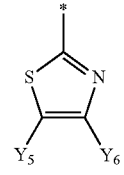

(Y-7)

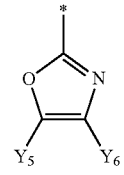

(Y-8)

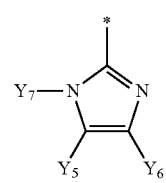

(Y-9)

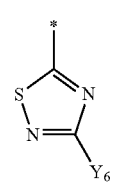

(Y-10)

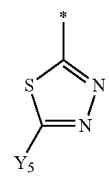

(Y-11)

(Y-12)

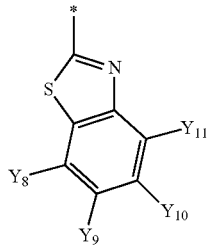

(Y-13)

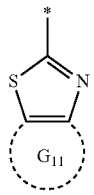

In view of the effects of the invention, $Y_1$ to $Y_{11}$ each is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably a hydrogen atom, an aliphatic group, an aliphatic oxycarbonyl group, a carbamoyl group which may have a substituent, an aliphatic oxy group, or a cyano group.

As the substituent represented by $R_{56}$, $R_{57}$, or $R_{59}$, any group that has been described hereinbefore as a substituent and that is substitutable may be employed. The substituents of $R_{56}$, $R_{57}$, or $R_{59}$ are preferably an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, etc., more preferably an aliphatic group, an aliphatic oxy group, an aliphatic thio group, a cyano group, etc.

In view of the effects of the invention, $R_{56}$, $R_{57}$, and $R_{59}$ each is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, etc., more preferably a hydrogen atom, an aliphatic group, an aliphatic oxy group, an aliphatic thio group, or a cyano group.

As the substituent represented by $R_{58}$, any group that has been described hereinbefore as a substituent and that is substitutable may be employed. In view of the effects of the invention, $R_{58}$ is preferably a heterocyclic group or an electron-withdrawing group having a Hammett substituent σp value of 0.2 or more, more preferably an electron-withdrawing group having a Hammett substituent σp value of 0.3 or more. With the electron-withdrawing group, the upper limit of the Hammett substituent σp value is 1.0 or less. As long as $R_{58}$ has a σp value within this range, the pigment can be synthesized in the similar manner, and there can be obtained similar effects with respect to hue wavelength shift toward longer wavelength side.

Specific examples of $R_{58}$ having a σp value of 0.2 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group having a σp value of 0.2 or more, a heterocyclic group, a halogen atom, an azo group, and a selenocyanato group.

In view of the effects of the invention, the pigment represented by the general formula (1) is preferably a pigment wherein $G_2$ represents a hydrogen atom; $R_{21}$ represents an amino group which may have a substituent or a saturated heterocyclic group connected at the nitrogen atom; m is 0 or 1 and, when m is 1, $R_{22}$ represents an aliphatic oxycarbonyl group or a carbamoyl group which may have a substituent, $A_2'$ represents any one of (A-1), (A-10) to (A-17), (A-20) to (A-23), (A-27), (A-28), and (A-30) to (A-32), and n is 1 or 2, more preferably a pigment wherein $G_2$ represents a hydrogen atom, $R_{21}$ represents an amino group which may have a substituent or a saturated heterocyclic group connected at the nitrogen atom, m is 0 or 1 and, when m is 1, $R_{22}$ represents an aliphatic oxycarbonyl group or a carbamoyl group which may have a substituent, $A_2'$ represents any one of (A-10), (A-11), (A-13) to (A-17), (A-20), (A-22) to (A-23), (A-27), (A-28), and (A-30) to (A-32), and n is 1 or 2, still more preferably a pigment wherein $G_2$ represents a hydrogen atom, $R_{21}$ represents an amino group which may have a substituent or a saturated heterocyclic group connected at the nitrogen atom, m is 0, $A_2'$ represents any one of (A-10), (A-11), (A-13) to (A-17), (A-20), (A-22) to (A-23), (A-27), (A-28), and (A-30) to (A-32), and n is 1 or 2, particularly preferably a pigment wherein $G_2$ represents a hydrogen atom, $R_{21}$ represents an amino group which may have a substituent, m is 0, $A_2'$ represents any one of (A-16) to (A-17), (A-20), (A-28), and (A-32), and n is 1 or 2, most preferably a pigment wherein $G_2$ represents a hydrogen atom, $R_{21}$ represents an amino group which may have a substituent, m is 0, $A_2'$ represents (A-16), and n is 1 or 2.

In one embodiment, the azo pigment represented by the foregoing general formula (1) is preferably a pigment wherein $A_2'$ is (A-10), (A-14) to (A-16), (A-25) or (A-26), more preferably a pigment wherein $A_2'$ is (A-10), (A-14) to (A-16), or (A-26), still more preferably a pigment wherein $A_2'$ is (A-16).

In view of the effects of the invention, the azo compounds represented by the foregoing general formula (2) are preferably azo compounds represented by the following general formula (2-0), and the compounds represented by the foregoing general formula (1) are preferably compounds represented by the following general formula (1-0).

The azo pigments represented by the general formula (1-0), and the tautomers, salts, and hydrates thereof will be described in detail below.

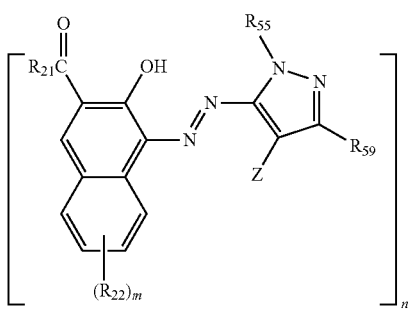

(1-0)

In the general formula (1-0), $R_{21}$, $R_{22}$, $R_{55}$, $R_{59}$, m, and n are the same meaning as those defined with respect to the general formula (1). Z represents an electron-withdrawing group having a Hammett σp value of 0.2 or more. When n=2, the general formula (1-0) represents a dimer formed through $R_{21}$, $R_{22}$, $R_{55}$, $R_{59}$, or Z. When n=3, the general formula (1-0) represents a trimer formed through $R_{21}$, $R_{22}$, $R_{55}$, $R_{59}$, or Z. When n=4, the general formula (1-0) represents a tetramer formed through $R_{21}$, $R_{22}$, $R_{55}$, $R_{59}$, or Z.

As the substituent represented by Z and having a Hammett σp value of 0.2 or more, there are illustrated those groups which have been mentioned in the description on $R_{58}$ in the aforesaid general formula (1).

Preferred substituents or scopes of $R_{21}$, $R_{22}$, $R_{55}$, $R_{59}$, m, and n in the pigments represented by the general formula (1-0) are the same as those in the general formula (1).

In view of the effects of the invention, Z is preferably an acyl group, a carbamoyl group, an alkyloxycarbonyl group, a cyano group, an alkylsulfonyl group, or a sulfamoyl group, more preferably a carbamoyl group, an alkyloxycarbonyl group, or a cyano group, most preferably a cyano group.

In view of the effects of the invention, the pigment represented by the general formula (1-0) is a pigment wherein $R_{21}$ represents an amino group which may have a substituent or a saturated heterocyclic group connected at the nitrogen atom, m is 0 or 1 and, when m is 1, $R_{22}$ represents an aliphatic oxycarbonyl group or a carbamoyl group which may have a substituent, $R_{55}$ represents an aromatic 5- or 6-membered heterocyclic group containing a nitrogen atom at a site adjacent to the site connected to the nitrogen atom, $R_{59}$ represents a hydrogen atom or an aliphatic group, Z represents an acyl group, a carbamoyl group, an alkyloxycarbonyl group, a cyano group, an alkylsulfonyl group, or a sulfamoyl group, and n represents 1 or 2, more preferably a pigment wherein $R_{21}$ represents an amino group which may have a substituent or a saturated heterocyclic group connected at the nitrogen atom, m is 0, $R_{55}$ is any one of (Y-1) to (Y-13), $R_{59}$ represents a hydrogen atom or an aliphatic group, Z represents a carbamoyl group, an alkyloxycarbonyl group, or a cyano group, and n represents 1 or 2, still more preferably a pigment wherein $R_{21}$ represents an amino group which may have a substituent, m is 0, $R_{55}$ is any one of (Y-1) to (Y-6), $R_{59}$ represents a hydrogen atom or an aliphatic group, Z represents a carbamoyl group, an alkyloxycarbonyl group, or a cyano group, and n represents 1 or 2, yet more preferably a pigment wherein $R_{21}$ represents an amino group which may have a substituent, m is 0, $R_{55}$ is any one of (Y-1), (Y-4), and (Y-6), $R_{59}$ represents a hydrogen atom, Z represents a cyano group, and n represents 1 or 2.

In view of the effects of the invention, the pigment represented by the general formula (1) is preferably a pigment which has a "total carbon number/azo group number" ratio of 40 or less, more preferably 30 or less. In view of the effects of the invention, the pigment represented by the general formula (1) is preferably a pigment which has a "molecular weight/azo group number" ratio of 700 or less. In view of the effects of the invention, the pigment represented by the general formula (1) preferably does not have an ionic substituent such as a sulfo group or a carboxyl group.

In another embodiment, the azo pigment represented by the foregoing general formula (1) is preferably a pigment wherein $A_2$' is (A-1) to (A-9), (A-11) to (A-13), (A-17), (A-20) to (A-23), (A-27), (A-28), or (A-30) to (A-32), more preferably a pigment wherein $A_2$' is (A-11) to (A-13), (A-17), (A-20) to (A-23), (A-27), (A-28), or (A-30) to (A-32), still more preferably a pigment wherein. $A_2$' is (A-17), (A-20), (S-22) to (A-23), (A-27), (A-28), (A-30) to (A-32), yet more preferably a pigment wherein $A_2$' is (A-20), (A-28), or (A-32), most preferably a pigment wherein $A_2$' is (A-20). Also, $R_{56}$ in (A-20) is particularly preferably $R_{59}$.

Of these, the azo pigments represented by the general formula (1) are preferably azo pigments represented by the following general formula (1-1), and the tautomers, salts, or hydrates thereof.

General Formula (1-1)

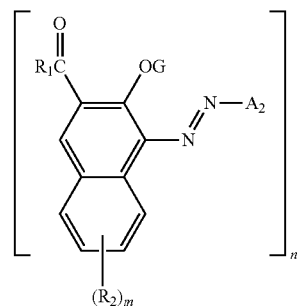

In the general formula (1-1), G represents a hydrogen atom, an aliphatic group, an aryl group, or a heterocyclic group, $R_1$ represents an amino group, an aliphatic oxy group, an aliphatic group, an aryl group, or a heterocyclic group, $R_2$ represents a substituent, and $A_2$ represents any one of the following formulae (A-17), (A-18), (A-20), (A-22) to (A-24), (A-27), (A-28), (A-31), and (A-32). m represents an integer of from 0 to 5, and n represents an integer of from 1 to 4. When n=2, the general formula (1-1) represents a dimer formed through $R_1$, $R_2$, or $A_2$. When n=3, the general formula represents a trimer formed through $R_1$, $R_2$, or $A_2$. When n=4, the general formula represents a tetramer formed through $R_1$, $R_2$, or $A_2$.

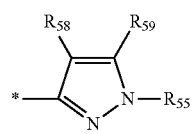

(A-17)

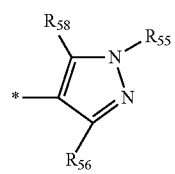

(A-18)

-continued

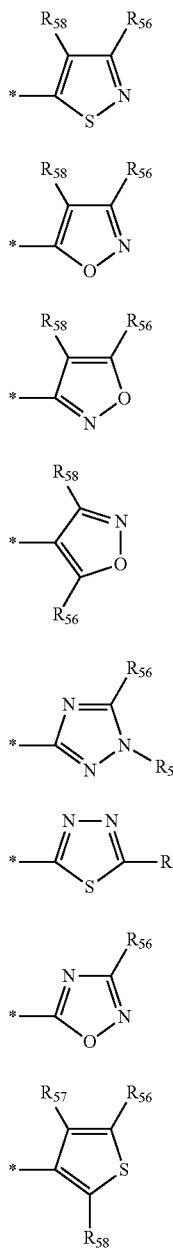

(A-20)
(A-22)
(A-23)
(A-24)
(A-27)
(A-28)
(A-31)
(A-32)

In the general formulae (A-17), (A-18), (A-20), (A-22) to (A-24), (A-27), (A-28), (A-31), and (A-32), $R_{55}$ to $R_{59}$ each represents a hydrogen atom or a substituent. Adjacent $R_{51}$ and $R_{52}$, $R_{52}$ and $R_{53}$, $R_{53}$ and $R_{54}$, $R_{55}$ and $R_{56}$, $R_{56}$ and $R_{57}$, $R_{55}$ and $R_{58}$, $R_{56}$ and $R_{58}$, $R_{57}$ and $R_{58}$, and $R_{55}$ and $R_{59}$ may be connected to each other to form a 5- or 6-membered ring. * shows the site connected to the azo group in the general formula (1-1).

Preferred substituents and preferred scopes of G, $R_1$, $R_2$, $A_2$, $R_{55}$ to $R_{59}$, m, and n in the general formula (1-1) which represents the pigments are the same as $G_2$, $R_{21}$, $R_{22}$, $A_2'$, $R_{55}$ to $R_{59}$, m, and n in the general formula (1).

The azo pigments represented by the foregoing general formula (1-1) are preferably those which are represented by the following general formula (1-2).

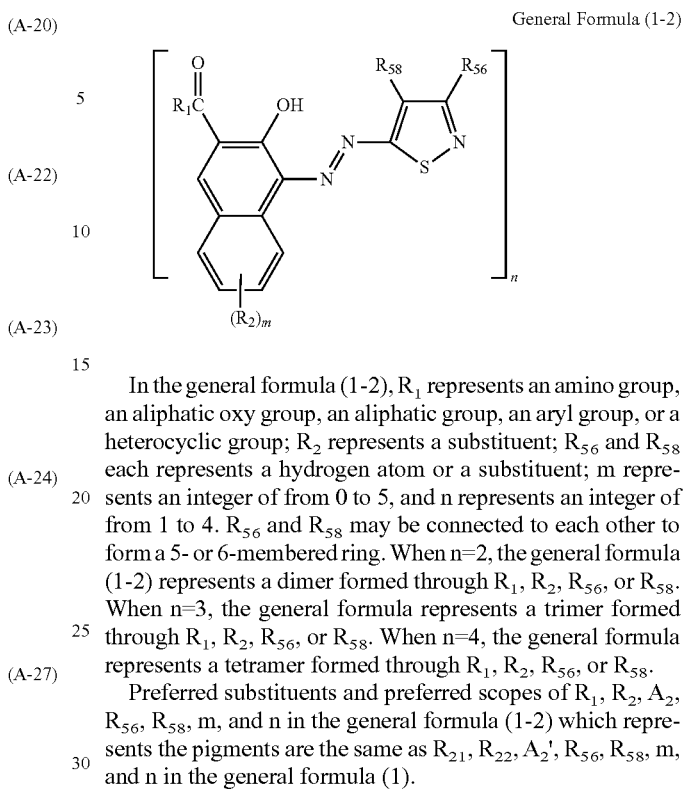

General Formula (1-2)

In the general formula (1-2), $R_1$ represents an amino group, an aliphatic oxy group, an aliphatic group, an aryl group, or a heterocyclic group; $R_2$ represents a substituent; $R_{56}$ and $R_{58}$ each represents a hydrogen atom or a substituent; m represents an integer of from 0 to 5, and n represents an integer of from 1 to 4. $R_{56}$ and $R_{58}$ may be connected to each other to form a 5- or 6-membered ring. When n=2, the general formula (1-2) represents a dimer formed through $R_1$, $R_2$, $R_{56}$, or $R_{58}$. When n=3, the general formula represents a trimer formed through $R_1$, $R_2$, $R_{56}$, or $R_{58}$. When n=4, the general formula represents a tetramer formed through $R_1$, $R_2$, $R_{56}$, or $R_{58}$.

Preferred substituents and preferred scopes of $R_1$, $R_2$, $A_2$, $R_{56}$, $R_{58}$, m, and n in the general formula (1-2) which represents the pigments are the same as $R_{21}$, $R_{22}$, $A_2'$, $R_{56}$, $R_{58}$, m, and n in the general formula (1).

The invention includes in its scope tautomers of the azo pigments represented by the general formula (1), general formula (1-0), general formula (1-1), and general formula (1-2). Although the general formula (1), general formula (1-0), general formula (1-1), and general formula (1-2) are shown in the form of limiting structure among several tautomer forms which are possible in view of chemical structure, the azo pigments may be tautomers of other structure than the shown ones, and may be used as a mixture containing plural tautomers.

For example, with the pigments represented by the general formula (1), azo-hydrazone tautomers represented by the following general formula (1') can be considered.

The invention also includes in its scope tautomers of the azo pigments represented by the following general formula (1') which are tautomers of the azo pigments represented by the general formula (1).

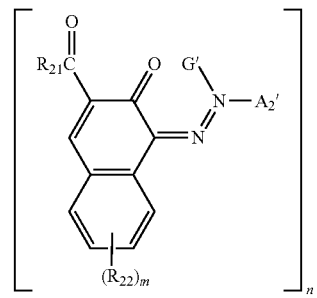

General Formula (1')

In the general formula (1'), $R_{21}$, $R_{22}$, $A_2'$, m, and n are the same as those defined with respect to the general formula (1). In the general formula (1'), G' is a group corresponding to G defined with respect to the general formula (1).

Of the azo pigments represented by the general formula (1), there can be illustrated azo pigments represented by the following general formula (3-1) to the general formula (3-4) as examples of particularly preferred pigments. The pigment represented by the above general formula (1) is preferably an azo pigment represented by the following general formula (3-1) to the general formula (3-4).

The azo pigments represented by the following general formula (3-1) to (3-4), and the tautomers, salts, and hydrates thereof will be described in detail below.

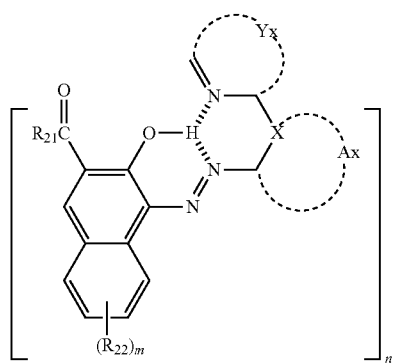

(3-1)

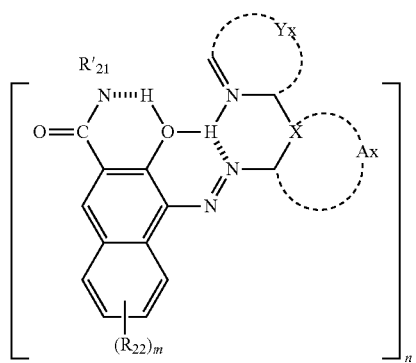

(3-2)

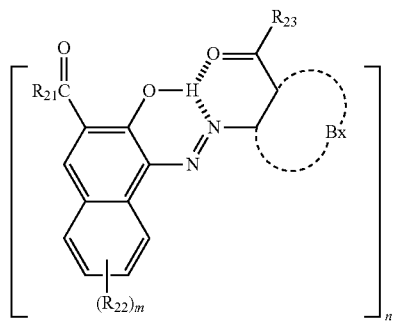

(3-3)

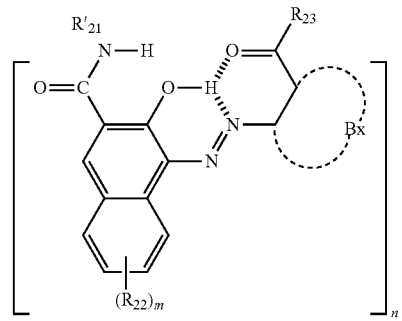

(3-4)

In the general formula (3-1) to the general formula (3-4), $R_{21}$, $R_{22}$, m, and n are the same as those defined with respect to the general formula (1). X represents a carbon atom or a nitrogen atom, $A_x$ and $B_x$ represent those which correspond to (A-1) to (A-18), (A-20) to (A-28), and (A-30) to (A-32) defined for $A_2'$ in the general formula (1). $R_{23}$ represents a substituent formed by removing carbonyl group from a corresponding substituent among the substituents of $R_{51}$, $R_{54}$, $R_{57}$, $R_{58}$, etc. specified with respect to the general formula (1). Each of the formed heterocyclic groups represents a group corresponding to the group defined with respect to $A_2'$ in the general formula (1). $Y_x$ represents a corresponding heterocyclic group defined for $R_{55}$ in the general formula (1) together with the nitrogen atom and carbon atoms. $R_{23}$ represents a substituent formed by removing carbonyl group from a corresponding substituent among the substituents of $R_{51}$, $R_{54}$, $R_{57}$, $R_{58}$, etc. specified with respect to the general formula (1). $R'_{21}$ represents a substituent formed by removing —NH— from the amino group of $R_{21}$ defined with respect to the general formula (1).

With the azo pigments represented by the above-described general formulae (1), (1-0), (1-1), (1-2), and (3-1) to (3-4), many tautomers may be considered.

Also, in the invention, the azo pigment represented by the general formula (1) preferably has a substituent capable of forming an intramolecular hydrogen bond or intramolecular crosslinking hydrogen bond. It is more preferred for the azo pigment to have a substituent capable of forming at least one or more intramolecular hydrogen bonds, particularly a substituent capable of forming at least one or more intramolecular crosslinking hydrogen bonds.

The reason why this structure is preferred is that, as is shown by the general formulae (3-1) to (3-4), nitrogen atom constituting the heterocyclic group contained in the azo pigment structure, hydrogen atom and oxygen atom of the hydroxyl group of the naphthalene substituent, nitrogen atom of the azo group or of its tautomer of the hydrazone group, a carbonyl group in the azo component contained in the azo pigment structure, hydrogen atom and oxygen atom of the hydroxyl group of the naphthalene substituent, and nitrogen atom of the azo group or of its tautomer of the hydrazone group are liable to form intramolecular crosslinking hydrogen bonds.

As a result, flatness of the molecule is enhanced, the intramolecular and intermolecular mutual action is improved, crystallinity of the azo pigment represented by the general formulae (3-1) to the general formulae (3-4) is enhanced (higher structure of the pigment becoming liable to be formed), and hence performances required as pigments, i.e., light fastness, heat stability, moist heat stability, water resistance, gas resistance, and/or solvent resistance, can markedly be improved, thus such pigments being more preferred.

In view of this point, too, pigments represented by the general formula (1) are preferably pigments represented by the general formulae (3-1) to (3-4), more preferably pigments represented by the general formulae (3-2) and (3-4), particularly preferably pigments represented by the general formula (3-2).

Specific examples of the azo pigments and the azo compounds represented by the foregoing general formula (1) will be shown below. However, the azo pigments and the azo compounds to be used in the invention are not limited only to the following examples. Also, although the structures of the following specific examples are shown in the form of limiting structure among several tautomer forms which are possible in view of chemical structure, it is needless to say that the azo pigments and the azo compounds may be tautomers of other structure than the shown ones.

D-1

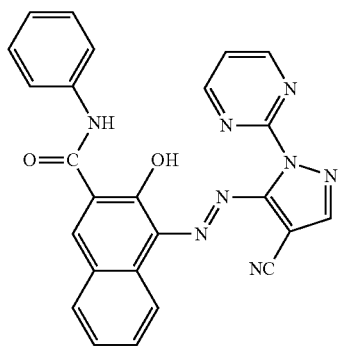

D-2

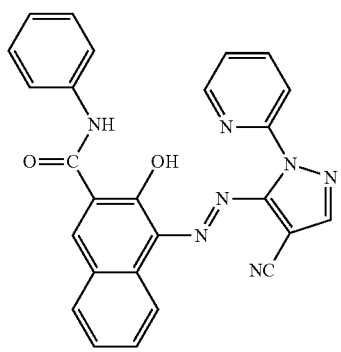

D-3

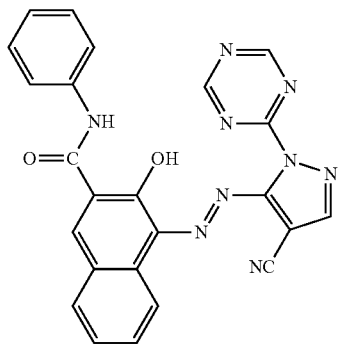

-continued

D-4

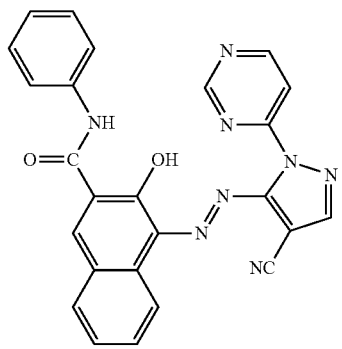

D-5

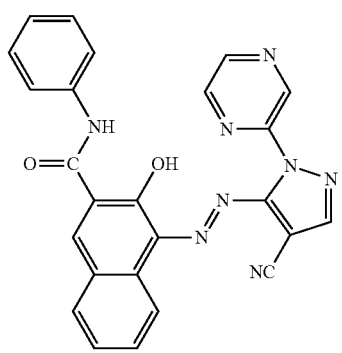

D-6

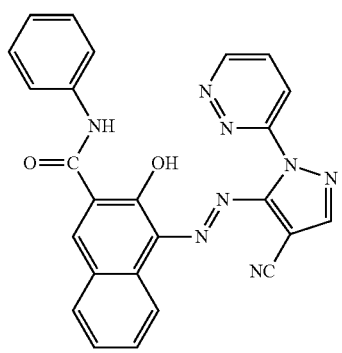

D-7

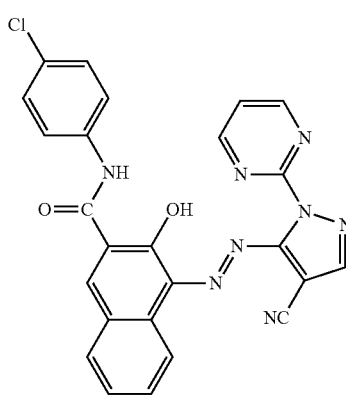

-continued
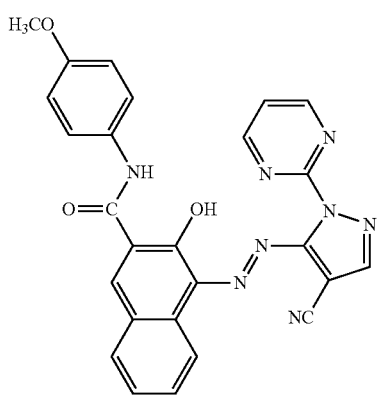
D-8
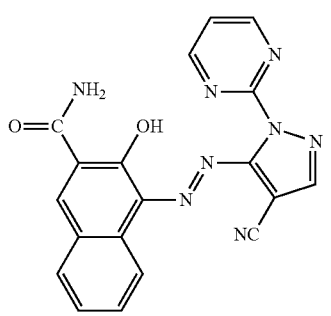
D-9
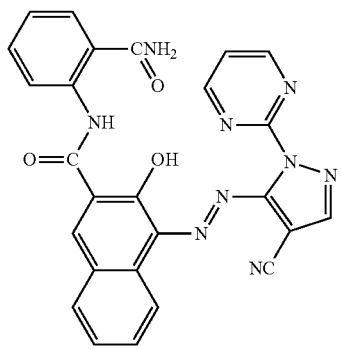
D-10
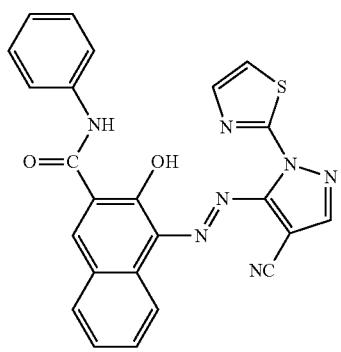
D-11
-continued
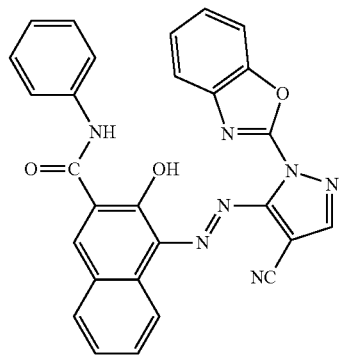
D-12
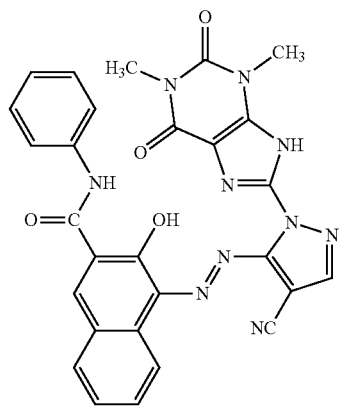
D-13
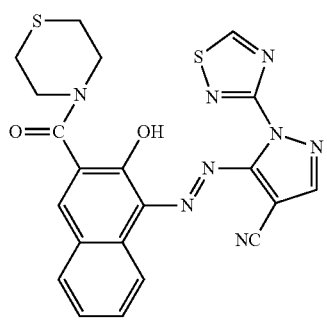
D-14
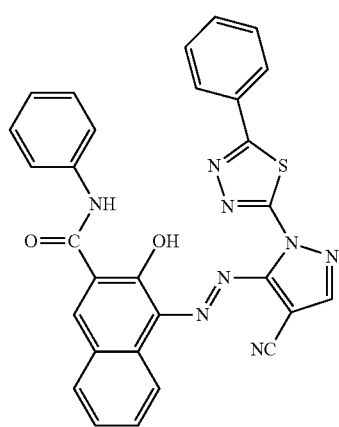
D-15

D-16
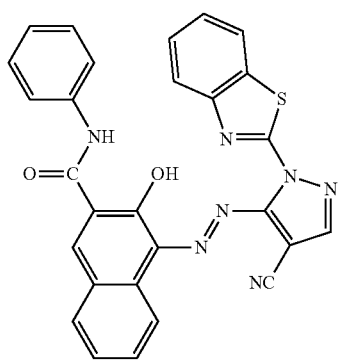
D-17
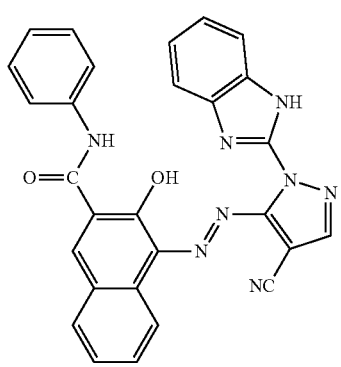
D-18
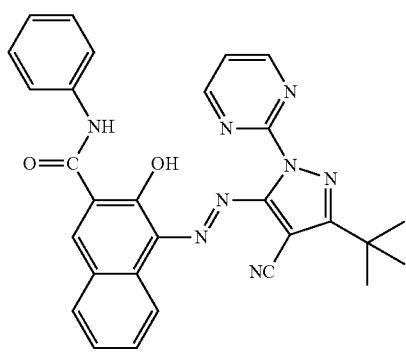
D-19
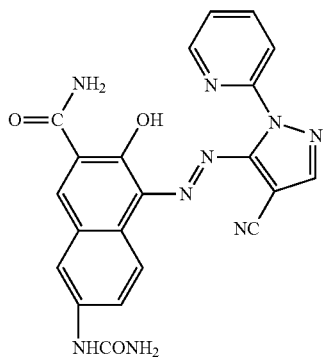
D-20
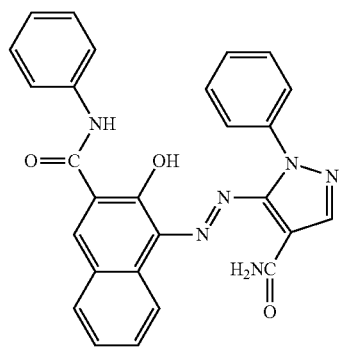
D-21
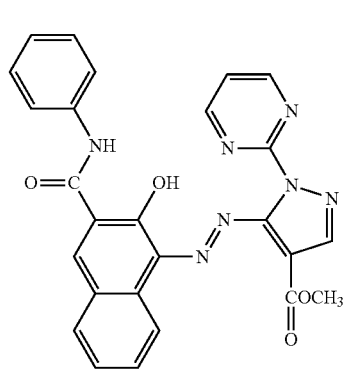
D-22
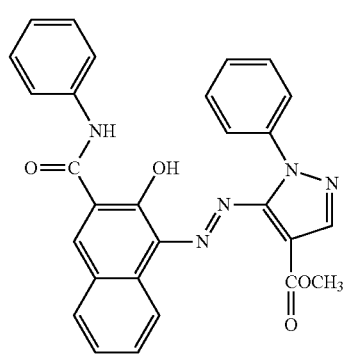
D-23
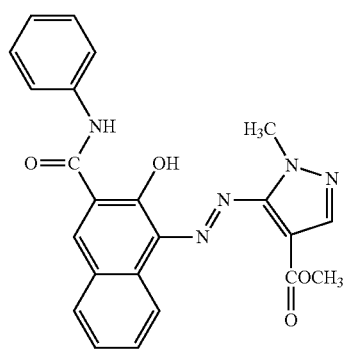

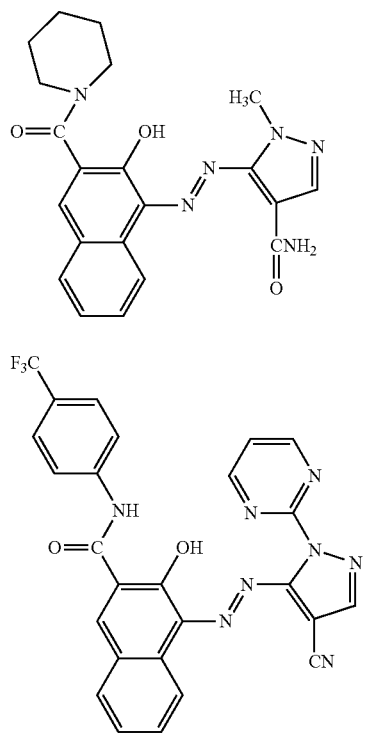
D-24
D-25
D-26
D-27
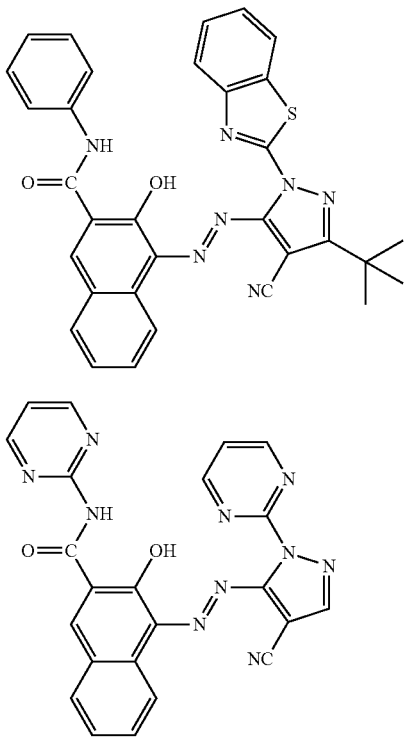
D-28
D-29
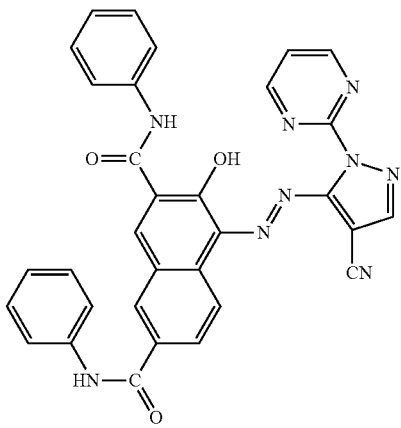
D-30
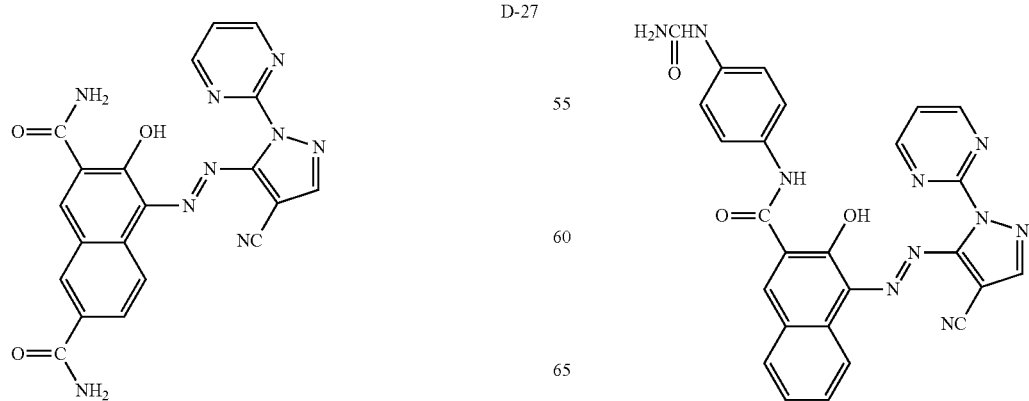
D-31

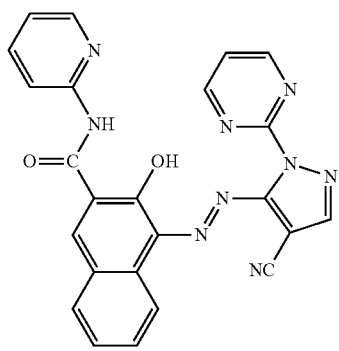
D-32
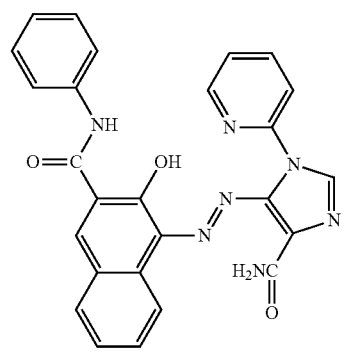
D-36
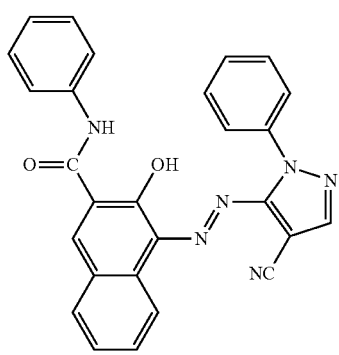
D-33
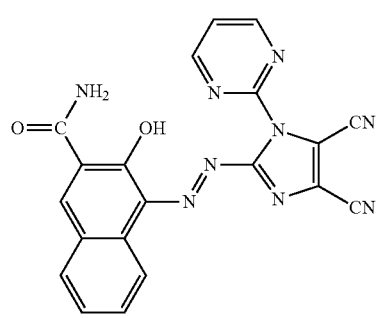
D-37
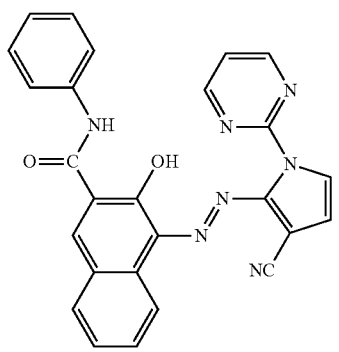
D-34
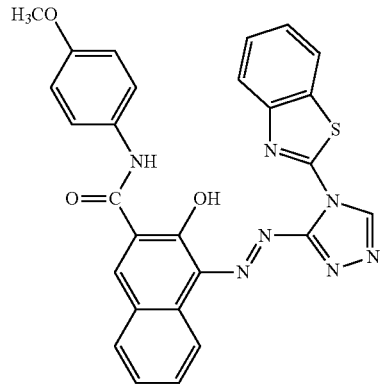
D-38
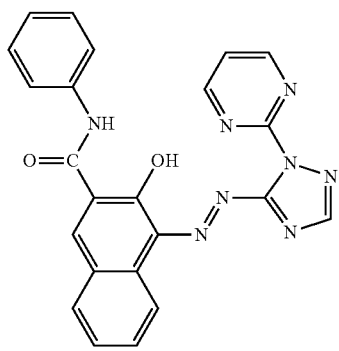
D-35
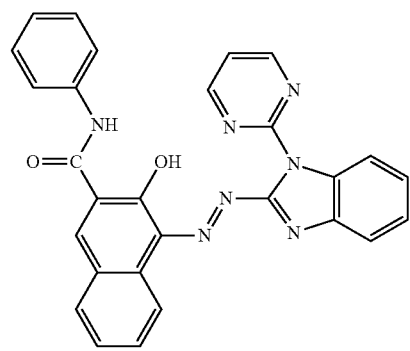
D-39

D-40 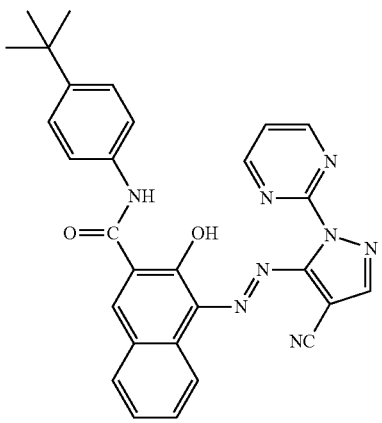
D-41 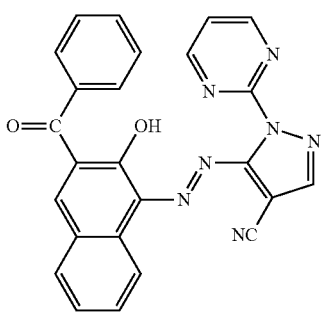
D-42 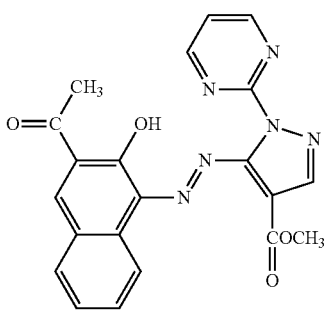
D-43 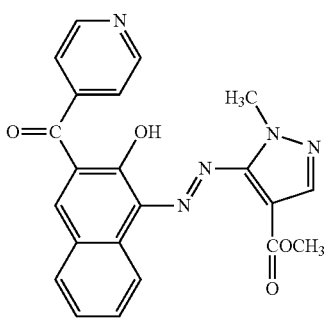
D-44 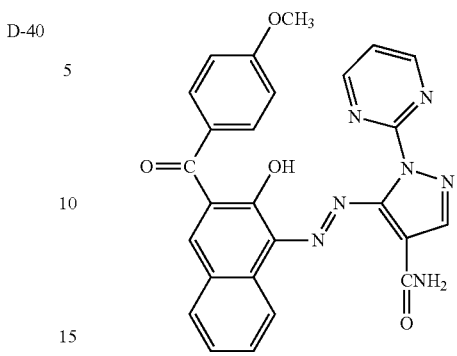
D-45 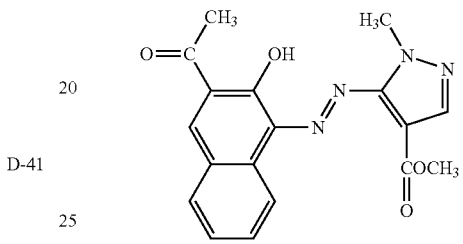
D-71 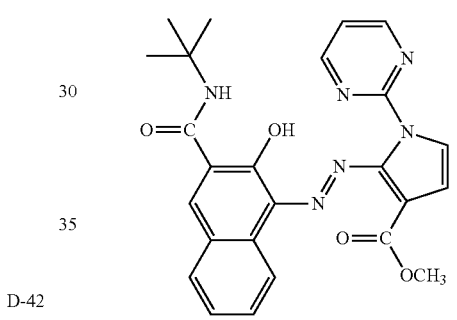
D-72 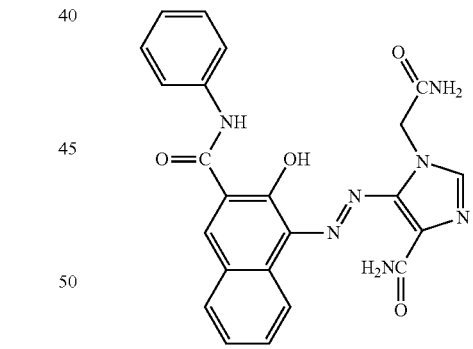
D-73 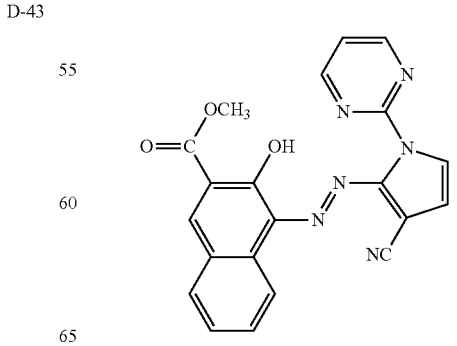

-continued
D-74
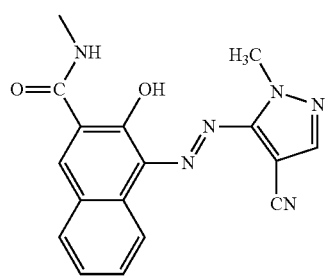
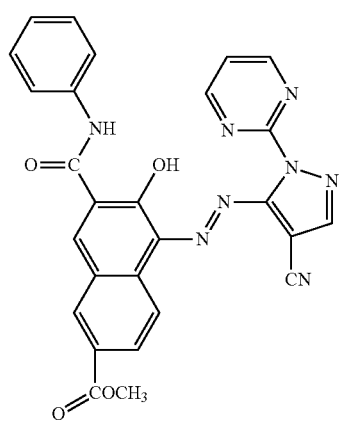
D-75
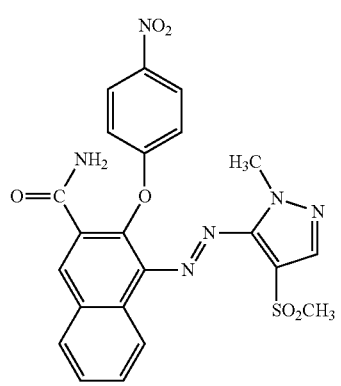
D-78
D-79
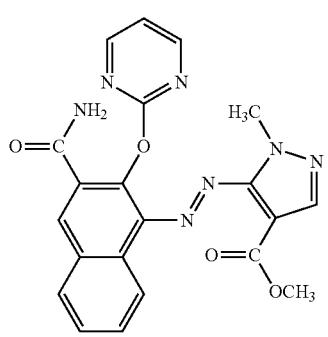
D-76
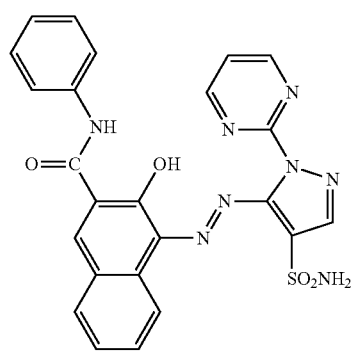
D-80
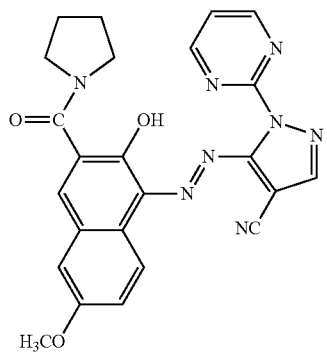
D-77
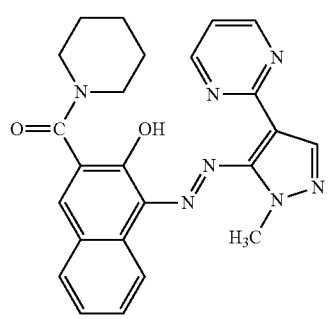
D-81
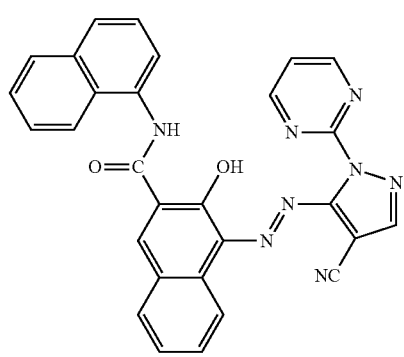

D-82

D-83

D-84

D-85

D-86

D-87

D-88

D-89

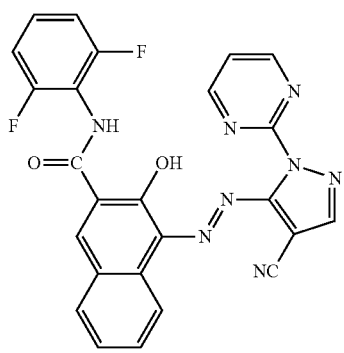
D-90
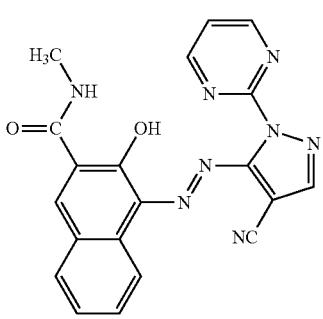
D-94
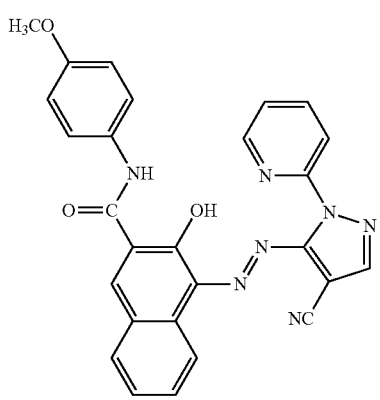
D-91
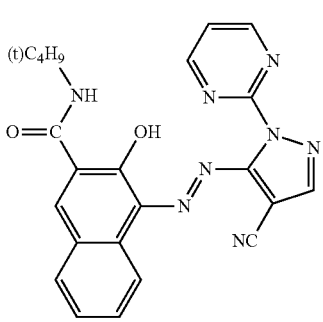
D-95
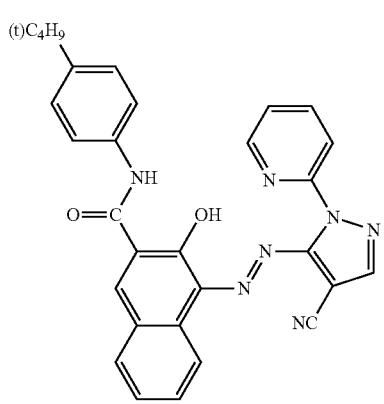
D-92
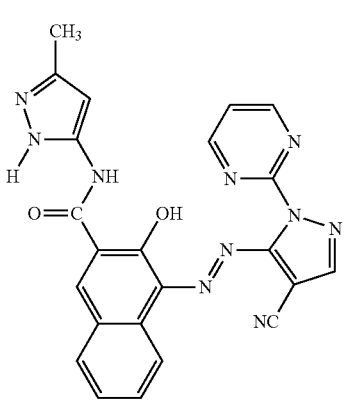
D-96
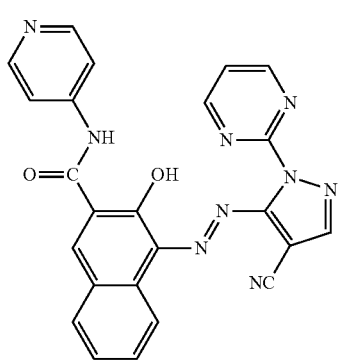
D-93
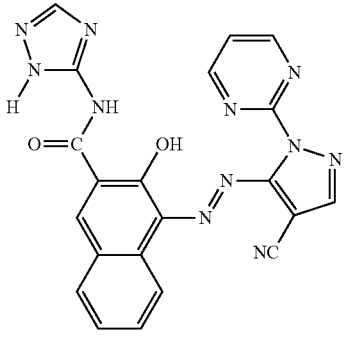
D-97

D-98
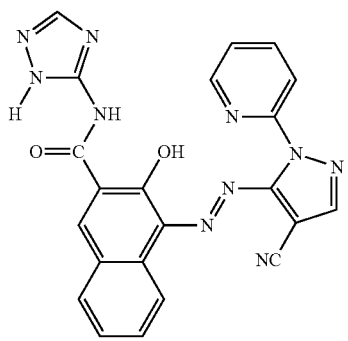
D-99
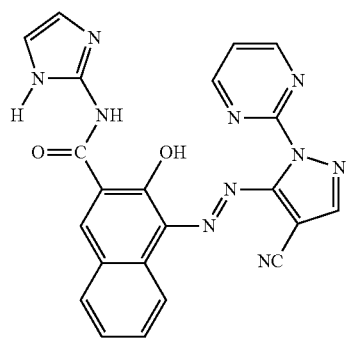
D-100
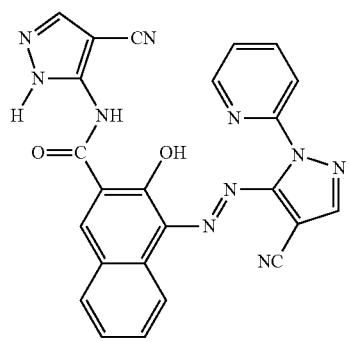
D-101
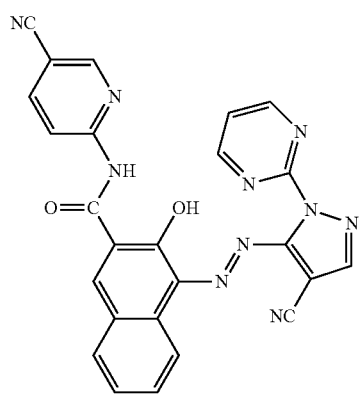
D-102
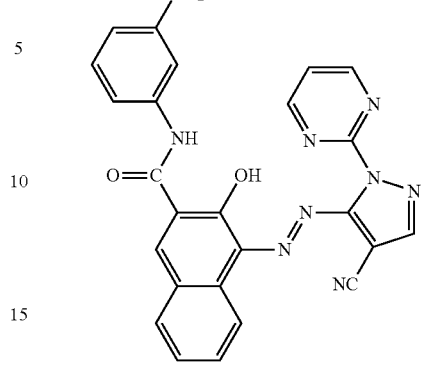
D-103
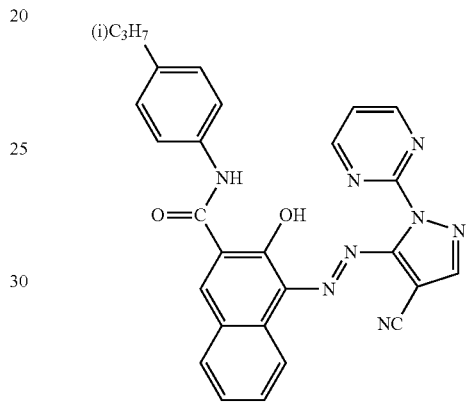
D-104
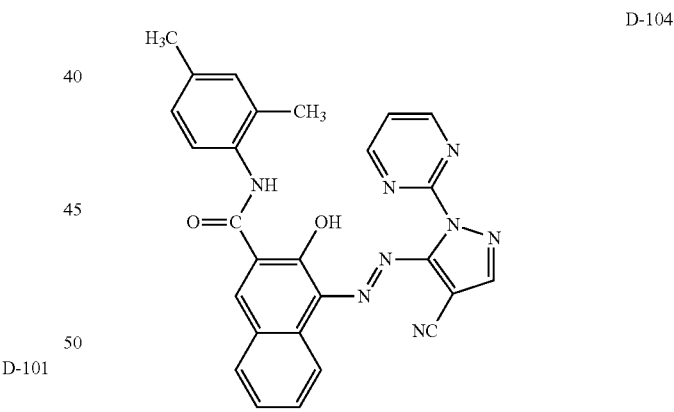
D-105
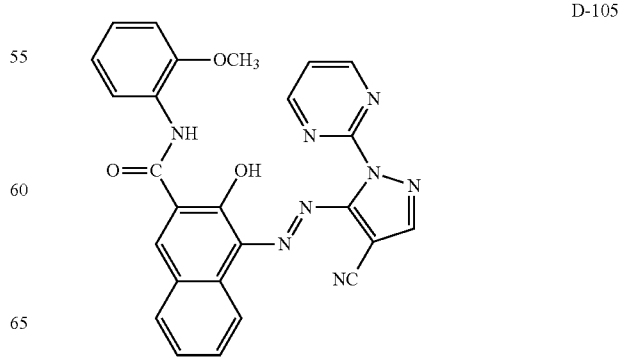

-continued
D-106
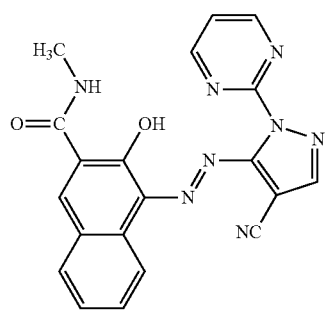
D-107
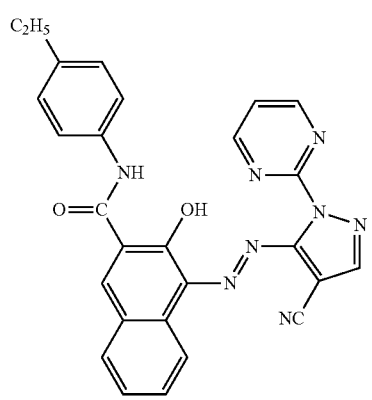
D-108
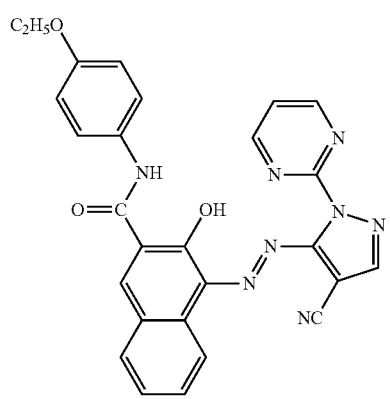
D-109
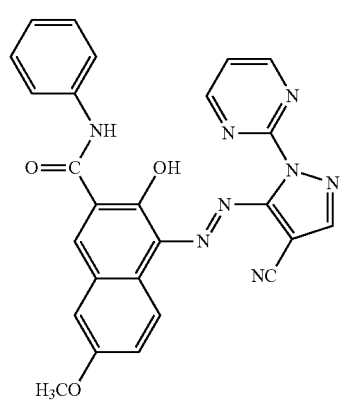
D-110
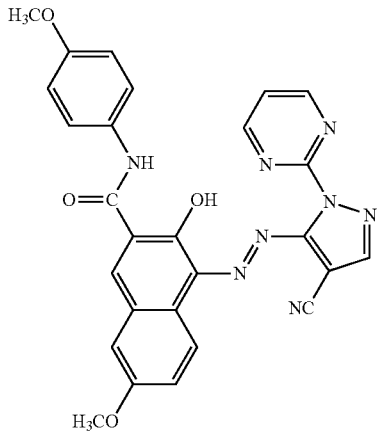
D-111
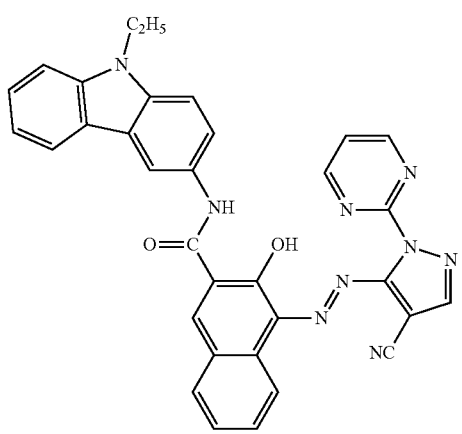
D-112
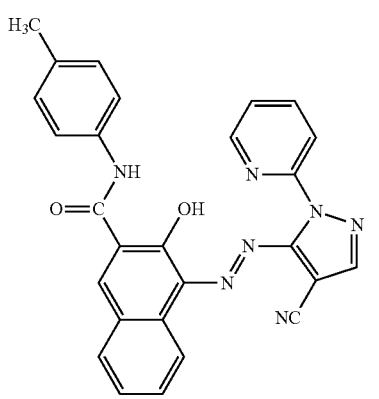
D-113
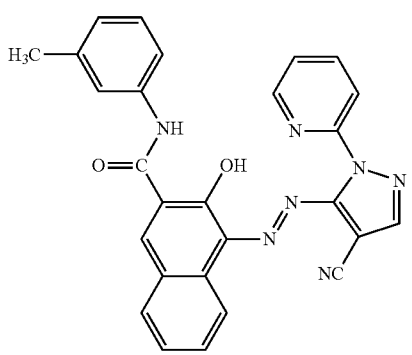

D-114
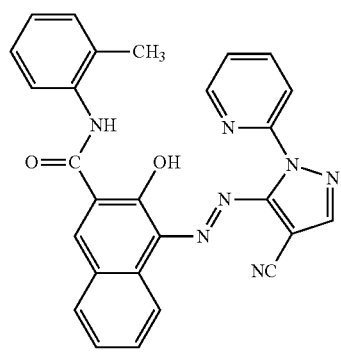
D-115
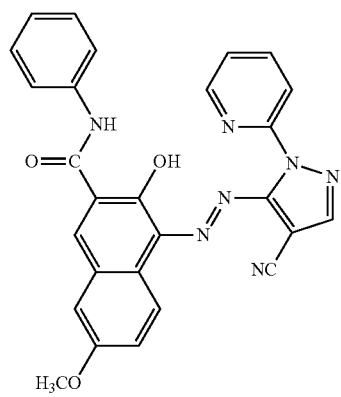
D-116
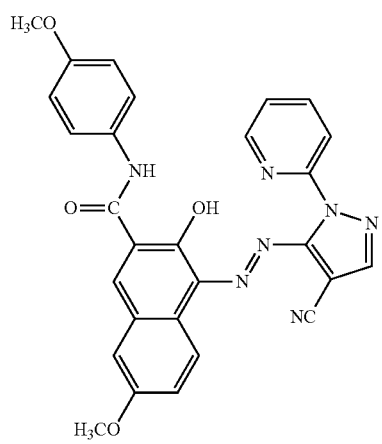
D-117
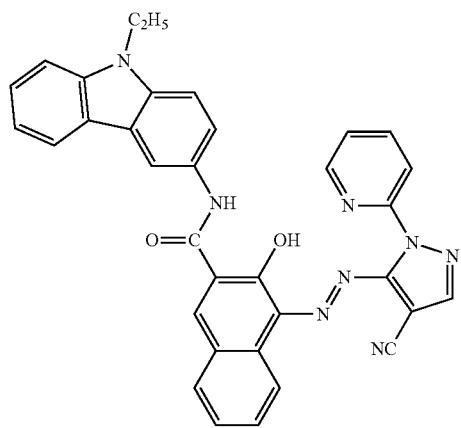
D-118
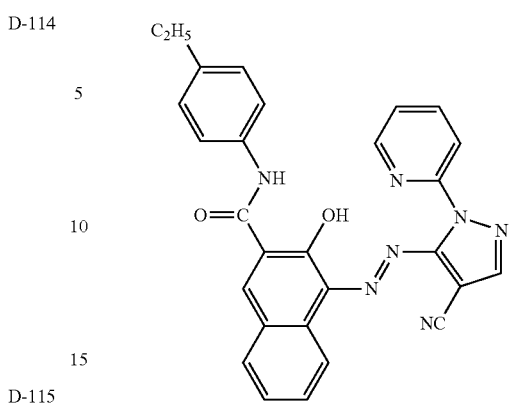
D-119
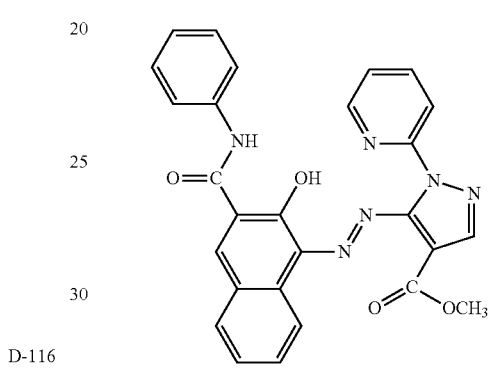
D-120
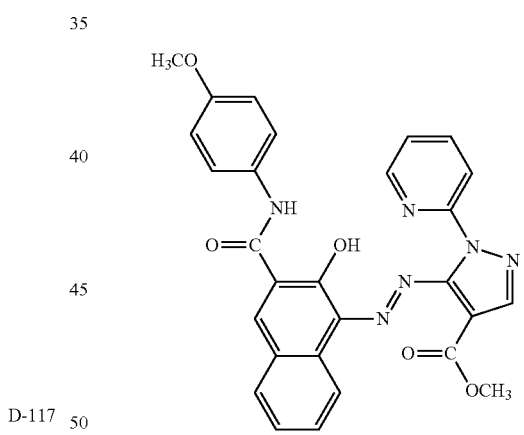
D-121
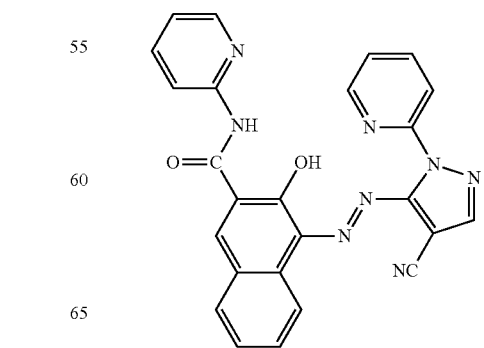

D-122 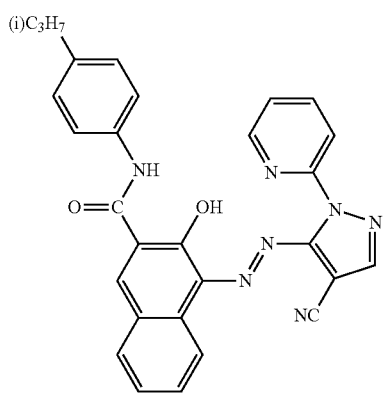
D-123 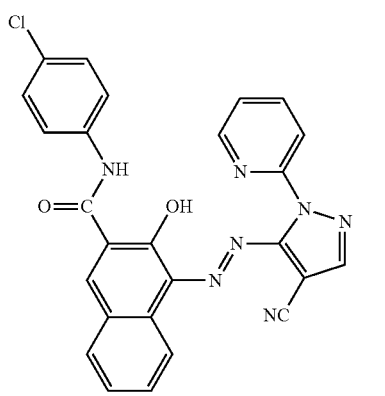
D-124 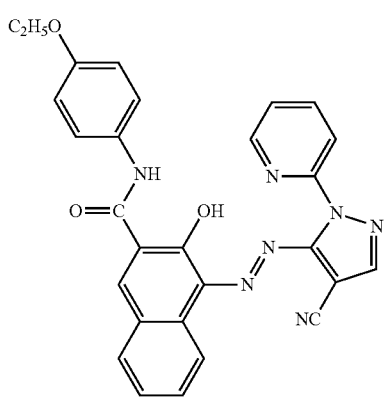
D-125 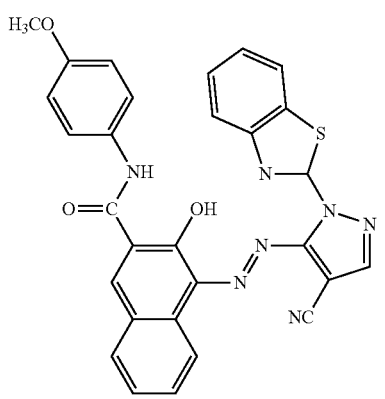
D-126 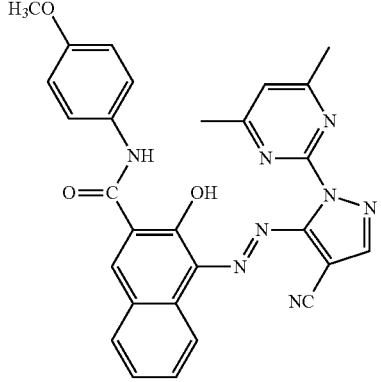
D-127 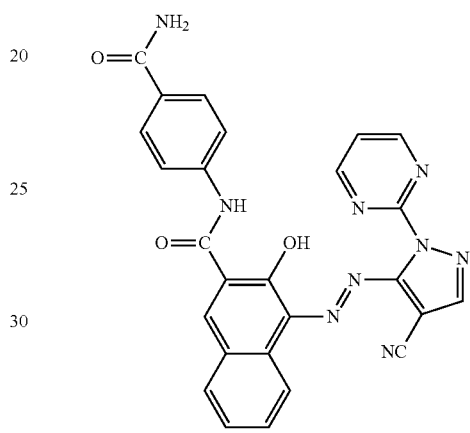
D-128 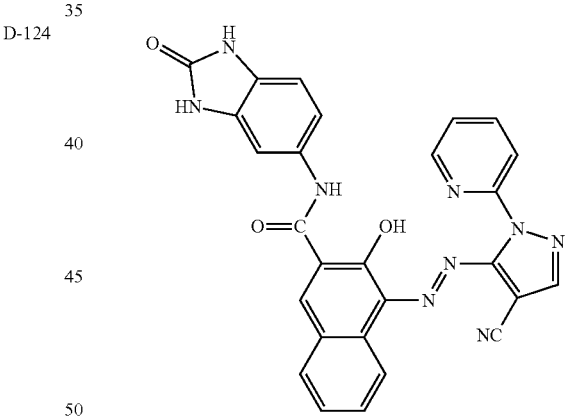
D-129 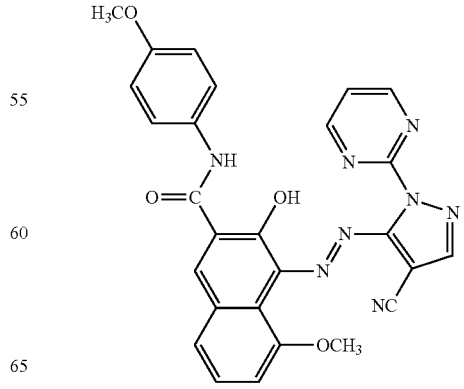

D-130
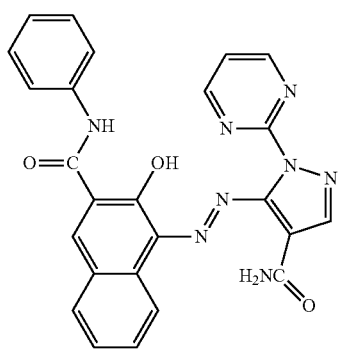
D-131
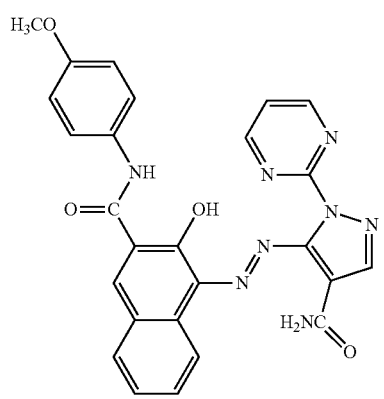
D-132
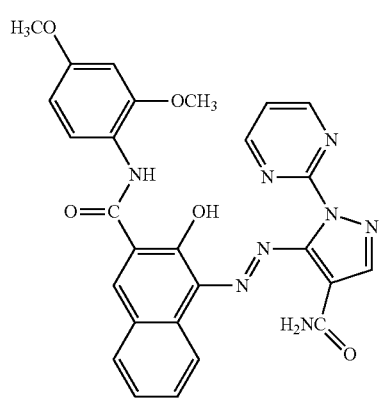
D-133
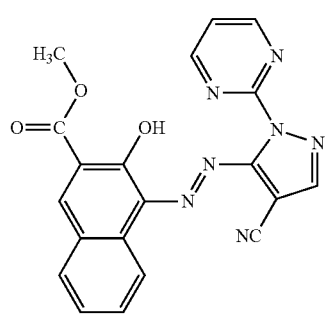
D-134
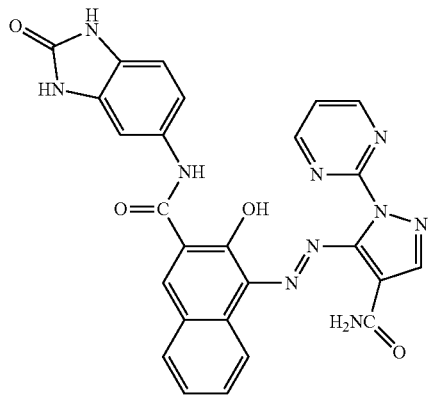
D-135
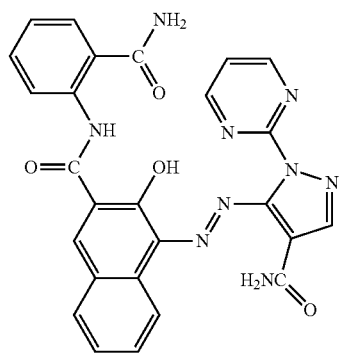
D-136
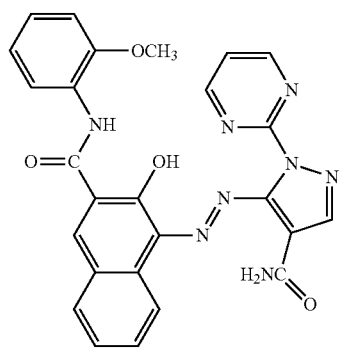
D-137
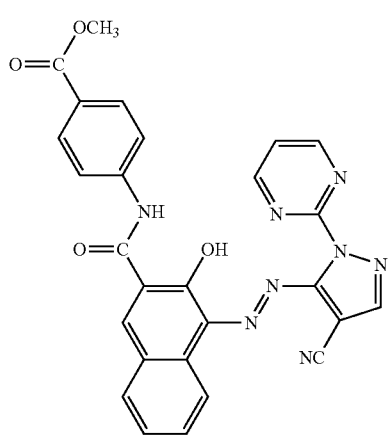

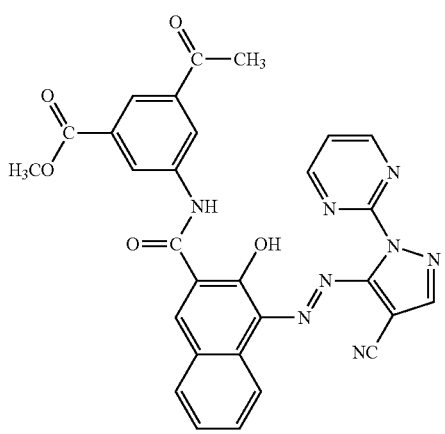
D-138
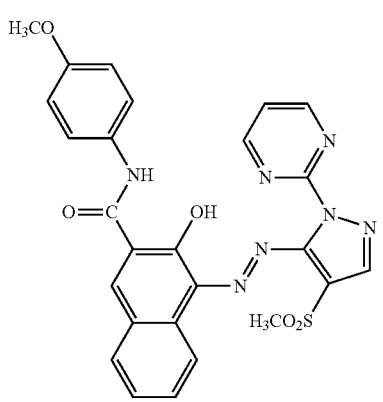
D-139
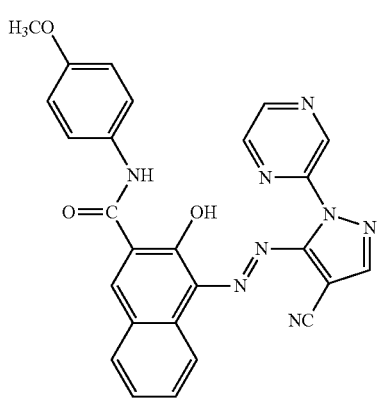
D-140
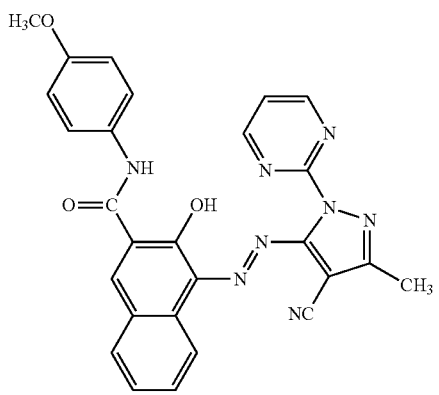
D-141
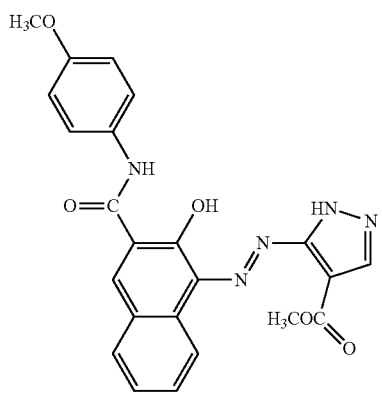
D-142
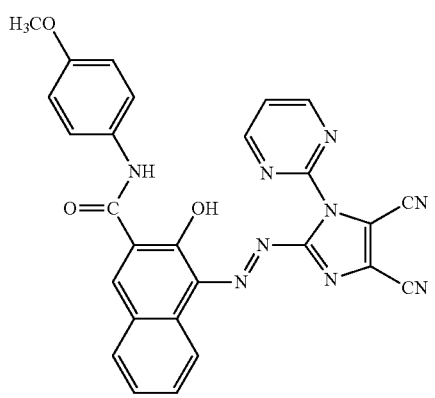
D-143
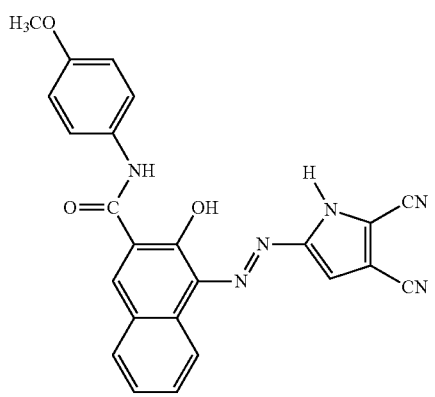
D-144
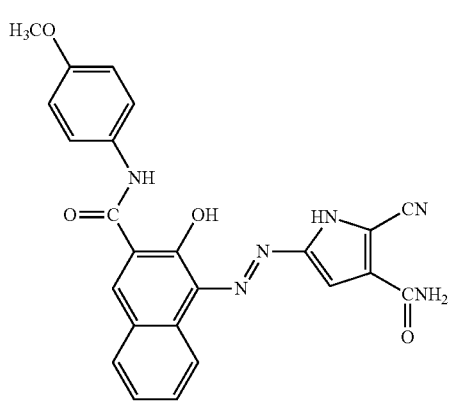
D-145

-continued
D-146
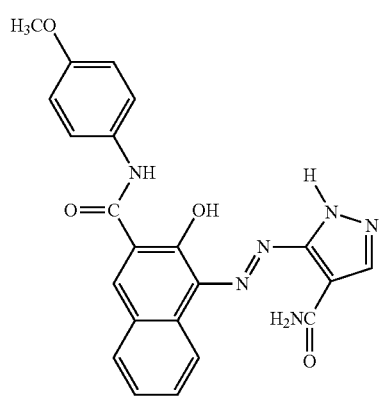
D-147
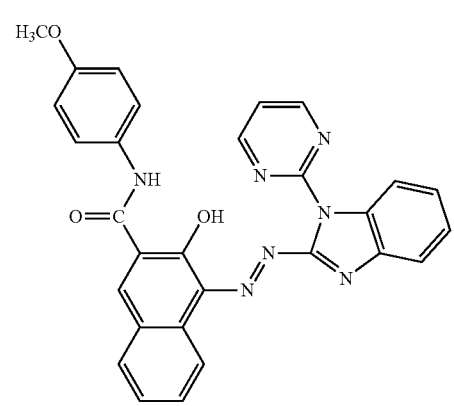
D-148
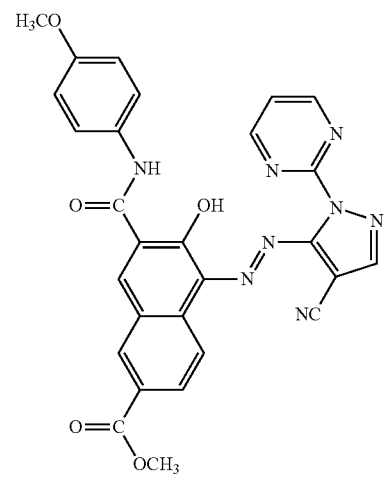
D-149
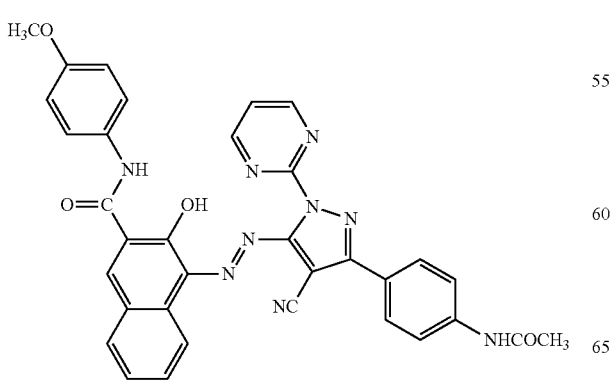
-continued
D-150
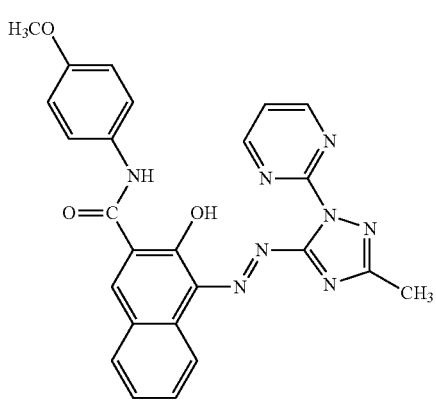
D-151
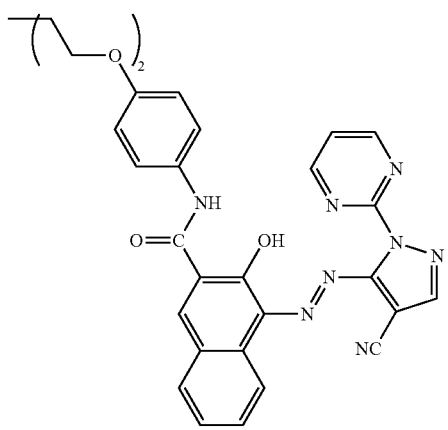
D-152
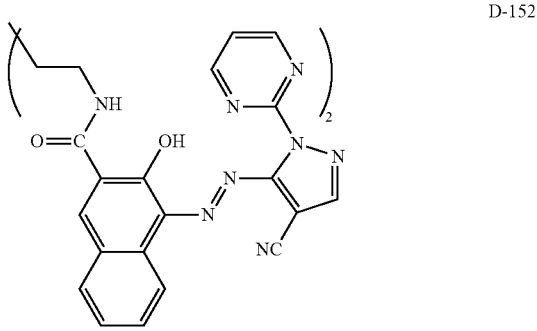

D-153
D-154
D-155
D-156
D-157
D-171
D-172
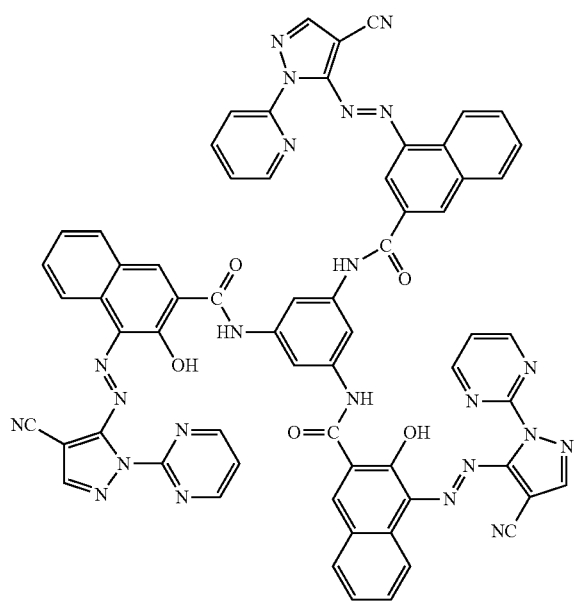
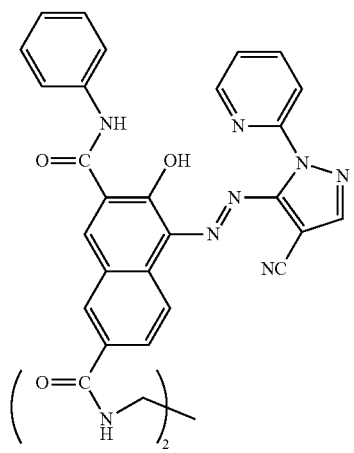
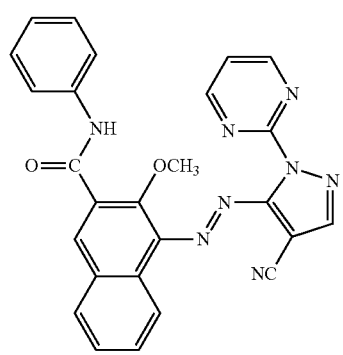
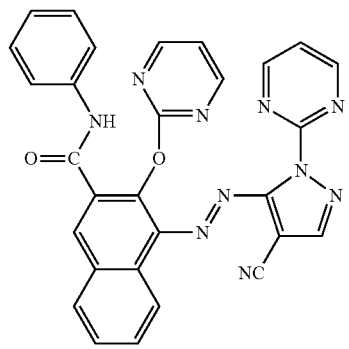

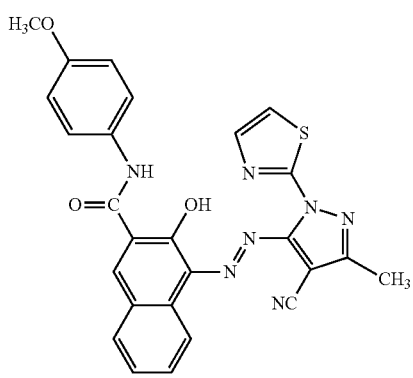
D-173
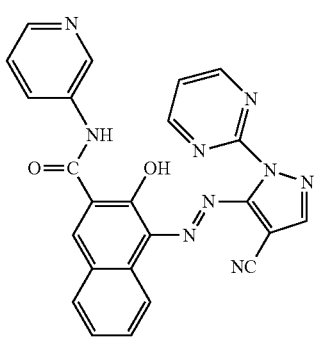
D-177
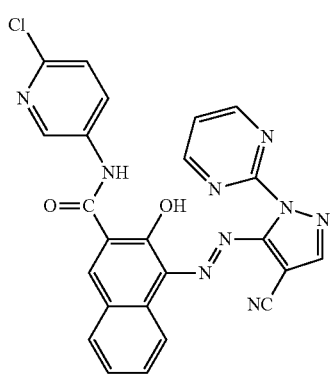
D-174
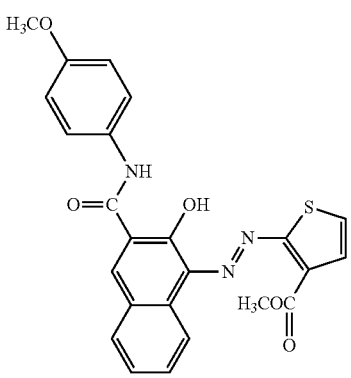
D-201
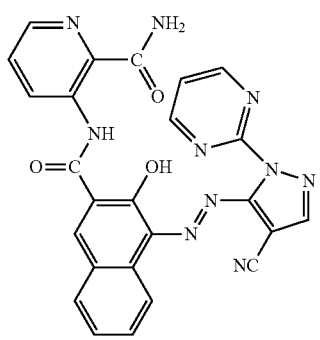
D-175
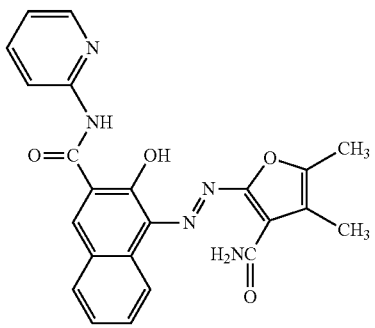
D-202
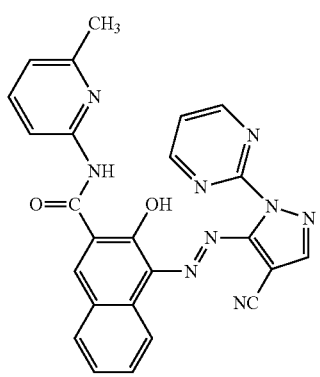
D-176
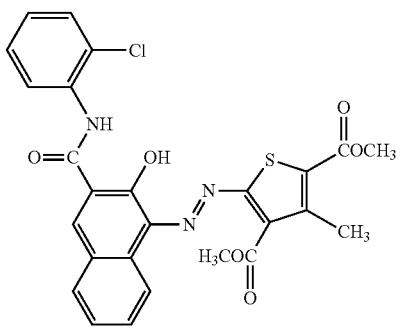
D-203

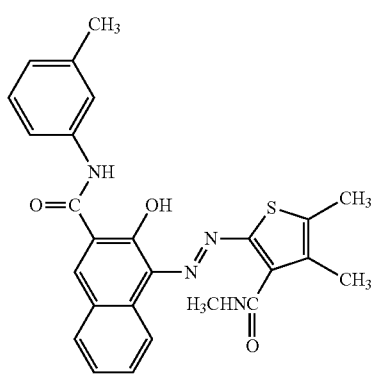
D-204
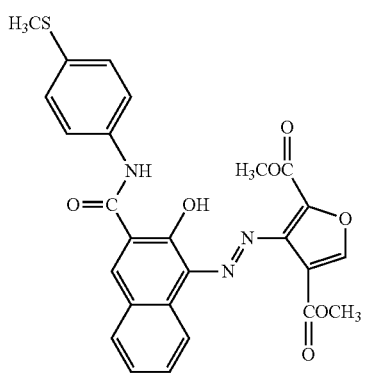
D-205
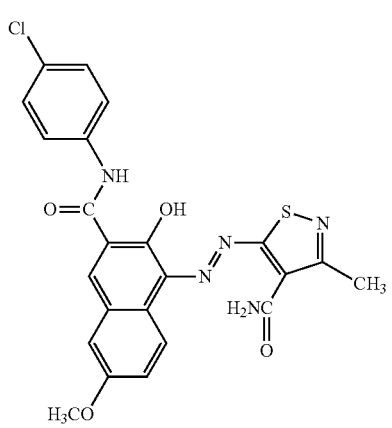
D-206
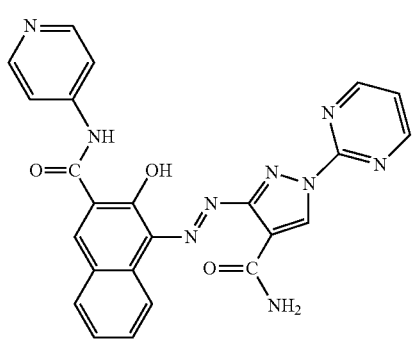
D-207
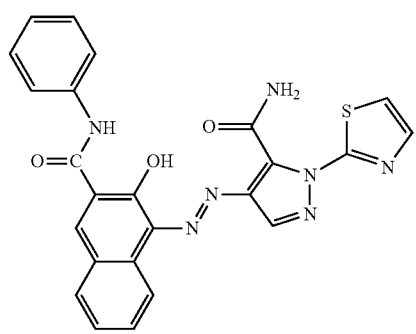
D-208
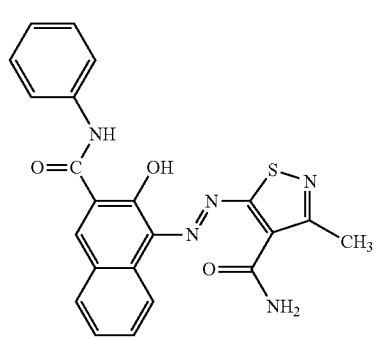
D-209
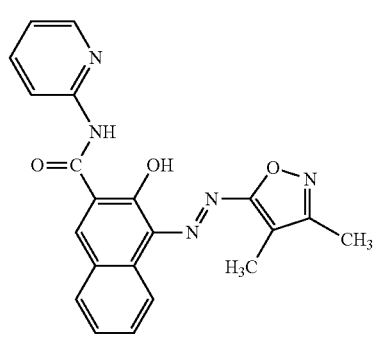
D-210
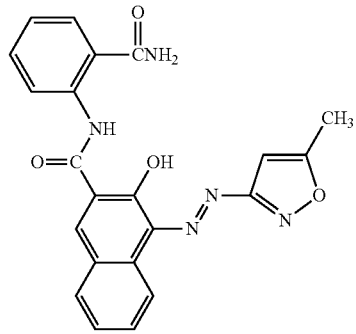
D-211
D-212

D-213
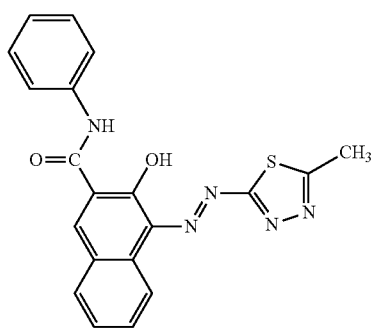
D-214
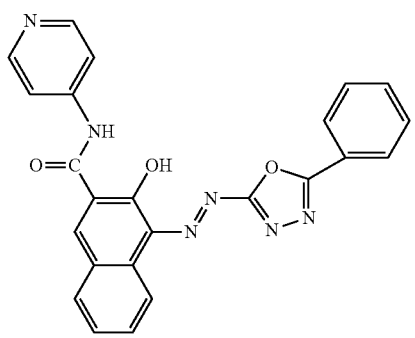
D-215
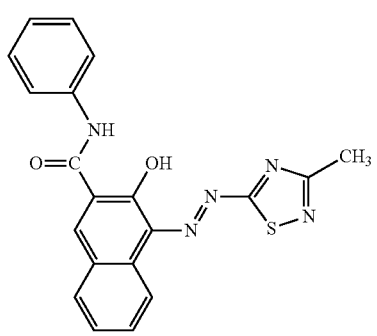
D-216
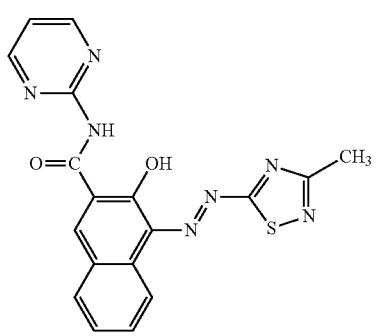
D-217
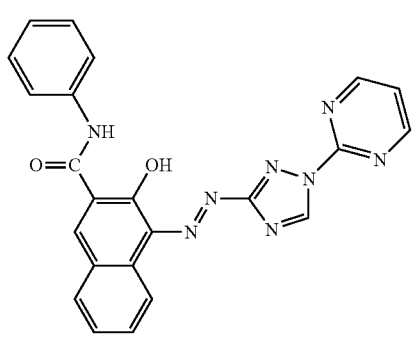
D-218
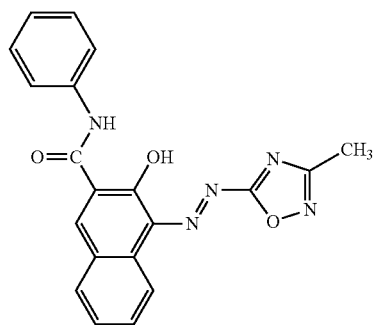
D-219
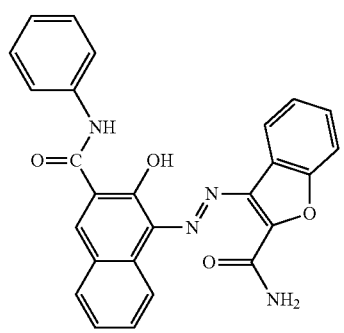
D-220
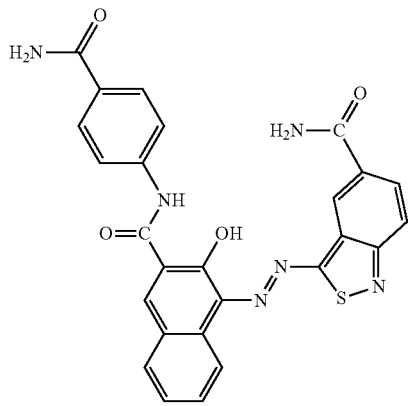
D-221
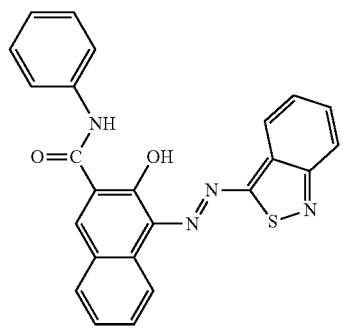

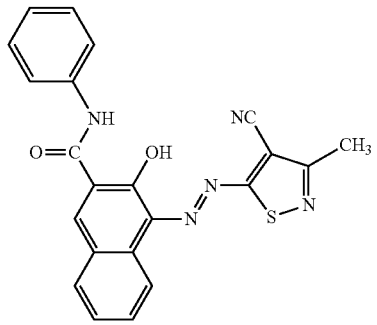
D-222
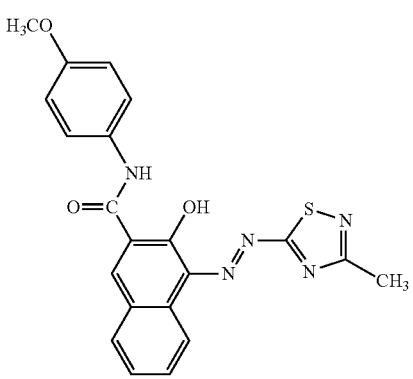
D-226
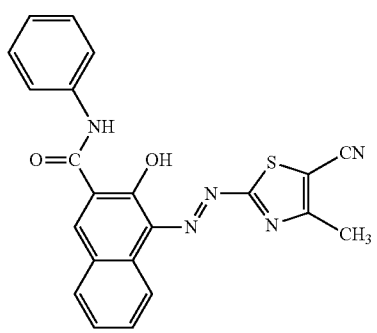
D-223
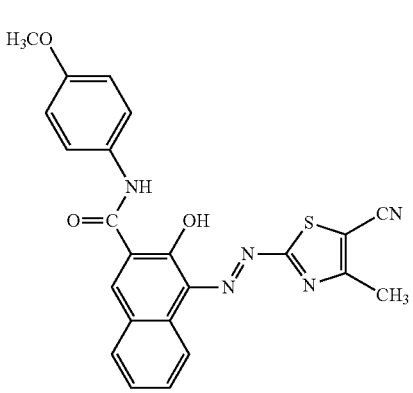
D-227
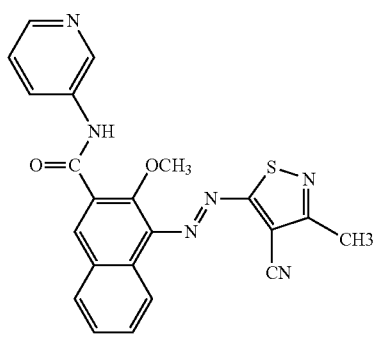
D-224
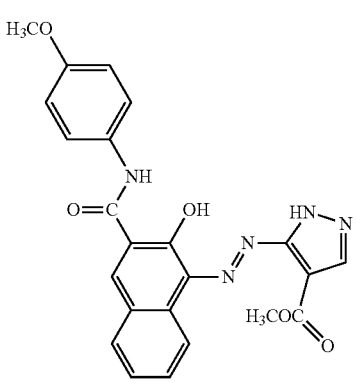
D-228
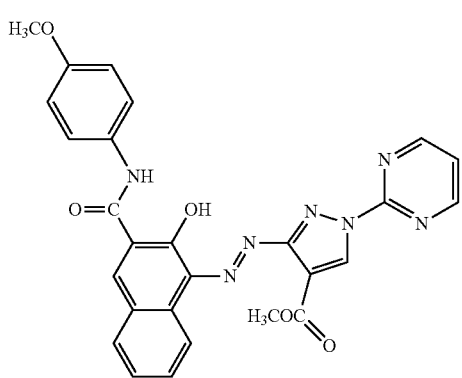
D-225
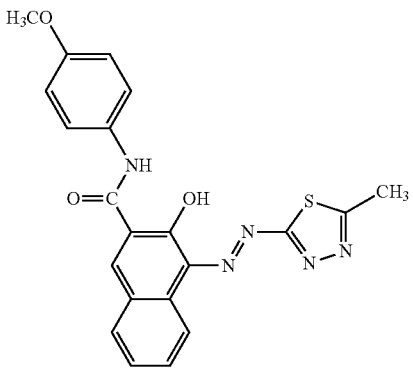
D-229

D-230
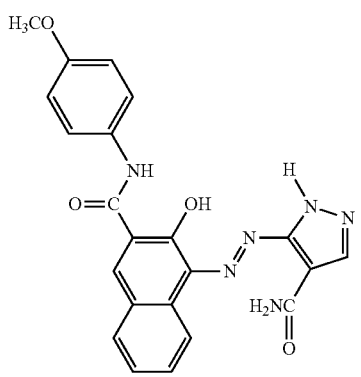
D-231
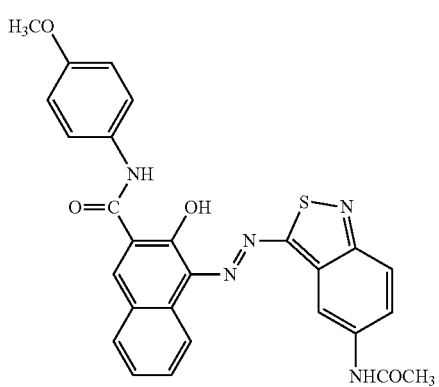
D-232
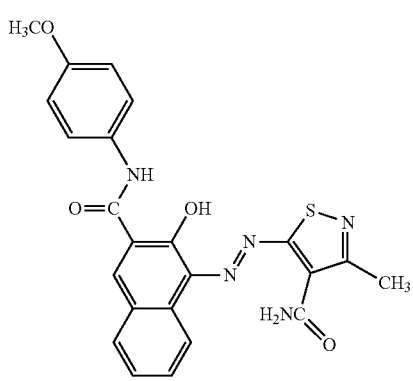
D-233
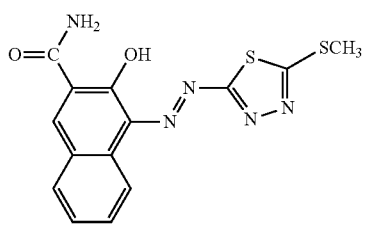
D-234
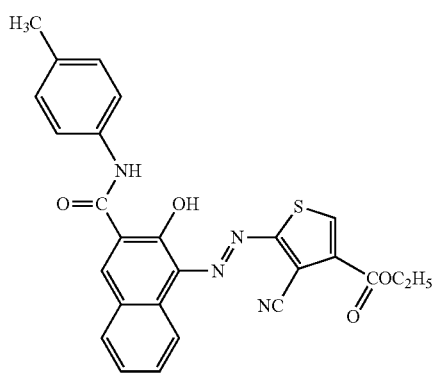
D-235
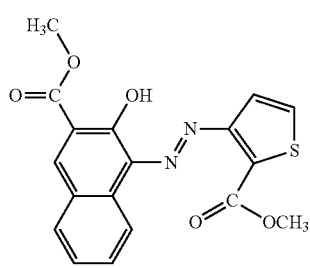
D-236
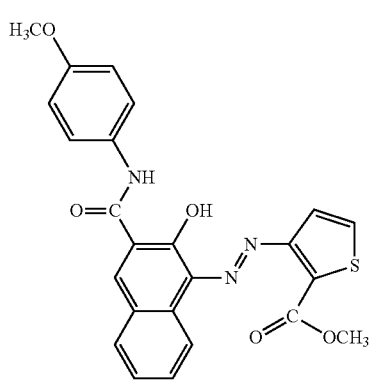
D-237
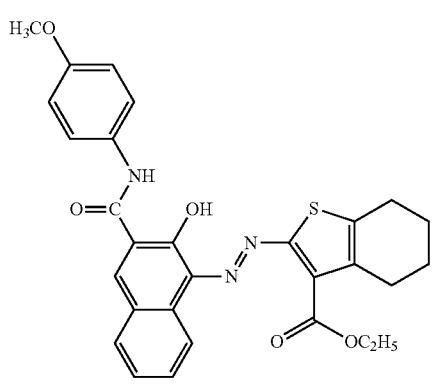

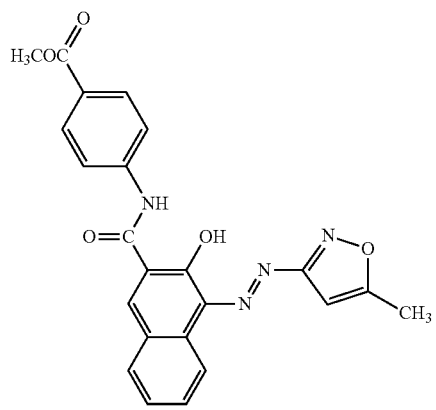
D-238
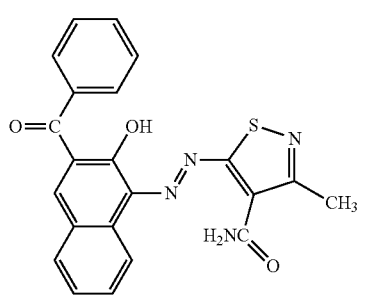
D-242
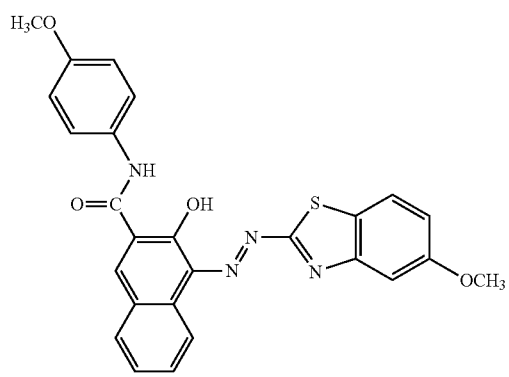
D-239
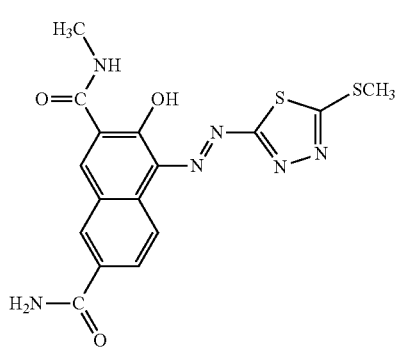
D-243
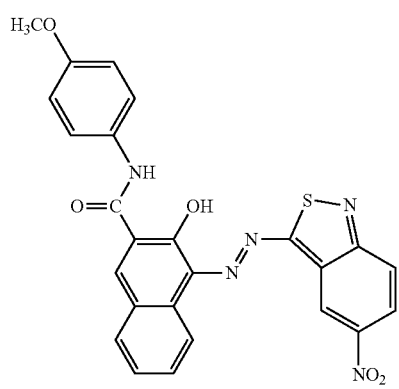
D-240
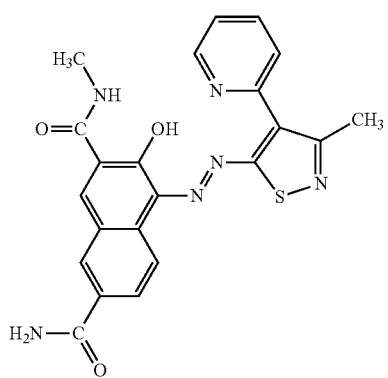
D-244
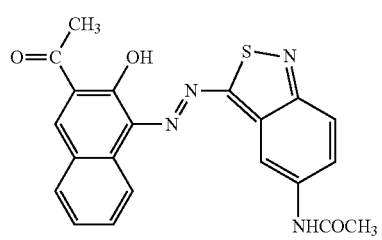
D-241
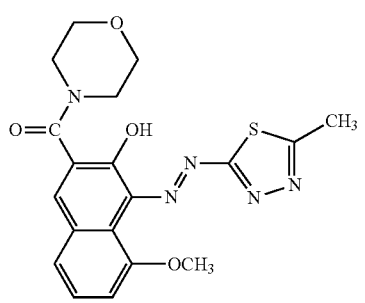
D-245

D-246 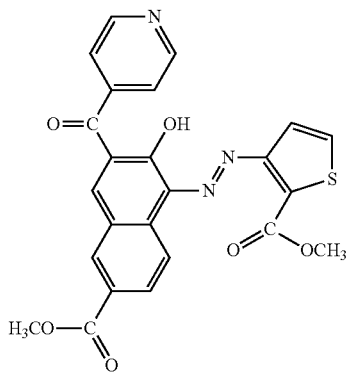
D-247 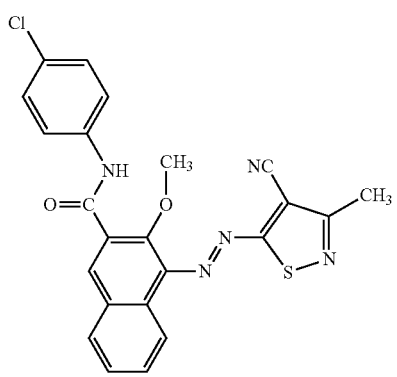
D-251 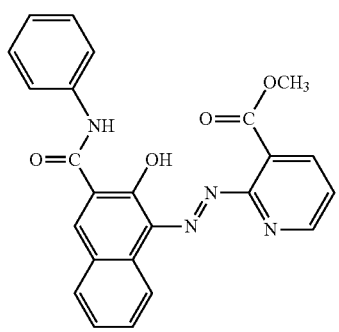
D-252 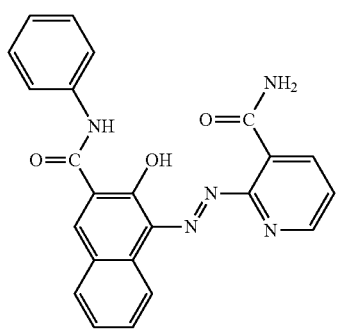
D-253 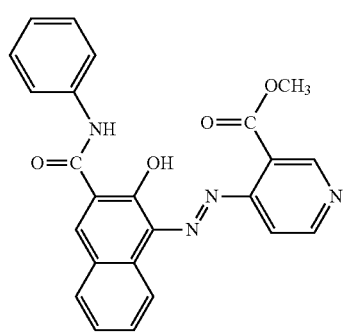
D-254 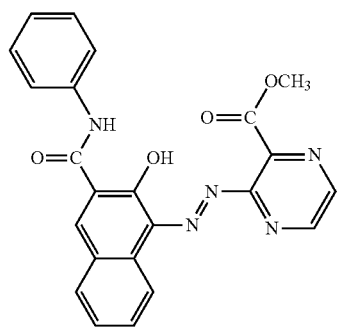
D-255 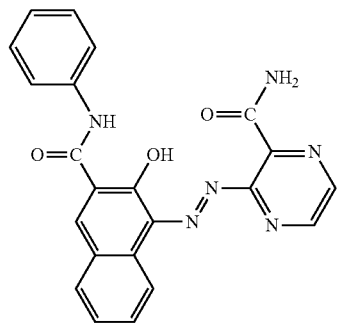
D-256 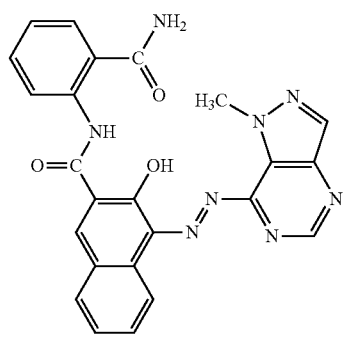
D-257

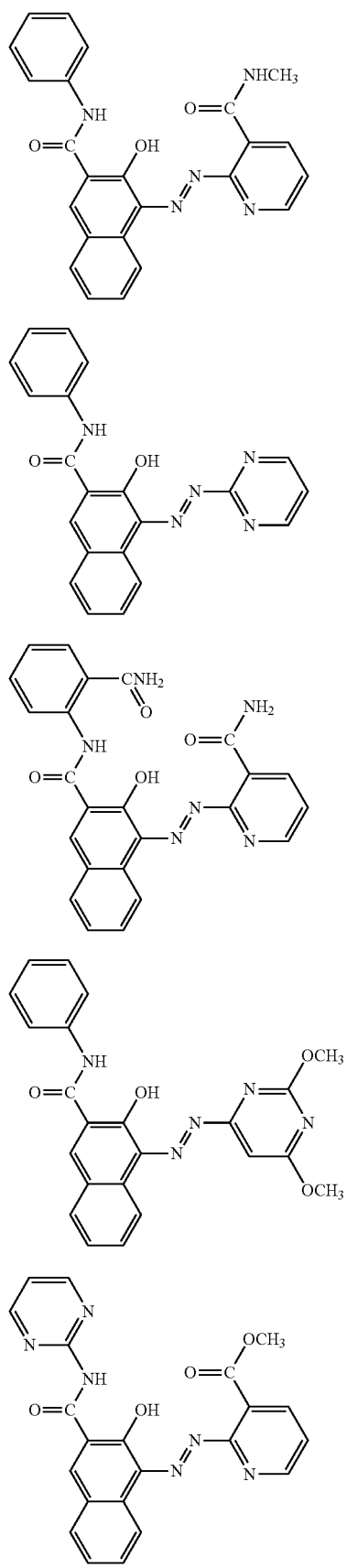
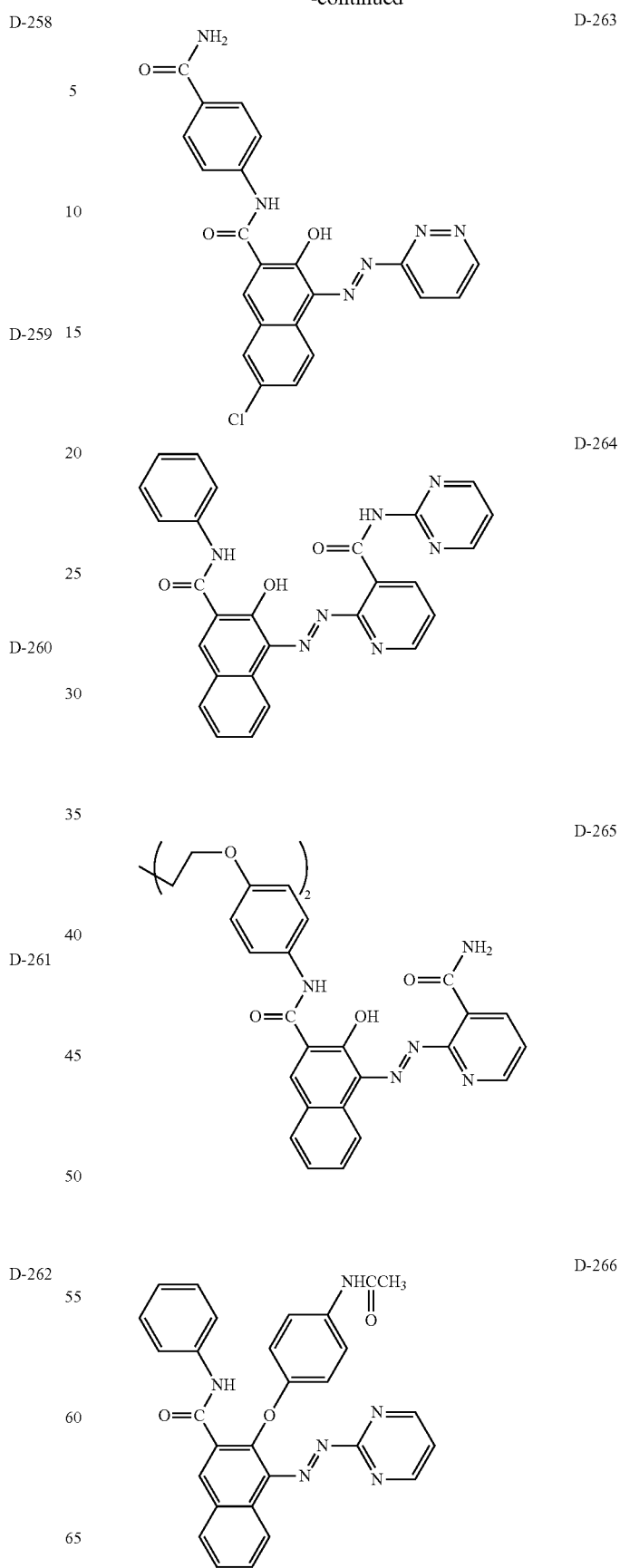

-continued

D-267

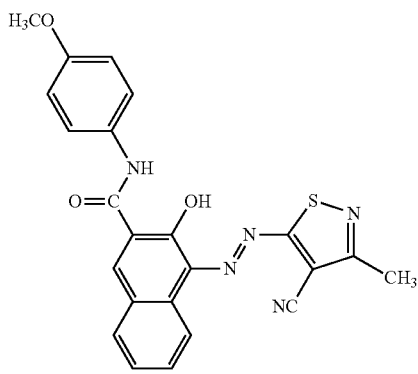

The pigments of the invention represented by the general formula (1) may have a chemical structure represented by the general formula (1) or may be the tautomers thereof, and may be of any crystal form called polymorphic form.

Polymorphism means that crystals having the same chemical composition can be different from each other in the arrangement of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractometry) or by X-Ray Analysis (results of X-ray analysis of crystal structure).

In the case where the pigments of the invention represented by the general formula (1) have polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular mutual action is enhanced, thus a high-level three-dimensional network being easily formed. As a result, hue is improved, and performances required for pigments, such as light fastness, heat fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement of solid such as X-ray crystal structure analysis of single crystal, powder X-ray diffractometry (XRD), microscopic photography of the crystals (TEM), or IR (KBr method).

Control of the above-described tautomerism and/or polymorphism may be achieved by controlling production conditions upon coupling reaction.

Also, with those which have acid groups among the azo pigments of the invention represented by the general formula (1), part or all of the acid groups may be in a salt form, or the pigment may be a mixture of a salt type pigment and a free acid type pigment. Examples of the above-described salt type include salts of an alkali metal such as Na, Li, or K, salts of ammonium optionally substituted by an alkyl group or by a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

In the invention, the azo pigments represented by the foregoing general formula may be hydrates which contain water molecules within the crystal.

Next, the production processes of the invention will be described.

The production process of the invention is a process for producing an azo pigment represented by the general formula (1), which is characterized by including a step of preparing a solution containing a compound represented by the foregoing general formula (2) and an acid, and a step of conducting azo coupling by bringing the aforesaid solution into contact with a diazonium salt derived from a heterocyclic amine.

[A Step of Preparing a Solution Containing a Compound Represented by the Foregoing General Formula (2) and an Acid]

As a solvent to be used for preparing the aforesaid solution, there are illustrated, for example, aqueous solvents, alcohol compound solvents, amide compound solvents, ketone compound solvents, ether compound solvents, aromatic compound solvents, carbon disulfide solvent, aliphatic compound solvents, nitrile compound solvents, sulfoxide compound solvents, halogen compound solvents, ester compound solvents, amide compound solvents, and mixtures thereof. Aqueous solvents, alcohol compound solvents, ester compound solvents, sulfoxide compound solvents, and amide compound solvents are preferred, aqueous solvents, sulfoxide compound solvents, and amide compound solvents are more preferred, and sulfoxide compound solvents and amide compound solvents are particularly preferred.

Of them, DMAc, NMP (N-methyl-2-pyrrolidone), DMSO (dimethylsulfoxide), methanol, ethanol, isopropanol, acetone, acetonitrile, acetic acid, pyridine, and 1-methoxy-2-propanol are preferred, with NMP (N-methyl-2-pyrrolidone), DMSO (dimethylsulfoxide), and 1-methoxy-2-propanol being more preferred. The solvents may be used alone or in combination of several kinds thereof and, in the case where a plurality of solvents are used in combination for use as a mixed solvent, it is preferred to select an amide series solvent such as NMP, an alcohol series solvent such as methanol, and MFG to use in combination. Specifically, it is more preferred to use a mixed solvent of NMP and MGF or a mixed solvent of DMSO and MFG.

As an acid to be used for preparing the aforesaid solution, there are illustrated inorganic acids such as sulfuric acid, hydrochloric acid, and phosphoric acid and organic acids such as acetic acid, trifluoroacetic acid, oxalic acid, methanesulfonic acid, trifluoromethanesulfonic acid, and p-toluenesulfonic acid. Acetic acid, phosphoric acid, sulfuric acid, and methanesulfonic acid are preferred, sulfuric acid and phosphoric acid are more preferred, and phosphoric acid is still more preferred.

The addition amount of the acid is not particularly limited and, regardless of whether the acid is an inorganic acid or an organic acid, the amount is preferably from 0.1 to 30 mol equivalent, more preferably from 0.5 to 20 mol equivalent, particularly preferably from 0.5 to 10 mol equivalent, with respect to the compound represented by the general formula (2).

Preparation of the aforesaid solution may be conducted either by adding the acid to a solution containing the compound represented by the general formula (2) or by adding the compound represented by the general formula (2) to a solution containing the acid but, preferably, the acid is added to a solution containing the compound represented by the general formula (2).

By adding the acid to a solution containing the compound represented by the general formula (2) prior to azo coupling reaction, there can be obtained an α-form (to be described hereinafter) which is a preferred embodiment of the compound represented by the general formula (1) in high yield, whereby number of steps such as a crystal-converting step can be reduced.

In the process for producing an azo pigment, the aforesaid heterocyclic amine is preferably a compound represented by the following formula (7), the compound represented by the foregoing general formula (2) is preferably a compound represented by the following formula (8), and the compound represented by the foregoing general formula (1) is preferably a compound represented by the following formula (9).

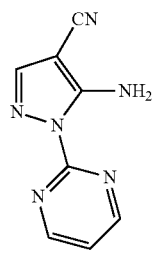

(7)

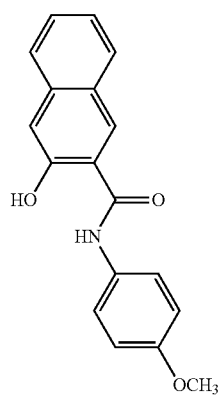

(8)

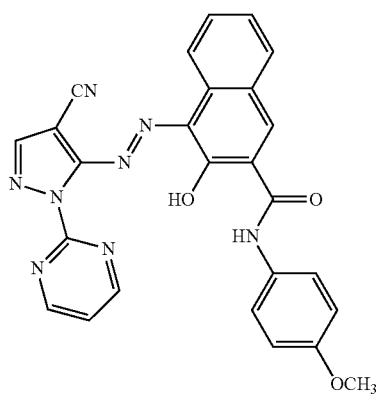

(9)

In view of hue, the azo pigment represented by formula (9) is more preferably an azo pigment (hereinafter also referred to as "α-form") having characteristic peaks at Bragg angles (2θ±0.5°) of 7.1°, 25.3°, 26.0°, and 27.2 in X-ray diffraction with characteristic Cu Kα line.

In the production process of the invention, it is preferred for the solution containing the compound represented by the general formula (2) and the acid to further contain a compound represented by the general formula (3a). When the aforesaid solution contains a compound represented by the general formula (3a), dispersibility can be improved. The reason for this is that a colorant compound formed by azo coupling of the compound represented by the general formula (3a) suppresses growth of crystals, thus a fine particle product being able to be obtained. Further, in the case where the compound represented by the general formula (3a) has a hydrophilic group such as a sulfonic acid group, the compound acts as a dispersing aid, and can impart more dispersibility.

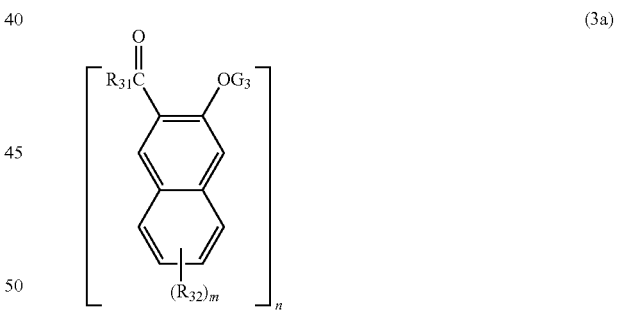

(3a)

$G_3$ represents a hydrogen atom, an aliphatic group, an aryl group, or a heterocyclic group. $R_{31}$ represents an amino group, an aliphatic oxy group, an aliphatic group, an aryl group, or a heterocyclic group. $R_{32}$ represents a substituent. m represents an integer of from 0 to 5, and n represents an integer of from 1 to 4. When n=2, the general formula (3a) represents a dimer formed through $R_{31}$, $R_{32}$, or $G_3$. When n=3, the general formula represents a trimer formed through $R_{31}$, $R_{32}$, or $G_3$. When n=4, the general formula represents a tetramer formed through $R_{31}$, $R_{32}$, or $G_3$.

Illustrative examples of $G_3$, $R_{31}$, $R_{32}$, m, and n are the same as those for $G_3$, $R_{31}$, $R_{32}$, m, and n in the general formula (1).

$G_3$ is preferably an aliphatic group, an aryl group, a heterocyclic group, or a hydrogen atom, more preferably a hydrogen atom.

$R_{31}$ is preferably an amino group, an aliphatic oxy group, an aliphatic group, an aryl group, or a heterocyclic group, more preferably an amino group.

$R_{32}$ is preferably an aliphatic group, a carbamoyl group, or an alkoxy group, more preferably an alkoxy group.

m is preferably from 0 to 2, more preferably 0.

n is preferably 1 or 2, more preferably 1.

The molecular weight of $R_{31}$ in the compound represented by the general formula (3a) is preferably from 100 to 2000, more preferably from 140 to 1000, particularly preferably from 140 to 600. In this case, particularly the effect of suppressing growth of crystals is enhanced, and high dispersibility can be realized.

$R_{31}$ is preferably a substituent containing from 5 to 100 carbon atoms, more preferably a substituent containing from 7 to 50 carbon atoms, still more preferably a substituent containing from 8 to 20 carbon atoms $R_{31}$ is preferably a bulky substituent and is illustrated by, for example, a carbazolamino group, a benzimidazolyl group, a naphthyl group, an anthranyl group, a quinolinyl group, or a t-butyl group. $R_{31}$ is preferably a carbazolamino group, a benzimidazolyl group, a naphthyl group, or a t-butyl group, more preferably a carbazolamino group or a benzimidazolyl group.

Heterylazo pigment derivatives having the bulky substituent are preferred in that the effect of suppressing growth of crystals can be improved by the bulky substituent.

The compounds represented by the foregoing general formula (3a) are preferably compounds represented by the following general formula (3b).

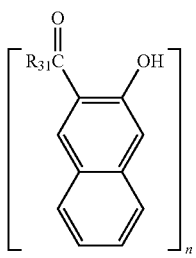

(3b)

$R_{31}$ represents an amino group, an aliphatic oxy group, an aliphatic group, an aryl group, or a heterocyclic group. n represents an integer of from 1 to 4. When n=2, the general formula (3b) represents a dimer formed through $R_{31}$. When n=3, the general formula represents a trimer formed through $R_{31}$. When n=4, the general formula represents a tetramer formed through $R_{31}$.

$R_{31}$ and n are the same as $R_{31}$ and n defined with respect to the general formula (3a).

Additionally, there is no case where the compound represented by the general formula (2) has the same structure as that of the compound represented by the general formula (3a) or the compound represented by the general formula (3b).

Regarding the content of the compound represented by the general formula (3b) or (3a), the content of the compound represented by the general formula (3a) or (3b) is preferably from 0.1% by weight to 30% by weight, more preferably from 1% by weight to 20% by weight, particularly preferably from 3% by weight to 20% by weight, based on the amount of the compound represented by the general formula (2).

In the solution, the compound represented by the general formula (3a) or (3b) may or may not be dissolved, or part of the compound may be dissolved and part thereof may be dispersed.

Specific examples of the compounds represented by the foregoing general formulae (3a) and (3b) will be shown below. However, compounds to be used in the invention are not limited only to the following examples. Also, although the structures of the following specific examples are shown in the form of limiting structure among several tautomer forms which are possible in view of chemical structure, it is needless to say that the compounds may be tautomers of other structure than the shown ones.

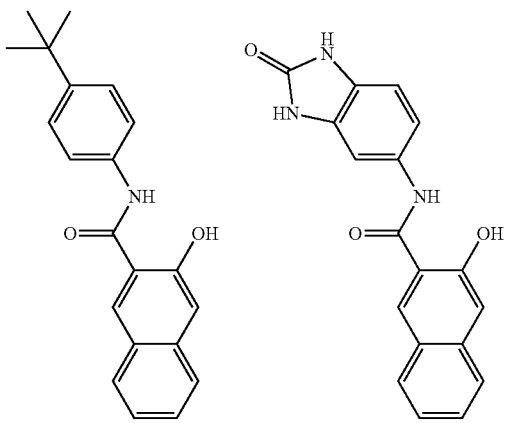

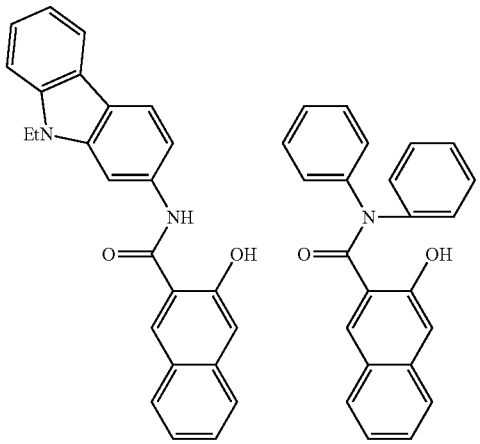

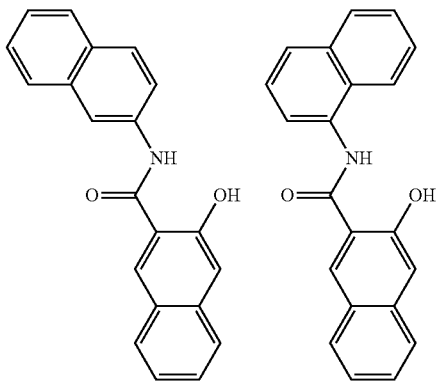

91
-continued
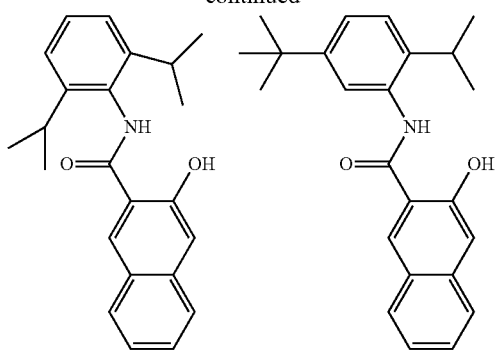
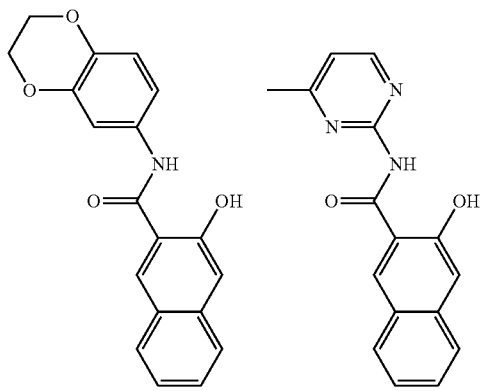
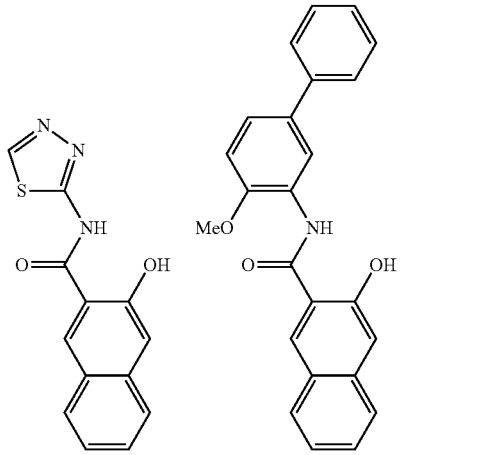
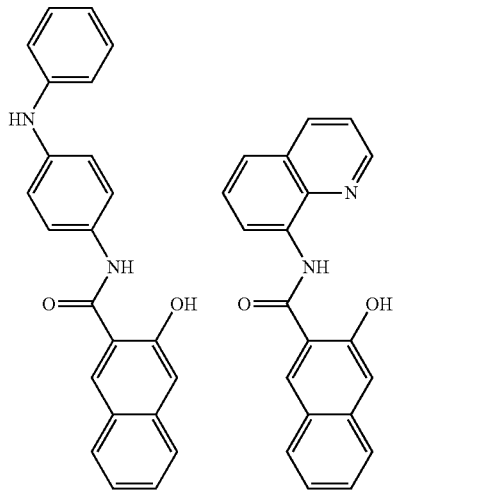
92
-continued
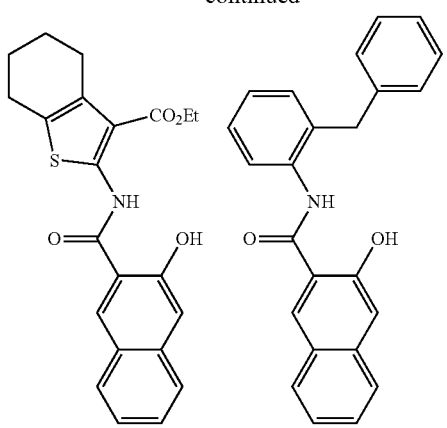
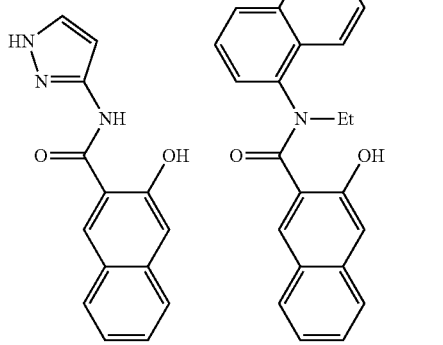
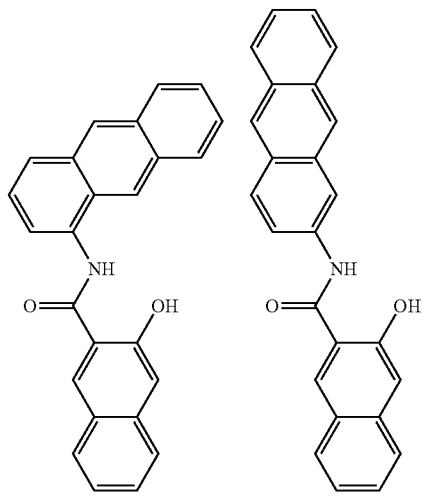
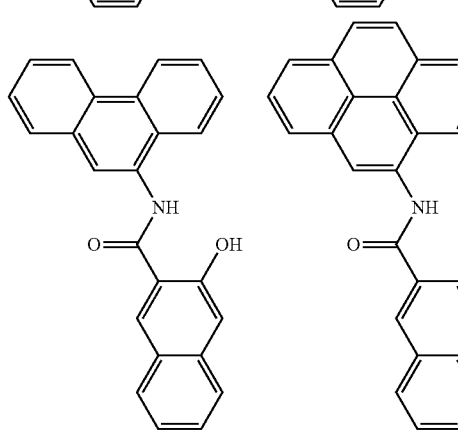

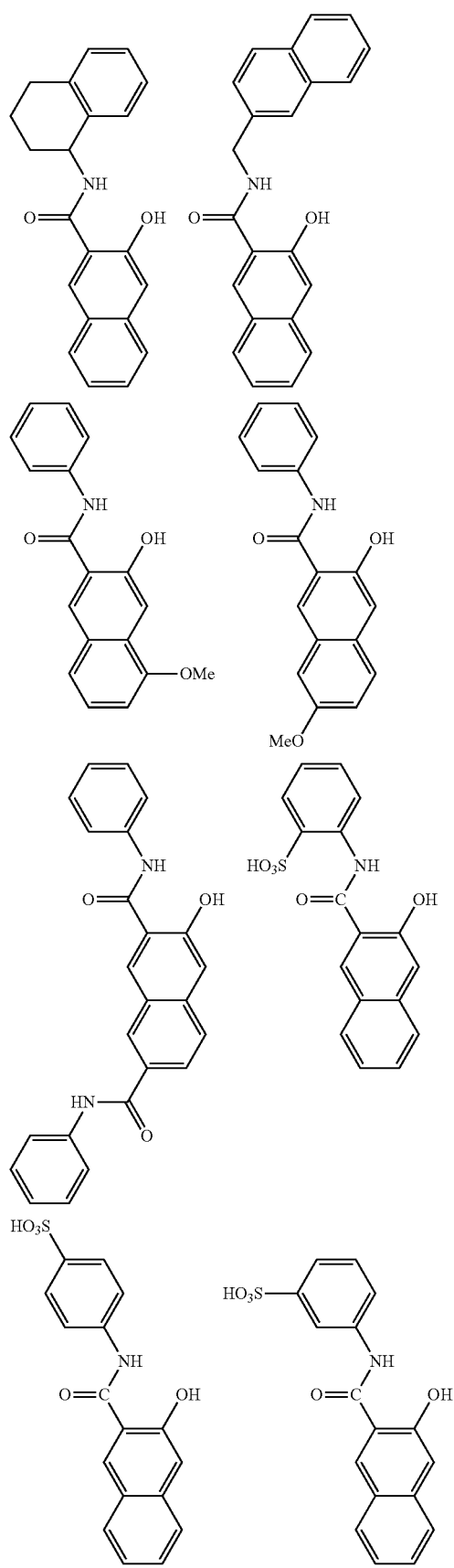
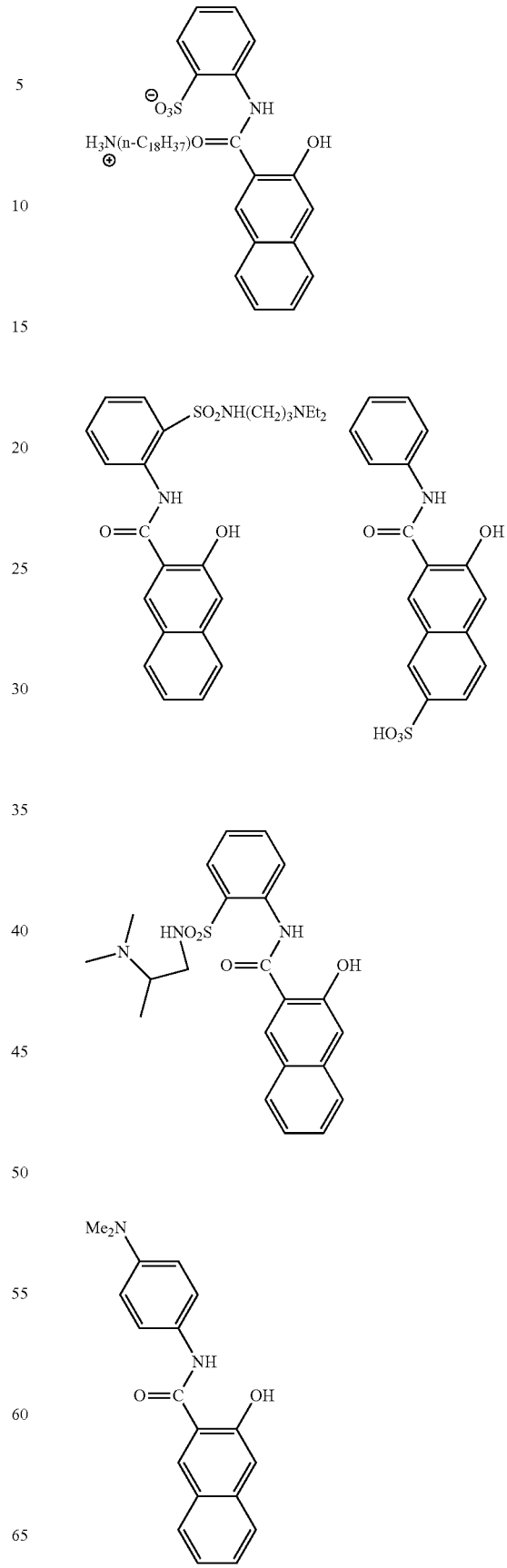

-continued

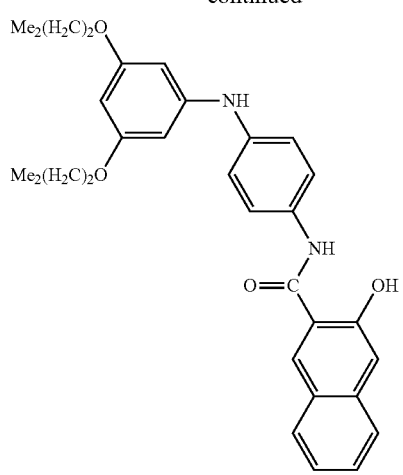

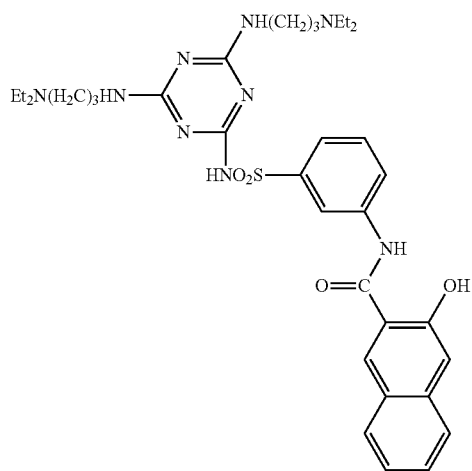

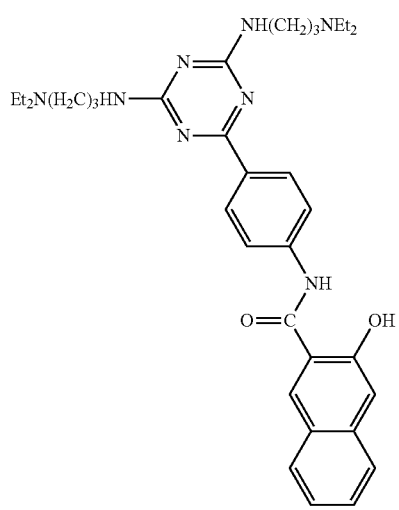

-continued

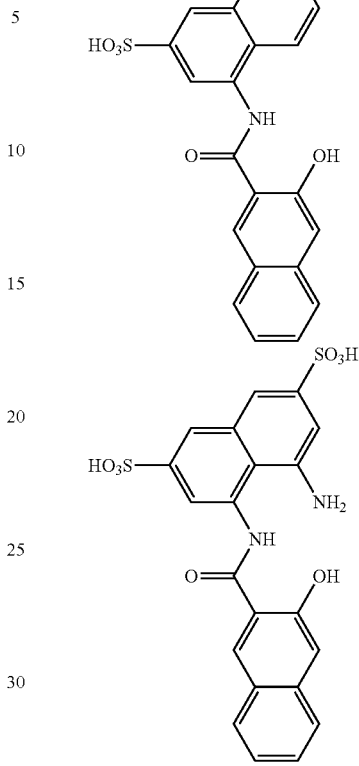

There are no limits as to preparation conditions for the aforesaid solution, and a proper condition may be selected in the range of an ordinary pressure condition, a subcritical condition, and a supercritical condition. The temperature to be selected under ordinary pressure is preferably from −10 to 150° C., more preferably from −5 to 130° C., particularly preferably from 0 to 100° C.

[Diazotization Step]

Preparation of the diazonium salt and coupling reaction between the diazonium salt and the compound represented by formula (2) can be conducted in a conventional manner.

For preparation of the diazonium salt of the heterocyclic amine, there may be applied, for example, a conventional process for preparing a diazonium salt using a nitrosonium ion source such as nitrous acid, nitrite, or nitrosylsulfuric acid in a reaction medium containing an acid (for example, hydrochloric acid, sulfuric acid, phosphoric acid, acetic acid, propionic acid, methanesulfonic acid, or trifluoromethanesulfonic acid).

As examples of more preferred acids, there are illustrated acetic acid, propionic acid, methanesulfonic acid, phosphoric acid, and sulfuric acid, which may be used alone or in combination thereof. Of these, phosphoric acid, a combination of acetic acid and sulfuric acid, a combination of acetic acid and propionic acid, and a combination of acetic acid, propionic acid, and sulfuric acid are more preferred, with a combination of acetic acid and propionic acid and a combination of acetic acid, propionic acid, and sulfuric acid being particularly preferred.

As preferred examples of the reaction medium (solvent), organic acids and inorganic acids are preferred for use and, in particular, phosphoric acid, sulfuric acid, acetic acid, propionic acid, and methanesulfonic acid are preferred, with acetic acid and/or propionic acid being particularly preferred.

As a preferred example of the nitrosonium ion source, use of nitrosylsulfuric acid in a reaction medium containing the above-described preferred acid enables one to prepare the diazonium salt with stability and efficiency.

The amount of the solvent to be used is preferably from 0.5- to 50-fold amount by weight, more preferably from 1- to 20-fold amount by weight, particularly preferably from 3- to 15-fold amount by weight, based on the amount of a diazo component.

In the invention, the diazo component of formula (2) may be in a state of being dispersed in the solvent or, with some kinds of the diazo components, in a state of a solution.

The amount of the nitrosonium ion source to be used is preferably from 0.95 to 5.0 mol equivalent weight, more preferably from 1.00 to 3.00 mol equivalent weight, particularly preferably from 1.00 to 1.10 equivalent weight, in terms of the diazo component.

The reaction temperature is preferably from −15° C. to 40° C., more preferably from −5° C. to 35° C., still more preferably from 0° C. to 30° C. When the reaction temperature is lower than −15° C., the reaction rate become seriously small, and the time required for the synthesis become seriously prolonged, thus such temperature not being economically advantageous and, when the synthesis is conducted at a temperature higher than 40° C., the amount of produced by-products increases, thus such temperature being preferred.

The reaction time is preferably from 30 minutes to 300 minutes, more preferably from 30 minutes to 200 minutes, still more preferably from 30 minutes to 150 minutes.

[Coupling Reaction Step]

The coupling reaction step can be conducted in an acidic reaction medium to a basic reaction medium. Preferably, however, for the azo pigment of the invention, the coupling reaction step is conducted in an acidic to neutral reaction medium. In particular, when conducted in an acidic reaction medium, the coupling reaction gives an azo pigment with good efficiency and suppressed decomposition of the diazonium salt.

As preferred examples of the reaction medium (solvent), organic acids, inorganic acids, and organic solvents may be used, with organic solvents being particularly preferred. Those solvents are preferred which, upon reaction, do not cause liquid separation phenomenon but form a uniform solution with the solvent. Examples thereof include alcoholic organic solvents such as methanol, ethanol, propanol, isopropanol, butanol, t-butyl alcohol, and amyl alcohol; ketone series organic solvents such as acetone and methyl ethyl ketone; diol series organic solvents such as ethylene glycol, diethylene glycol, triethylene glycol, propylene glycol, dipropylene glycol, and 1,3-propanediol; ether series organic solvents such as ethylene glycol monomethyl ether, ethylene glycol monoethyl ether, and ethylene glycol diethyl ether; tetrahydrofuran; dioxane; and acetonitrile. These solvents may be a mixture of two or more thereof.

Organic solvents having a polarity parameter (ET) of 40 or more are preferred. Of them, glycol series solvents having two or more hydroxyl groups in the molecule thereof, alcoholic solvents containing 3 or less carbon atoms, and ketone series solvents containing a total of 5 or less carbon atoms are more preferred, with alcoholic solvents containing 2 or less carbon atoms (for example, methanol and ethylene glycol) and ketone series solvents containing a total of 4 or less carbon atoms (for example, acetone and methyl ethyl ketone) being still more preferred. Mixed solvents thereof are also included.

The amount of the solvent to be used is preferably from 1- to 100-fold amount by weight, more preferably from 1- to 50-fold amount by weight, still more preferably from 2- to 30-fold amount by weight, based on the coupling component represented by the above formula (2).

In the invention, the coupling component of formula (2) may be in a state of being dispersed in the solvent or, with some kinds of the coupling components, in a state of a solution.

The amount of the coupling component to be used is preferably from 0.95 to 5.0 equivalent weight, more preferably from 1.00 to 3.00 equivalent weight, particularly preferably from 1.00 to 1.50 equivalent weight, in terms of the diazo coupling moiety.

The reaction temperature is preferably from −30° C. to 30° C., more preferably from −15° C. to 10° C., still more preferably from −10° C. to 5° C. In case when the reaction temperature is lower than −30° C., the reaction rate becomes so small that the time required for the synthesis becomes seriously prolonged, thus such temperature not being preferred in view of production cost whereas, in case when the synthesis is conducted at a temperature higher than 30° C., the amount of produced by-products is increased, thus such temperature not being preferred. The reaction time is preferably from 30 minutes to 300 minutes, more preferably from 30 minutes to 200 minutes, still more preferably from 30 minutes to 150 minutes.

After completion of the reaction, urea or the like may or may not be added in order to quench the diazonium salt.

In the process of the invention for synthesizing the azo pigment, the product obtained by these reactions (crude azo pigment) may be used after being treated according to an after-treatment for common organic synthesis reactions and after or without being purified.

That is, a product isolated from the reaction system may be used without purification or after being subjected to purifying through a single operation of, or a combination of, recrystallization, salt formation, etc.

Also, after completion of the reaction, the reaction solvent may or may not be distilled off, the reaction product may be poured into water or ice-water, the resulting solution may or may not be neutralized, and the liberated portion or the extract obtained by extracting with an organic solvent/water solution may or may not be purified through a single operation of, or a combination of, recrystallization, crystallization, salt formation, etc. to use.

The process for synthesizing the azo pigment of the invention will be described in more detail below.

The production process of the invention includes a step of preparing a solution containing a compound represented by the foregoing general formula (2) and an acid, and a step of conducting azo coupling by bringing the aforesaid solution into contact with a diazonium salt derived from a heterocyclic amine.

For example, the azo pigment represented by the general formula (6) can be produced by diazotizing a heterocyclic amine represented by the following general formula (4) under an acidic condition, subjecting the resulting diazonium salt with a compound represented by the following general formula (5) in an acidic condition, and conducting conventional after-treatment. Azo pigments represented by the general formula (1) can be produced by conducting the similar procedures using a heterocyclic amine corresponding to A in the general formula (1) in place of the compound of the general formula (4).

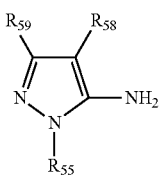

(4)

In the above formula, $R_{55}$, $R_{58}$, and $R_{59}$ are the same as those defined with respect to the foregoing general formula (1).

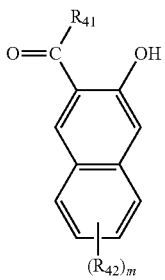

(5)

In the above formula, $R_{41}$, $R_{42}$, and m are the same as $R_{21}$, $R_{22}$, and m defined with respect to the foregoing general formula (1).

The reaction scheme is shown below.

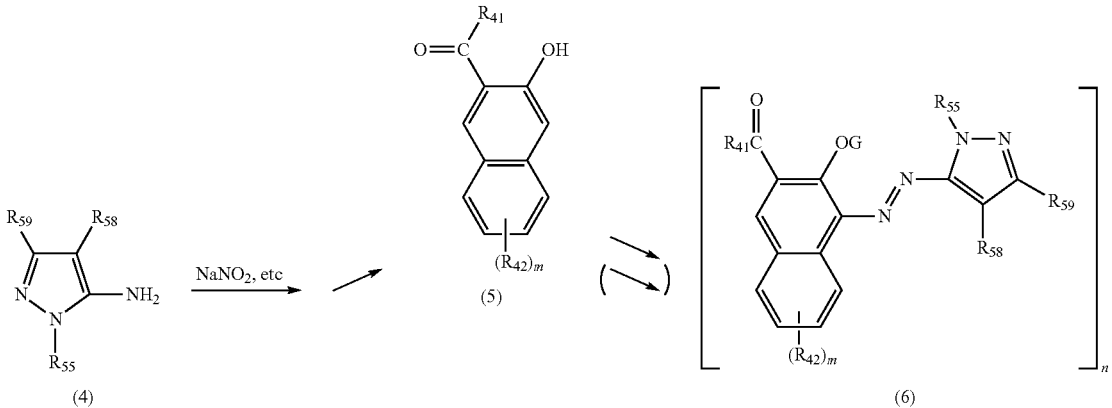

In the above formulae, G, $R_{41}$ to $R_{42}$, $R_{55}$, $R_{58}$, $R_{59}$, n, and m are the same as $G_2$, $R_{21}$ to $R_{22}$, $R_{55}$, $R_{58}$, $R_{59}$, n, and m defined with respect to the foregoing general formula (1) and the general formula (2).

Some of the heterocyclic amine corresponding to the amino compound of the above general formula (4), and (A-1) to (A-32) may be commercially available but, generally, the heterocyclic amines may be produced in a conventionally known manner by, for example, the process described in Japanese Patent No. 4,022,271. The heterocyclic coupler represented by the above general formula (5) is commercially available, or can be produced by, or according to, the processes described in JP-A-2008-13472. The diazotization reaction of the heterocyclic amine shown by the above-described reaction scheme can be conducted, for example, by reacting it with a reagent such as sodium nitrite, nitrosylsulfuric acid, or isoamyl nitrite in an acidic solvent such as sulfuric acid, phosphoric acid, acetic acid, hydrochloric acid, or a mixed solvent thereof at a temperature of 15° C. or less for about 10 minutes to about 6 hours. The coupling reaction is preferably conducted by reacting the diazonium salt obtained by the above-mentioned process with the compound represented by the above general formula (5) at 40° C. or less, preferably 25° C. or less, for about 10 minutes to about 12 hours.

Regarding synthesis of the azo pigments of the general formula (1) wherein n is 2 or more, they can be synthesized in the same manner as in the aforesaid scheme by synthesizing a raw material wherein a substitutable divalent, trivalent, or tetravalent substituent is introduced into $R_{41}$ to $R_{42}$, $R_{55}$, $R_{58}$, $R_{59}$, and the like in the general formula (4) or (5).

The thus-obtained reaction product may form precipitated crystals but, in general, water or an alcoholic solvent is added to the reaction solution to thereby precipitate crystals, and the precipitated crystals can be collected by filtration. Also, an alcoholic solvent, water, or the like may be added to the reaction solution to thereby precipitate crystals, and the precipitated crystals can be collected by filtration. The crystals thus collected by filtration are washed and dried, as needed, to obtain the azo pigment represented by the general formula (1).

Methods for collecting the precipitated crystals by filtration are not particularly limited, and there can be employed known methods such as suction filtration, filter press, cylinder press, decanter, centrifuge, and filtration centrifuge.

As a method for drying the crystals collected by filtration, there can be employed a method such as an air-blowing drier, a freeze-drying method, etc.

The pigments represented by the above-described general formula (1) are obtained as a crude azo pigment (crude) by the above-described production process. In the case of using them as the pigments of the invention, they are preferably subjected to after-treatment. As methods of the after-treatment, there are illustrated, for example, a pigment particle-controlling step such as milling treatment (e.g., solvent-salt milling, salt milling, dry milling, solvent milling, or acid pasting) or solvent heating treatment; and a surface-treating step using, for example, a resin, a surfactant, or a dispersant.

The pigments of the invention represented by the general formula (1) are preferably subjected to the solvent heating treatment and/or the solvent-salt milling as the after-treatment.

As a solvent to be used in the solvent heating treatment, there are illustrated, for example, water; aromatic hydrocarbon series solvents such as toluene and xylene; halogenated hydrocarbon series solvents such as chlorobenzene and o-dichlorobenzene; alcoholic solvents such as isopropanol and isobutanol; polar aprotic organic solvents such as N,N-dimethylformamide, N,N-dimethylacetamide, and N-methyl-2-pyrrolidone; glacial acetic acid; pyridine; and a mixture thereof. An inorganic or organic acid or base may further be added to the above-described solvents. The temperature of the solvent heating treatment varies depending upon the desired primary particle size of the pigment, but is preferably from 40 to 150° C., more preferably from 60 to 100° C. Also, the treating time is preferably from 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the above-described inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 µm. The amount of the inorganic salt to be used is preferably a 3- to 20-fold amount by weight, more preferably a 5- to 15-fold amount by weight, based on the crude azo pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount based on the amount of the crude azo pigment. The kneading temperature is preferably from 20 to 130° C., particularly preferably from 40 to 110° C. As a kneader, there can be used, for example, a kneader and a mix muller.

[Pigment Dispersion]

The pigment dispersion of the invention is characterized in that it contains at least one of the azo pigments represented by the general formula (1), the tautomers of the azo pigments, and the salts or hydrates thereof. Thus, there can be obtained a pigment dispersion having excellent coloring characteristics, fastness, and dispersion stability.

The pigment dispersion of the invention may be aqueous or non-aqueous, but is preferably aqueous pigment dispersion. As the aqueous liquid for dispersing the pigment in the aqueous pigment dispersion of the invention, a mixture containing water as a major component and, as needed, a hydrophilic organic solvent can be used.

Examples of the aforesaid hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

In the case where the aqueous pigment dispersion in the invention contains the aqueous resin, the content is not particularly limited. For example, the content may be from 0 to 100% by weight based on the weight of the pigment.

Further, in order to improve dispersibility of the pigment and quality of image, a surfactant and a dispersant may be used. As the surfactant, there are illustrated anionic, nonionic, cationic, and amphoteric surfactants, and any of them may be used. However, anionic or nonionic surfactants are preferred to use.

In the case where the aqueous pigment dispersion in the invention contains the surfactant, the content is not particularly limited. For example, the content may be from 0 to 100% by weight based on the weight of the pigment.

Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion of the invention includes the pigment represented by the foregoing general formula (1) dispersed in a non-aqueous vehicle. Examples of resin to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photo-curable resin as the non-aqueous vehicle.

Examples of the solvents to be used in the non-aqueous vehicles include aromatic solvents such as toluene, xylene, and methoxybenzene; acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

[Coloring Composition]

The coloring composition of the invention means a coloring composition containing at least one kind of the azo pigments of the invention. The coloring composition of the invention can contain a medium and, in the case where a solvent is used as the medium, the composition is particularly appropriate as an ink for inkjet recording. The coloring composition of the invention can be prepared by using an oleophilic medium or an aqueous medium as the medium and dispersing the azo pigment of the invention in the medium. Preferably, the aqueous medium is used as the medium. The coloring composition of the invention includes an ink composition excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersant, a dispersion stabilizer, a rust inhibitor, and a chelating agent. In the case of water-soluble ink compositions, these various additives are added directly to the ink solution. In the case of oil-soluble ink compositions, it is general to add to a dispersion after preparing the azo pigment dispersion, but they may be added to an oil phase or an aqueous phase upon preparation.

[Ink for Inkjet Recording]

Next, the ink of the invention for inkjet recording will be described below. The ink of the invention for inkjet recording (hereinafter also referred to as "ink") contains the pigment dispersion described above, and is preferably prepared by mixing with a water-soluble solvent, water, or the like. However, in the case where no particular problems are involved, the pigment dispersion of the invention described above may be used as such.

In view of hue, color density, saturation, and transparency of an image formed on a recording medium, the content of the pigment dispersion in the ink of the invention is in the range of preferably from 1 to 100% by weight, particularly preferably from 3 to 20% by weight, most preferably from 3 to 10% by weight.

The azo pigment or azo compound of the invention is contained in an amount of preferably from 0.1 part by weight to 20 parts by weight, more preferably from 0.2 part by weight to 10 parts by weight, still more preferably from 1 to 10 parts by weight, in 100 parts by weight of the ink of the invention. Also, the ink of the invention may further contain other pigment in combination with the pigment of the invention. In the case of using two or more kinds of pigments in combination, the total amount of the pigments is preferably within the above-described range.

The ink of the invention can be used for forming a full-color image as well as a mono-color image. In order to form the full-color image, a magenta tone ink, a cyan tone ink, and a yellow tone ink can be used and, further, a black tone ink can be used for adjusting tone.

Further, in the ink of the invention may be used other pigments in addition to the azo pigment of the invention. As yellow pigments to be applied, there are illustrated, for example, C.I.P.Y.74, C.I.P.Y.128, C.I.P.Y.155, and C.I.P.Y.213. As magenta pigments to be applied, there are illustrated C.I.P.V.19 and C.I.P.R.122. As cyan pigments to be applied, there are illustrated C.I.P.B.15:3 and C.I.P.B.15:4. Apart from these pigments, any pigment may be used as each color pigment. As a black color material, there can be illustrated a dispersion of carbon black as well as disazo, trisazo, and tetrazo pigments.

As the water-soluble solvents to be used in the ink of the invention for inkjet recording, polyhydric alcohols, polyhydric alcohol derivatives, nitrogen-containing solvents, alcohols, and sulfur-containing solvents are used.

Specific examples of the polyhydric alcohols include ethylene glycol, diethylene glycol, propylene glycol, butylenes glycol, triethylene glycol, 1,5-pentanediol, 1,2,6-hexanetriol, and glycerin.

Examples of the aforesaid polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the aforesaid nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate and ethylene carbonate may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink. In case when the content of the water-soluble solvent in the entire ink is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer.

Additionally, the above-described surface tension is measured under the environment of 23° C. and 55% RH by using a Wilhelmy surface tension balance as is the same described hereinbefore.

The viscosity of the ink is preferably from 1.2 mPa·s to 8.0 mPa·s, more preferably from 1.5 mPa·s to 6.0 mPa·s, still more preferably from 1.8 mPa·s to 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases.

Additionally, the viscosity (including that to be described hereinafter) is measured by using a rotational viscometer Rheomat 115 (manufactured by Contraves Co.) at 23° C. and a shear rate of $1,400$ $s^{-1}$.

In addition to the above-described individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the total weight of the entire ink.

Further, for the purpose of controlling characteristic properties such as improvement of ejection properties, there can be used, as needed, polyethyleneimine, polyamines, polyvinylpyrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate.

Besides, pH buffers, antioxidants, antifungal agents, viscosity-adjusting agents, electrically conductive agents, ultraviolet ray absorbents, and the like may also be added as needed.

[Coloring Composition for Color Filter]

The coloring composition of the invention for color filter contains an azo pigment represented by the foregoing general formula (1). The coloring composition of the invention for color filter (hereinafter also referred to merely as "coloring composition" in some cases) means a coloring composition containing at least one azo pigment represented by the general formula (1).

The coloring composition of the invention preferably further contains a polymerizable compound and a solvent.

Also, in producing the coloring composition of the invention, the azo pigment obtained in the above-described manner may be blended as such or may be blended as a pigment dispersion wherein the pigment is dispersed in a solvent. The azo pigment exhibits excellent coloring characteristics, fastness, dispersion stability, light fastness, and weatherability in the form of a pigment dispersion, thus such pigment dispersion being preferred.

The amount of the azo pigment represented by the general formula (in the case where other pigments are used in combination, the total amount of the pigments used) in the coloring composition of the invention is preferably from 0.01 to 2 parts by weight, particularly preferably from 0.1 to 1 part by weight, per 1 part by weight of a polymerizable compound.

[Polymerizable Compounds]

The polymerizable compound may properly be selected in consideration of the production process of a color filter and, as the polymerizable compound, there are illustrated photosensitive compounds and/or thermosetting compounds, with photo-sensitive compounds being particularly preferred.

The photo-sensitive compound is selected from at least one of photo-polymerizable resins, photo-polymerizable monomers, and photo-polymerizable oligomers, with those which have an ethylenically unsaturated bond being preferred. It suffices for the coloring composition for color filter to contain a material which becomes a resin in a cured state, and a composition containing only components which are not resinous in an uncured state is included.

As the photo-polymerizable compounds, photo-polymerizable monomers, and photo-polymerizable oligomers, there are illustrated, for example, (meth)acrylates such as 2-hydroxyethyl(meth)acrylate, 2-hydroxypropyl(meth)acrylate, 2-ethylhexyl(meth)acrylate, ethylene glycol di(meth)acrylate, diethylene glycol di(meth)acrylate, triethylene glycol di(meth)acrylate, polyethylene glycol di(meth)acrylate, pentaerythritol di(meth)acrylate, dipentaerythritol tetra(meth)acrylate, dipentaerythritol hexa(meth)acrylate, bisphenol A type epoxy di(meth)acrylate, bisphenol F type epoxy di(meth)acrylate, and bisphenol fluorene type epoxy di(meth)acrylate. Also, there are illustrated vinyl resins such as acrylic acid (co)polymers, (meth)acrylic acid (co)polymers, maleic acid (co)polymers, and resins having an ethylenic double bond in its side chain such as polyethylene oxide, polyvinylpyrrolidone, polyamide, polyurethane, polyether, polyester, etc. These may be used alone or in combination of two or more thereof. The content of the polymerizable compound is from 20 to 90% by weight, preferably from 40 to 80% by weight.

The blending ratio of the polymerizable compound is preferably from 40 to 95% by weight, more preferably from 50 to 90% by weight, based on the weight of all solid components in the composition for color filter. The composition may contain, as needed, other resins or the like. In such cases, the sum amount of the polymerizable resin and the other resins is preferably within the above-described range. Additionally, the term "all solid components" means those components which remain as solid components after drying and curing, with no solvents being contained and monomers being contained.

[Photo-Polymerization Initiators]

In the case of using a photo-sensitive compound as the photo-polymerizable compound, a photo-polymerization initiator is used together with a monomer and/or an oligomer of the photo-sensitive compound. As the photo-polymerization initiator, there are illustrated one or more members selected from among benzophenone derivatives, acetophenone derivatives, benzoin derivatives, benzoin ether derivatives, thioxanthone derivatives, anthraquinone derivatives, naphthoquinone derivatives, and triazine derivatives. Known photo-sensitizers may further be used together with these photo-polymerization initiators.

As the thermosetting resins, there are illustrated, for example, melamine resin, urea resin, alkyd resin, epoxy resin, phenol resin, cyclopentadiene resin, etc.

Additionally, in this specification and claims, the terms "photo-sensitive resins" and "thermosetting resins" mean not only cured resins but polymerizable monomers or oligomers as well.

Together with the above-described photo-sensitive resins and/or thermosetting resins, those other resins which are generally used in an ink, such as binder resins having an acid group, and acryl resins and urethane resins may be used.

[Solvent]

The pigment dispersion may be an aqueous system or a non-aqueous system, which depends on the production process of the color filter. For example, in a photo lithography process, a non-aqueous system is preferred and, in an inkjet process, either system may be employed.

As a solvent for the coloring composition of the invention, there are illustrated fatty acid esters such as ethyl acetate, butyl acetate, ethylene glycol monomethyl ether acetate, and propylene glycol monomethyl ether acetate; ketones such as acetone, methyl ethyl ketone, methyl isobutyl ketone, cyclohexanone, and diacetone alcohol; aromatic compounds such as benzene, toluene, and xylene; alcohols such as methanol, ethanol, n-propanol, isopropanol, and n-butanol; glycols such as ethylene glycol, diethylene glycol, triethylene glycol, tetraethylene glycol, polyethylene glycol, propylene glycol, dipropylene glycol, tripropylene glycol, polypropylene glycol, trimethylene glycol, and hexanetriol; glycerin; alkylene glycol monoalkyl ethers such as ethylene glycol monomethyl ether, ethylene glycol monoethyl ether, diethylene glycol monomethyl ether, diethylene glycol monoethyl ether, propylene glycol monomethyl ether, and propylene glycol monoethyl ether; alkylene glycol dialkyl ethers such as triethylene glycol dimethyl ether, triethylene glycol diethyl ether, tetraethylene glycol dimethyl ether, and tetraethylene glycol diethyl ether; ethers such as tetrahydrofuran, dioxane, and diethylene glycol diethyl ether; alkanolamines such as monoethanolamine, diethanolamine, and triethanolamine; nitrogen-containing polar organic solvents such as N,N-dimethylformamide, N,N-dimethylacetamide, N-methyl-2-pyrrolidone, 2-pyrrolidone, and 1,3-dimethyl-2-imidazolidinone; water; and the like.

Of these solvents, water-soluble solvents may be mixed with water to use as an aqueous medium. Also, two or more solvents selected from the above-described solvents excluding water may be mixed to use as an oily medium.

An azo pigment in the form of a pigment dispersion has better light fastness and weatherability in comparison with an azo pigment not in the form of a pigment dispersion.

The coloring composition of the invention may be a composition containing two or more of the azo pigments represented by the general formula (1).

Also, the pigment represented by the general formula (1) which is used in the coloring composition of the invention for color filter is preferably a pigment represented by the foregoing general formula (1-0).

Also, one or more of pigments selected from other pigments such as azo series pigments, disazo series pigments, benzimidazolone series pigments, condensed azo series pigments, azo lake series pigments, anthraquinone series pigments, diketopyrrolopyrrole series pigments, quinacridone series pigments, isoindoline series pigments, isoindolinone series pigments, perinone series pigments, and perylene series pigments, or derivatives thereof may be used together with the azo pigments represented by the general formula (1) within the range of not inhibiting the objects of the invention.

Pigments which may be used together in the invention are not particularly limited. Specifically, there are illustrated compounds whose classification in Color index (C.I.; published by The Society of Dyers and Colourists) are pigments, that is, those which have the following color index (C.I.) number:

yellow pigments such as C.I. pigment yellow 1, C.I. pigment yellow 3, C.I. pigment yellow 12, C.I. pigment yellow 13, C.I. pigment yellow 83, C.I. pigment yellow 138, C.I. pigment yellow 139, C.I. pigment yellow 150, C.I. pigment yellow 180, and C.I. pigment yellow 185; red pigments such as C.I. pigment red 1, C.I. pigment red 2, C.I. pigment red 3, C.I. pigment red 177, and C.I. pigment red 254; blue pigments such as C.I. pigment blue 15, C.I. pigment blue 15:3, C.I. pigment blue 15:4, and C.I. pigment blue 15:6; green pigments such as C.I. pigment green 7 and C.I. pigment green 36; and C.I. pigment violet 23 and C.I. pigment violet 23:19.

Also, as specific examples of the aforesaid inorganic pigment, there are illustrated titanium oxide, barium sulfate, calcium carbonate, zinc white, lead sulfate, yellow lead, zinc yellow, iron oxide red (red iron oxide (III)), cadmium red, ultramarine, deep blue, chromium oxide green, cobalt green, amber, titanium black, synthetic iron black, carbon black, etc. In the invention, these pigments may be used alone or as a mixture of two or more kinds thereof.

In the case of using other pigments than the azo pigments represented by the general formula (1) together therewith, the content thereof is preferably 50% by weight or less, particularly preferably 20% by weight or less, based on the weight of the total pigments in the coloring composition.

Additionally, in this specification, the term "azo pigment represented by the general formula (1)" is used to mean not only one kind of azo pigment represented by the general formula (1) but also a combination of two or more of azo pigments represented by the general formula (1) and a combination of an azo pigment represented by the general formula (1) and other pigment.

[Pigment Dispersion (2)]

The pigment dispersion is preferably obtained by dispersing the above-described azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), an ultrasonic wave system, a high-pressure emulsion dispersion system (high-pressure homogenizer; specific commercially available apparatuses being Gaulin homogenizer, a microfluidizer, and DeBEE2000).

In the invention, the volume-average particle diameter of the pigment is preferably from 10 nm to 250 nm. Additionally, the term "volume-average particle diameter of the pigment" means the particle diameter of the pigment itself or, in the case where an additive such as a dispersant is adhered to the pigment particles, means the diameter of the particle with the additive being adhered thereto. In the invention, as an apparatus for measuring the volume-average particle diameter of the pigment, a particle size analyzer of Nanotrac UPA (UPA-EX150; manufactured by Nikkiso Co., Ltd.) is used. The measurement is conducted according to a predetermined measuring method placing 3 ml of a pigment dispersion in a measuring cell. Additionally, with respect to parameters to be inputted upon measurement, an ink viscosity is used as a viscosity, and a pigment density is used as a density of the dispersed particles.

The volume-average particle diameter of the pigment is more preferably from 20 nm to 250 nm, still more preferably from 30 nm to 230 nm. In case when the volume-average particle diameter of the particles in the pigment dispersion is less than 20 nm, storage stability might not be ensured in some cases whereas, in case when the volume-average particle diameter of the particles in the pigment dispersion exceeds 250 nm, the optical density might be reduced in some cases.

The content of the pigment contained in the pigment dispersion of the invention is preferably in the range of from 1 to 35% by weight, more preferably in the range of from 2 to 25% by weight. When the content is within the above-described range, physical properties of the dispersion such as surface tension and viscosity can be adjusted with ease, thus such content being preferred.

With the azo pigments of the invention, physical properties such as solvent resistance, dispersibility, and thermal mobility are adjusted so as to be adequate for their use through substituents. Also, the azo pigments of the invention can be used in an emulsion dispersion state or, further, in a solid dispersion state depending upon the system wherein they are used.

Also, in order to well disperse the components in a short time, a dispersant may be contained in the composition.

The coloring composition in the invention for color filter preferably further contains one or more dispersants selected from among surfactants, silicone series additives, pigment series additives, silane series coupling agents, and titanium series coupling agents. These dispersants may be used in combination of two or more thereof.

Specific examples of the aforesaid dispersants will be described below.

The surfactants are not particularly limited as long as they have surface-active action, and there can be illustrated cationic, anionic, nonionic, and amphoteric surfactants, etc. Specific examples include anionic surfactants such as alkane sulfonate salts, straight chain alkylbenzene sulfonate salts, branched alkylbenzene sulfonate salts, alkylnaphthalene sulfonate salts, naphthalenesulfonic acid salt-formaldehyde condensates, alkylsulfate salts, polyoxyethylene alkyl ether sulfate salts, alkyl phosphate salts, polyoxyethylene alkyl ether phosphate salts, and aliphatic monocarboxylic acid salts; cationic surfactants such as alkylamine salts and quaternary amine salts; nonionic surfactants such as glycerin fatty acid esters, sorbitan fatty acid esters, polyoxyethylene alkyl ethers, polyoxyethylene alkylphenyl ethers, polyethylene glycol fatty acid esters, and polyoxyethylene sorbitan fatty acid esters; amphoteric surfactants such as alkylbetaines; and cationic, anionic, nonionic, and amphoteric high-molecular surfactants.

Specific examples of the silicone series additives include polyalkylsiloxanes, polyalkylphenylsiloxanes, polyorganosiloxanes, polydimethylsiloxane, polyorganosiloxane polyether copolymers, polyfluorosiloxanes, and organosiloxanes. These silicone series additives may be used in combination of two or more thereof.

The pigment series additives are pigment derivatives wherein a substituent such as a basic group, an acidic group, a straight chain alkyl group, a branched alkyl group, or a polyoxyethylene group is introduced to the pigment structure. As preferred pigment structures, there are illustrated monoazo series pigments, disazo series pigments, benzimidazolone series pigments, condensed azo series pigments, azo lake series pigments, anthraquinone series pigments, diketopyrrolopyrrole series pigments, quinacridone series pigments, isoindoline series pigments, isoindolinone series pigments, perinone series pigments, and perylene series pigments.

Of these pigment series additives, those wherein the above-described substituent is introduced to the azo series pigment structure have good affinity for the azo compounds represented by the general formula (1), thus being preferred.

As specific examples of the silane coupling agents, there are illustrated vinyltrimethoxysilane, vinyltriethoxysilane, vinyltris(β-methoxyethoxy)silane, β-(3,4-epoxycyclohexyl) ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-butyltrimethoxysilane, isobutyltrimethoxysilane, trimethylmethoxysilane, hydroxypropyltrimethoxysilane, n-hexadecyltrimethoxysilane, and n-octadecyltrimethoxysilane.

As specific examples of the titanium series coupling agents, there are illustrated isopropyltri(N-aminoethylaminoethyl)titanate and dibutoxybistriethanolamine titanate.

The amount of the above-described dispersant to be used is preferably from 0.1 to 100 parts by weight, particularly preferably from 0.5 to 80 parts by weight, per 100 parts by weight of the azo compound represented by the general formula (1), though depending upon kind of the dispersant to be used.

Methods of using the dispersant are not particularly limited, and may be conducted according to the known photolithography process of preparing a coloring composition.

The invention relates to a process of preparing a coloring composition for color filter as well. The process of preparing a coloring composition for color filter includes a step of obtaining a pigment dispersion by dispersing one or more dispersants selected from among the surfactants, silicone series additives, pigment series additives, silane series coupling agents, and titanium series coupling agents, and an azo compound represented by the general formula (1) in part of a solvent, and a step of mixing the pigment dispersion with a polymerizable compound and the rest of the solvent.

As the process of preparing a coloring composition for color filter, it is preferred to employ the process of the invention.

The invention further provides a color filter formed by using the above-described coloring composition for color filter. The color filter shows a high contrast and good light transmittance. Specifically, it shows light transmittance of preferably 85% or more, more preferably 90% or more, at a wavelength of 650 nm.

For producing the color filter of the invention, any known process may be employed, and there are preferably illustrated a photolithography process and an inkjet process. The photolithography process and the inkjet process will be described in detail below.

1) Photolithography Method

In the case of forming a color filter according to photolithography method, a photo-sensitive resin is used as a polymerizable compound in the coloring composition of the invention for color filter. The photo-sensitive resin is contained in the coloring composition as a monomer and/or an oligomer together with a photo-polymerization initiator, and is cured by irradiation with light to form a film on a transparent substrate.

As the photo-sensitive resin, a polymer or copolymer of the aforesaid polymerizable monomer having one or more ethylenic double bond within the molecule is preferably used.

As these photo-sensitive resins (polymerizable monomers), acrylates and methacrylates are particularly preferred and, specifically, there are illustrated methyl acrylate, methyl methacrylate, butyl methacrylate, butyl acrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, dipentaerythritol pentaacrylate, dipentaerythritol pentamethacrylate, glycerol diacrylate, glycerol dimethacrylate, 1,4-butanediol diacrylate, 1,4-butanediol dimethacrylate, bisphenol A diacrylate, and bisphenol A dimethacrylate.

In the case of using the photolithography method, a binder resin having an acidic group is used in the coloring composition of the invention in addition to the aforesaid photo-sensitive resin. As the binder resin having an acidic group, there are illustrated resins having a carboxyl group, a hydroxyl group, a sulfonic acid group, or the like, with binder resins having a carboxyl group and/or a hydroxyl group being preferred.

As the above-described binder resins having an acidic group, there are preferably used copolymers between a monomer having an ethylenic double bond, such as those which are selected from acrylates, methacrylates, styrene, vinyl acetate, vinyl chloride, N-vinylpyrrolidone, and acrylamide, and a monomer having an acidic group and an ethylenic double bond, such as those which are selected from acrylic acid, methacrylic acid, p-styrenecarboxylic acid, p-styrenesulfonic acid, p-hydroxystyrene, and maleic anhydride.

The binder resin having an acidic group is used in an amount of preferably from 0.5 to 4 parts by weight, particularly preferably from 1 to 3 parts by weight, per 1 part by weight of the photo-sensitive resin (polymerizable monomer).

As a solvent to be used in the coloring composition for the photolithography method, there are illustrated one or more oily media selected from fatty acid esters, ketones, aromatic compounds, alcohols, glycols, glycerin, alkylene glycol monoalkyl ethers, alkylene glycol dialkyl ethers, ethers, and nitrogen-containing polar organic solvents.

The amount of these solvents to be used is preferably a 3- to 30-fold amount, particularly preferably a 4- to 15-fold amount, based on the whole weight of components other than the solvent in the coloring composition.

Also, the coloring composition in the invention for use in the photolithography method may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, a dispersion stabilizer, a rust inhibitor, and a chelating agent (described in JP-A-2003-306623). These various additives may be added to the oil phase or the aqueous phase upon preparation.

The coloring composition of the invention for color filter can be prepared by the process including a step of uniformly mixing and dispersing the azo compound represented by the general formula (1), the polymerizable compound, a solvent, and other various additives using an apparatus such as a beads mill, a ball mill, a sand mill, a two-roll mill, a three-roll mill, a homogenizer, a kneader, or a vibration dispersing apparatus; and a step of adjusting the viscosity using the aforesaid solvent or the like.

As a method for forming a color filter on a substrate by using the coloring composition of the invention for color filter, a known photolithography method may be employed. For example, a color filter is obtained by a process including a step of uniformly coating the coloring composition of the invention on a display substrate according to a known method such as a spraying method, a bar-coating method, a roll-coating method, or a spin-coating method; a step of removing the solvent in the ink by heating; a step of exposing a color filter pattern on the display substrate using a high-pressure mercury lamp or the like; an alkali-developing step; a washing step; and a baking step.

As a developing solution for use in the process of producing a color filter of the invention, any one can be employed that dissolves the composition of the invention but does not dissolve the radiation-irradiated portion. Specifically, a combination of various organic solvents or an alkaline aqueous solution can be used.

As the organic solvent, there are illustrated those which have been described hereinbefore and are to be used upon preparation of the composition of the invention.

As the alkaline aqueous solution, there are used, for example, alkaline aqueous solutions containing dissolved therein 0.001 to 10% by weight, preferably 0.01 to 1% by weight, of an alkaline compound such as sodium hydroxide, potassium hydroxide, sodium carbonate, sodium silicate, sodium metasilicate, aqueous ammonia, ethylamine, diethylamine, dimethylethanolamine, tetramethylammonium hydroxide, choline, pyrrole, piperidine, or 1,8-diazobicyclo-[5.4.0]-7-undecene. Additionally, in the case of using such developing solution containing an alkaline aqueous solution, water washing is generally conducted after development.

2) Inkjet Method

In the case of forming a color filter by employing an inkjet method, the polymerizable compound in the coloring composition of the invention for color filter is not particularly limited, and any conventionally known one which has been used in an ink for inkjet system may be used. A monomer of a photo-sensitive resin and/or a thermosetting resin is preferably used.

As these photo-sensitive resins, there are illustrated acryl resins, methacryl resins, and epoxy resins, with acryl resins and methacryl resins being preferably used. The acryl resins and the methacryl resins are preferably those which are obtained by using a combination of a photo-polymerizable monomer selected from among acrylates, methacrylates, urethane acrylate, urethane methacrylate, acrylamide, methacrylamide, alkyl acrylates, benzyl methacrylate, benzyl acrylate, aminoalkyl methacrylates, etc. and a photo-polymerization initiator selected from among benzophenone derivatives, acetophenone derivatives, benzoin derivatives, benzoin ether derivatives, thioxanthone derivatives, anthraquinone derivatives, naphthoquinone derivatives, and triazine derivatives. Also, in addition to the above-described photo-polymerizable monomers, photo-polymerizable monomers having a hydrophilic group, such as acrylic acid, methacrylic acid, maleic acid, and vinyl acetate may further be added.

As the thermosetting resins, there are illustrated, for example, melamine resin, urea resin, alkyd resin, epoxy resin, phenol resin, and cyclopentadiene resin.

In the case of employing the inkjet process, the solvent to be used in the coloring composition may be an oily medium or an aqueous medium, with an aqueous medium being more preferably used. As the aqueous medium, water or a mixed solvent of water and a water-soluble organic solvent is used, with a mixed solvent of water and a water-soluble organic solvent being preferred. Also, it is preferred to use deionized water.

The oily medium to be used in the above-described coloring composition is not particularly limited, but there can be used, for example, those which have been illustrated as solvents for the coloring composition for use in photolithography.

Solvents to be used in the aqueous medium are selected from among those alcohols, ketones, ethers, glycols, glycerin, alkylene glycol monoalkyl ethers, alkylene glycol dialkyl ethers, alkanolamines, nitrogen-containing polar organic solvents, etc. which are soluble in water. These water-soluble organic solvents may be used alone or in combination of two or more thereof.

The amount of these solvents to be used is not particularly limited, but it is preferred to properly adjust the amount so that the viscosity of the coloring composition at room temperature becomes 20 mPa·s or less, preferably 10 mPa·s or less.

The coloring composition of the invention for inkjet use can be prepared by a process including a step of dispersing and mixing components as is the same with the coloring composition for use in photolithography process. Upon dispersing, a dispersant may be contained, as needed, as is the same with the case of photolithography.

Also, the coloring composition in the invention for inkjet use may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, and a dispersion stabilizer.

Methods for forming a color filter using the coloring composition obtained as described above are not particularly limited, and any known method of forming a color filter according to the inkjet system may be employed. For example, a color filter can be formed by a method including a step of forming a predetermined color filter pattern in a droplet state on a substrate, a step of drying this, and a step of heat treatment, irradiation with light, or both of them to cure the color filter pattern on the substrate, thus forming a film.

Although description has been made hereinbefore with respect to photolithography method and inkjet method, the color filter of the invention may be obtained by other method.

In the case of employing other color filter-forming methods (for example, various printing methods such as an offset printing method) than the above-described methods, coloring compositions for color filter and resulting color filters fall within the scope of the invention as long as the coloring composition contains the aforesaid polymerizable compound and the solvent and contains the azo pigment as a coloring material.

For example, components such as polymerizable compounds, solvents, and additives and formulation upon formation of a color filter may be selected according to conventional examples, and are not limited only to those which have been illustrated with respect to the above-described photolithography method and inkjet method.

The color filter obtained as described above forms pixels together with color filter patterns of G (green) and B (blue) according to a known method. Such filter has an extremely high transparency and excellent spectral characteristics and can provide a liquid crystal display which can display a distinct image with less polarization extinction. Also, use of a device having formed therein this color filter can provide a camera module having good spectral characteristics.

The color filter of the invention can be used in a liquid crystal display element or solid state imaging devices such as CCDs and CMOSs, and is appropriate for CCD elements or CMOS elements having high resolution exceeding 1,000,000 pixels.

EXAMPLES

The invention will be specifically described by reference to Examples, but the invention is not limited only to the Examples. Additionally, in the following Examples, "%" and "parts" mean "% by weight" and "parts by weight", respectively, unless otherwise specified.

Synthesis Example 1

Synthesis of Azo Pigment (Formula (9))

15 g of the compound represented by formula (7) is added to 120 ml of phosphoric acid and is completely dissolved at room temperature, and this solution is ice-cooled to keep the temperature to 5° C., and 24.9 g of nitrosylsulfuric acid (40% solution in sulfuric acid) is dropwise added thereto, followed by stirring for 45 minutes. 0.5 g of urea is added to this reaction solution to obtain a diazonium salt solution. This diazonium salt solution is dropwise added over 40 minutes to a solution prepared by dissolving 20 g of the compound represented by formula (8) in a mixed solvent of N-methylpyrrolidone (NMP) (196 ml) and 1-methoxy-2-propanol (196 ml) and then sulfuric acid (3.6 g) is dropwise added thereto, while keeping the temperature of the solution at 15 to 18° C. The thus-obtained solution is stirred for 2 hours while keeping at 20 to 25° C., then 750 ml of methanol is added thereto and, after stirring for 2 hours under heating, the solution is stirred for 3 hours while keeping the temperature at 20 to 25° C. Crystals precipitated are collected by filtration, and spray-washed with 500 ml of methanol. 750 ml of water is added to the crystals without drying, and the mixture is stirred with keeping the temperature at 20 to 25° C. Thereafter, the crystals are collected by filtration, spray-washed with 500 ml of water, and collected by filtration, followed by drying for 24 hours at room temperature and then for 10 hours in a 50° C. vacuum desiccator to obtain 32.5 g of the azo pigment (formula (9)) powder with vivid red. Yield: 99%.

Measurement of X-ray diffraction of the thus-obtained α-type crystal form azo pigment under the above-described conditions shows characteristic peaks at Bragg angles (2θ±0.5°) of 7.1°, 25.3°, 26.0°, and 27.2 in X-ray diffraction.

Scheme 2

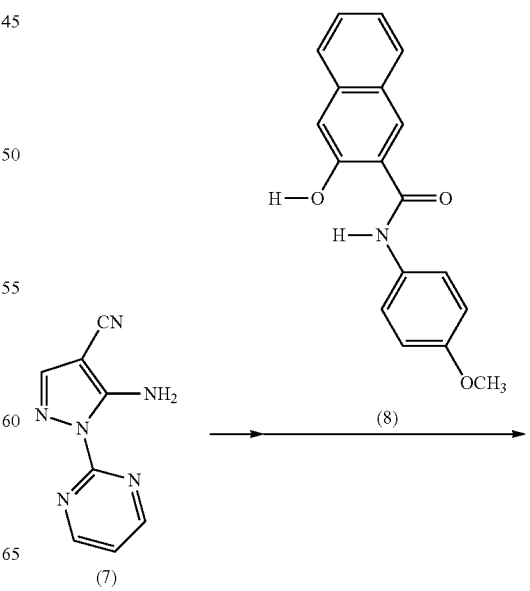

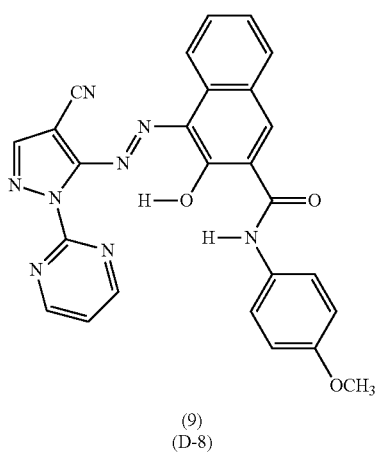

(9)
(D-8)

Synthesis Example 2

Synthesis of Azo Pigment (Formula (9a))

15 g of the compound represented by formula (7) is added to 120 ml of phosphoric acid and is completely dissolved at room temperature, and this solution is ice-cooled to keep the temperature to 5° C., and 24.9 g of nitrosylsulfuric acid (40% solution in sulfuric acid) is dropwise added thereto, followed by stirring for 45 minutes. 0.5 g of urea is added to this reaction solution to obtain a diazonium salt solution. This diazonium salt solution is dropwise added over 40 minutes to a solution prepared by dissolving 18 g of the compound represented by formula (8) and 2 g of the compound represented by formula (3c) in a mixed solvent of DMSO (196 ml) and 1-methoxy-2-propanol (196 ml) and then phosphoric acid (15.5 g) is dropwise added thereto while keeping the temperature of the solution at 15 to 18° C. The thus-obtained solution is stirred for 2 hours while keeping at 20 to 25° C., then 750 ml of methanol is added thereto and, after stirring for 2 hours under heating, the solution is stirred for 3 hours while keeping the temperature at 20 to 25° C. Crystals precipitated are collected by filtration, and spray-washed with 500 ml of methanol. 750 ml of water is added to the crystals without drying, and the mixture is stirred with keeping the temperature at 20 to 25° C. Thereafter, the crystals are collected by filtration, spray-washed with 500 ml of water, and collected by filtration, followed by drying for 24 hours at room temperature and then for 10 hours in a 50° C. vacuum desiccator to obtain 32.3 g of the azo pigment (formula (9a)) powder with vivid red. Yield: 99%.

Measurement of X-ray diffraction of the thus-obtained α-type crystal form azo pigment under the above-described conditions shows characteristic peaks at Bragg angles (2θ±0.5°) of 7.1°, 25.3°, 25.9°, and 27.1 in X-ray diffraction.

Scheme 3

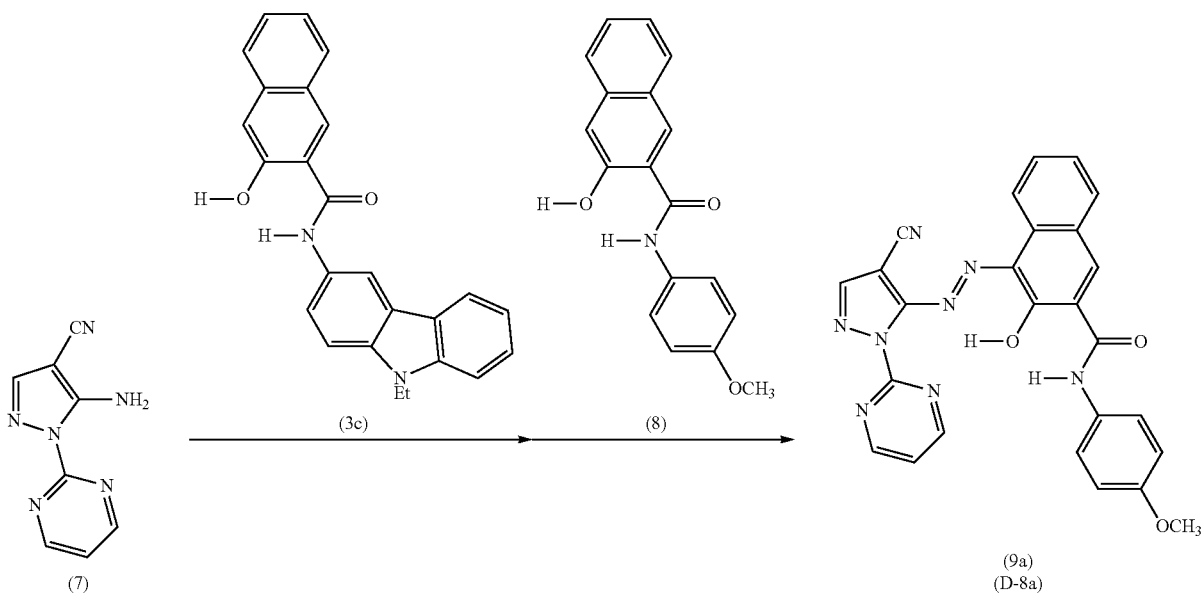

Synthesis Examples 3 to 10

Procedures are conducted in the same manner as in Synthesis Example 1 to obtain D-1, D-7, D-20, D-36, D-127, D-222, D-207, and D-246.

Example 1

2.5 parts of the pigment D-8 synthesized in Synthesis Example 1, 0.5 part of sodium oleate, 5 parts of glycerin, and 42 parts of water are mixed, and the resulting mixture is subjected to dispersing procedure together with 100 parts of 0.1-mm diameter zirconia beads for 6 hours at 300 rpm in a planetary ball mill. After completion of the dispersing procedure, the zirconia beads are removed to obtain pigment dispersion 1.

Examples 2 to 10

The same procedures as described in Example 1 are conducted except for using D-8a, D-1, D-7, D-20, D-36, D-127, D-222, D-207, and D-246 synthesized in Synthesis Examples 2 to 9 in place of the pigment in Example 1 to obtain red pigment dispersions 2 to 10.

Comparative Example 1

The same procedures as described in Example 1 are conducted except for using C.I. Pigment Red 254 (BT-CF; manufactured by BASF SE) in place of the pigment used in Example 1 to obtain red comparative pigment dispersion 1.

Comparative Example 2

The same procedures as described in Example 1 are conducted except for using C.I. Pigment Yellow 74 (Iralite YELLOW GO; manufactured by BASF SE) in place of the pigment (D-1) used in Example 1 to obtain yellow comparative pigment dispersion 2.

Comparative Example 3

The same procedures as described in Example 1 are conducted except for using C.I. Pigment Yellow 155 (INKJET YELLOW 4G VP2532; manufactured by Clariant AG) in place of the pigment (D-1) used in Example 1 to obtain yellow comparative pigment dispersion 3.

(Evaluation)
<Production Stability>

Procedures of Synthesis Example 1 are repeated 10 times to conduct synthesis of D-8 to confirm whether the intended α-form pigment is obtained. As a result, it is confirmed that the intended α-form pigment is obtained in all of the procedures repeated 10 times. With respect to D-8a, D-1, D-7, D-20, D-36, D-127, D-222, D-207, and D-246, too, there are obtained crystals with the same XRD patterns for respective pigments.

<Dispersibiity>

Each of the pigment dispersions obtained above are subjected to measurement of volume-average particle size in a conventional manner using a dynamic light-scattering particle size-measuring apparatus (Microtrack UPA150; manufactured by Nikkiso Co., Ltd.). The results are shown in Table 1. Samples with the volume-average particle size of less than 50 nm are ranked A; samples with the volume-average particle size of from 50 nm to less than 100 nm are ranked B; samples with the volume-average particle size of from 100 nm to less than 200 nm are ranked C, and samples with the volume-average particle size of 200 nm or more are ranked D.

<Dispersion Stability>

Each of the pigment dispersions obtained above are subjected to measurement of volume-average particle size in a conventional manner using a dynamic light-scattering particle size-measuring apparatus (Microtrack UPA150; manufactured by Nikkiso Co., Ltd.). Dispersion stability of each of the pigment dispersions is evaluated according to the following criteria: samples with which the volume-average particle size measured 2 hours after preparation of the pigment dispersion and the volume-average particle size measured after being stored at 70° C. for 2 days are both 150 nm or less are ranked A; samples with which either of the volume-average particle sizes is from 150 nm to 200 nm are ranked B (good); and samples with which either of the volume-average particle sizes is 200 nm or more are ranked C (bad). The results are shown in Table 1.

<Evaluation of Light Fastness>

Each of the coated products of 1.0 in image density used for evaluation of tinctorial strength is irradiated with xenon light (170000 lux; in the presence of a cut filter which cuts light having a wavelength of 325 nm or less) for 14 days using a fade meter. Image density before and after irradiation with xenon light is measured using the reflection densitometer, and the pigment dispersions are evaluated in terms of colorant maintaining ratio [(density after irradiation/density before irradiation)×100%]. Samples of 80% or more in a colorant maintaining ratio are ranked A; samples of from 65% to less than 80% are ranked B; and samples of less than 65% are ranked C.

<Evaluation of Tinctorial Strength>

Each of the pigment dispersions obtained is coated on a photo mat paper ("pigment only") manufactured by Seiko Epson Corporation by using a No. 3 bar coater. Image density of each of the thus-obtained coated products is measured by means of a reflection densitometer (X-Rite 938; manufactured by X-Rite Co.), and the results are shown in Table 1 as "tinctorial strength (OD: Optical Density)". Samples of 1.4 or more are ranked A; samples of from 1.2 to less than 1.4 are ranked B; and samples of less than 1.2 are ranked C.

Examples 2 to 10 and Comparative Examples 1 to 3

The same evaluations are conducted in the same manner as in Example 1 except for changing the specific compound example D-8 to those shown in Table 1.

TABLE 1

| | Pigment | Pigment Derivative | Dispersibility | Dispersion Stability | Light Fastness | Tinctorial strength |
|---|---|---|---|---|---|---|
| Ex. 1 | D-8 | none | B | B | A | A |
| Ex. 2 | D-8a | S1 | A | A | A | A |
| Ex. 3 | D-1 | none | B | B | A | A |
| Ex. 4 | D-7 | none | B | B | A | A |
| Ex. 5 | D-20 | none | B | B | A | A |
| Ex. 6 | D-36 | none | B | B | A | A |
| Ex. 7 | D-127 | none | B | B | A | A |
| Ex. 8 | D-222 | none | B | B | A | A |
| Ex. 9 | D-207 | none | B | B | A | A |
| Ex. 10 | D-246 | none | B | B | A | A |
| Comp. Ex. 1 | P.R.254 | none | B | B | C | B |
| Comp. Ex. 2 | P.Y.74 | none | B | B | C | A |

TABLE 1-continued

| | Pigment | Pigment Derivative | Dispersibility | Dispersion Stability | Light Fastness | Tinctorial strength |
|---|---|---|---|---|---|---|
| Comp. Ex. 3 | P.Y.155 | none | B | B | C | C |

Pigment Derivative: S1

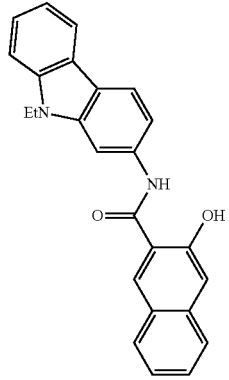

Example 101

The high-molecular dispersant represented by Dispersant 10 described in WO2006/064193, p. 22 is neutralized with a potassium hydroxide aqueous solution. To 75 parts by weight (concentration of solid components: 20%) of the thus-obtained dispersant aqueous solution are added 30 parts by weight of the azo pigment (D-8) synthesized hereinbefore and 95 parts by weight of deionized water, and the resulting mixture is mixed to roughly disperse by means of a disper agitating element. 600 parts by weight of zirconia beads are added to the mixed and roughly dispersed liquid and, after conducting dispersing procedure for 4 hours in a dispersing machine (sand grinder mill), the liquid is separated into beads and the dispersion. To the thus-obtained mixture is gradually added 2 parts by weight of polyethylene glycol diglycidyl ether at 25° C., and the mixture is stirred at 50° C. for 6 hours. Further, impurities are removed from the mixture by using a ultra-filtration membrane with the fractional molecular weight of 300K, followed by filtering the mixture by using a syringe of 20 ml in volume equipped with a filter having a pore size of 5 μm (acetylcellulose membrane; outer diameter: 25 mm; manufactured by Fujifilm Corporation) to remove coarse particles. Thus, pigment dispersion 101 having a solid content of 10% (particle size: 80 nm; measured by using Nanotrac 150 (UPA-EX150) manufactured by Nikkiso Co., Ltd.) is obtained.

Example 102

Pigment dispersion 102 is obtained in the same manner as in Example 101 except for using D-8a in place of the pigment (D-8) used in Example 101.

Comparative Example 101

Comparative pigment dispersion 101 is obtained in the same manner as in Example 101 except for using a red pigment (C.I. Pigment Red 254 (BT-CF; manufactured by BASF SE) in place of the azo pigment (D-8) used in Example 101.

Example 103

5% by weight, as a solid component, of the pigment dispersion 101 obtained in Example 101, 10% by weight of glycerin, 5% by weight of 2-pyrrolidone, 2% by weight of 1,2-hexanediol, 2% by weight of triethylene glycol monobutyl ether, 0.5% by weight of propylene glycol, and 75.5% by weight of deionized water are mixed, and the resulting mixed liquid is filtered by using a syringe of 20 ml in volume equipped with a filter having a pore size of 1 μm (acetylcellulose membrane; outer diameter: 25 mm; manufactured by Fujifilm Corporation) to remove coarse particles. Thus, pigment ink liquid 5 of the invention shown in Table 2 is obtained.

Example 104

Pigment ink 6 is obtained in the same manner as in Example 103 except for using the pigment dispersion 102 obtained in Example 102 in place of the pigment dispersion 101 obtained in Example 101.

Comparative Example 102

Comparative pigment ink liquid 5 is obtained in the same manner as in Example 103 except for using the comparative pigment dispersion 101 obtained in Comparative Example 101 in place of the pigment dispersion 101 obtained in Example 101.

Additionally, in Table 2, "ejection stability", "light fastness", "heat fastness", "ozone fastness", "metallic gloss", and "ink liquid stability" are evaluated as follows. Each ink is placed in a cartridge for a magenta ink liquid adapted for an inkjet printer PX-V630 manufactured by Seiko Epson Corporation, whereas, as other color inks, pigment ink liquids adapted for PX-630 are used, and a mono-color image pattern and green, red, and gray image patterns wherein density is stepwise changed are printed on image-receiving sheets of photographic paper <Kotaku> manufactured by Seiko Epson Corporation and photographic paper CRISPIA <Ko-kotaku> manufactured by Seiko Epson Corporation selecting recommended kirei mode to thereby evaluate image quality (metallic gloss), ejecting properties of the ink, and image fastness. Evaluations are conducted with respect to mono-color samples except for evaluation of metallic gloss.

The inkjet inks of the above-described Example 103 (pigment ink liquid 5), Example 104 (pigment ink liquid 6), and of Comparative Example 102 (comparative pigment ink 5) are subjected to the following evaluations. The results are shown in Table 2.

(Evaluation Experiments)
1) Regarding ejection stability, the cartridge is mounted on a printer and, after confirming ejection of the ink through all nozzles, an image is outputted on 20 sheets of A4 size paper and evaluated according to the following criteria:
  A: Printing is not disordered from the start to the end.
  B: Printing is disordered in some outputs.
  C: Printing is disordered from the start to the end.
2) Regarding image storage stability, the following evaluation is conducted using printed image samples.
[1] Light fastness is evaluated as follows. Image density Ci of the sample just after printing is measured by X-rite 310. The sample is irradiated with xenon light (100,000 lux) using a weather meter (manufactured by Atlas Material Testing Technology LLC) for 14 days and then image density Cf of the sample is measured to determine an image remaining ratio, $Cf/Ci \times 100$, whereby the light fastness is evaluated. The image remaining ratio is determined at 3 points having reflection density of 1, 1.5 and 2 respectively, and a case wherein the image remaining ratio is 80% or more at all three points is ranked A, a case wherein the image remaining ratio is less than 80% at two points is ranked B, and a case wherein the image remaining ratio is less than 80% at all three points is ranked C.

[2] Heat fastness is evaluated as follows. Density of the printed sample is measured by X-rite 310 before and after preservation of the sample under conditions of 80° C. and 60% RH for 7 days and an image remaining ratio is determined, whereby the heat fastness is evaluated. The image remaining ratio is determined at 3 points having reflection density of 1, 1.5 and 2, respectively, and a case wherein the image remaining ratio is 95% or more at all three points is ranked A, a case wherein the image remaining ratio is less than 95% at two points is ranked B, and a case wherein the image remaining ratio is less than 95% at all three points is ranked C.

[3] Ozone resistance (ozone fastness) is evaluated as follows. The printed sample is left for 14 days in a box wherein the ozone gas concentration is adjusted to 5 ppm (25° C., 50%), and the image density is measured before and after leaving the paper in the ozone gas atmosphere using a reflection densitometer (Photographic Densitometer 310 manufactured by X-rite Co.) to determine the image-remaining ratio. Additionally, the reflection density is measured at three points where the densities are 1, 1.5 and 2.0, respectively. The ozone gas density within the box is monitored by means of an ozone gas monitor (model: OZG-EM-01) made by APPLICS.

The evaluation is conducted in three ranks: a case wherein the image remaining ratio is 80% or more at all three points is ranked A; a case wherein the image remaining ratio is less than 80% at one or two points is ranked B; and a case wherein the image remaining ratio is less than 70% at all three points is ranked C.

3) Generation of metallic gloss:

Yellow, green, and red solid printed portions of the samples are visually observed under reflected light to evaluate.

A sample with which no metallic gloss is observed is ranked A, and a sample with which metallic gloss is observed is ranked B.

4) Ink liquid stability: Each of the pigment ink liquids obtained in Examples and Comparative Examples are allowed to stand at 60° C. for 10 days, and ink liquid stability is evaluated as follows. A sample wherein particle size of the particles in the pigment ink is not changed is ranked A, and a sample wherein particle size of the particles is changed is ranked B. The results are shown in the following Table 2.

TABLE 2

| Ink Liquid | Ejection Stability | Light Fastness | Heat Fastness | Ozone Fastness | Metallic Gloss | Ink Liquid Stability | Pigment |
|---|---|---|---|---|---|---|---|
| Ex. 103 (photogra-phic paper Kotaku) | A | A | A | A | A | A | D-8 |
| Ex. 103 (CRISPIA Ko-kotaku) | A | A | A | A | A | A | D-8 |
| Ex. 104 (photogra-phic paper Kotaku) | A | A | A | A | A | A | D-8a |
| Ex. 104 (CRISPIA Ko-kotaku) | A | A | A | A | A | A | D-8a |
| Comp. Ex. 104 (photogra-phic paper Kotaku) | B | B | A | A | A | B | C.I.P.R.254 |
| Comp. Ex. 104 (CRISPIA Ko-kotaku) | B | B | A | A | A | B | C.I.P.R.254 |

It is seen from the results shown in Table 2 that the pigment ink liquid using the pigment of the invention has excellent ejection properties and excellent weatherability, can suppress generation of metallic gloss, and shows excellent pigment ink liquid stability.

As is apparent from the results shown in Table 2, it is seen that the system using the ink liquid of the invention is excellent in every performance. In particular, in comparison with the samples of Comparative Examples, the samples of the invention show excellent light fastness and ink liquid stability.

Example 105

When an image is printed on inkjet paper of photographic glossy paper "Gasai" manufactured by FujiFilm Corporation by using the pigment ink liquid prepared in Example 103 or in Example 104 and using PX-V 630 manufactured by Seiko Epson Corporation, and then the printed paper is subjected to the same evaluation as in Example 102, there are obtained the same results.

As is apparent from the results shown in Tables 1 and 2, the pigment dispersions and the pigment ink liquids using the pigments of the invention are excellent in color tone, and show high tinctorial strength and high light fastness.

Therefore, the pigment dispersions using the pigments of the invention can favorably be used for an ink for printing such as inkjet printing.

Example 201

Preparation of Color Filter According to Photolithography Method

A pigment shown by compound D-8 synthesized in Synthesis Example 1 is used. The materials shown below are placed in a 70-cc mayonnaise bottle, and the bottle is shaken for 6 hours in a dispersing shaker (DAS200; manufactured by LAU Industries) to obtain a pigment dispersion 201.

TABLE 3

(Formulation of pigment dispersion 201)

| | |
|---|---|
| Pigment (Compound D-8) | 0.6 g |
| 1,2-propanediol-1-monomethyl ether 2-acetate (solvent 1) (manufactured by Tokyo Chemical Industry Co., Ltd.) | 5.0 g |
| Zirconia beads (φ0.3 mm) | 10 g |

Examples 202 to 210, Comparative Examples 201 to 203

Coloring compositions are prepared in the same manner as in Example 201 except for using the pigments shown in Table 4 in place of the pigment used in Example 201.

<Dispersibiity>

Each of the pigment dispersions obtained above are subjected to measurement of volume-average particle size in a conventional manner using a dynamic light-scattering particle size-measuring apparatus (Microtrack UPA150; manufactured by Nikkiso Co., Ltd.). The results are shown in Table 4. Samples with the volume-average particle size of less than 50 nm are ranked A; samples with the volume-average particle size of from 50 nm to less than 100 nm are ranked B; samples with the volume-average particle size of from 100 nm to less than 200 nm are ranked C, and samples with the volume-average particle size of 200 nm or more are ranked D.

<Dispersion Stability>

Each of the pigment dispersions obtained above are subjected to measurement of volume-average particle size in a conventional manner using a dynamic light-scattering particle size-measuring apparatus (Microtrack UPA150; manufactured by Nikkiso Co., Ltd.). Dispersion stability of each of the pigment dispersions is evaluated according to the following criteria: samples with which the volume-average particle size measured 2 hours after preparation of the pigment dispersion and the volume-average particle size measured after being stored at 70° C. for 2 days are both 150 nm or less are ranked A; samples with which either of the volume-average particle sizes is from 150 nm to 200 nm are ranked B (good); and samples with which either of the volume-average particle sizes is 200 nm or more are ranked C (bad). The results are shown in Table 4.

<Evaluation of Light Fastness>

Each of the coated products of 1.0 in image density used for evaluation of tinctorial strength is irradiated with xenon light (170000 lux; in the presence of a cut filter which cuts light having a wavelength of 325 nm or less) for 14 days using a fade meter. Image density before and after irradiation with xenon light is measured using the reflection densitometer, and the pigment dispersions are evaluated in terms of colorant maintaining ratio [(density after irradiation/density before irradiation)×100%]. Samples of 90% or more in a colorant maintaining ratio are ranked A; samples of from 80% to less than 90% are ranked B; and samples of less than 80% are ranked C.

TABLE 4

| | Pigment | Pigment Derivative | Dispersibility | Dispersion Stability | Light Fastness |
|---|---|---|---|---|---|
| Ex. 201 | D-8 | none | B | B | A |
| Ex. 202 | D-8a | S1 | A | A | A |

TABLE 4-continued

| | Pigment | Pigment Derivative | Dispersibility | Dispersion Stability | Light Fastness |
|---|---|---|---|---|---|
| Ex. 203 | D-1 | none | B | B | A |
| Ex. 204 | D-7 | none | B | B | A |
| Ex. 205 | D-20 | none | B | B | A |
| Ex. 206 | D-36 | none | B | B | A |
| Ex. 207 | D-127 | none | B | B | A |
| Ex. 208 | D-222 | none | B | B | A |
| Ex. 209 | D-207 | none | B | B | A |
| Ex. 210 | D-246 | none | B | B | A |
| Comp. Ex. 201 | P.R.254 | none | B | B | C |
| Comp. Ex. 202 | P.Y.74 | none | B | B | C |
| Comp. Ex. 203 | P.Y.155 | none | B | B | C |

The following materials are added to the pigment dispersion 201, and the resulting mixture is further shaken for 30 minutes in the above-described dispersing shaker to prepare a coloring composition 201 for color filter for use in photolithography.

TABLE 5

(Formulation of coloring composition 201 for color filter)

| | |
|---|---|
| pigment dispersion 201 | 15.6 g |
| photo-sensitive resin (CYCLOMER P200; manufactured by Daicel Chemical Industries, Ltd.) | 2.5 g |
| Pentaerythritol tetraacrylate (manufactured by Sigma-Aldrich Corporation) | 0.2 g |
| 2-benzyl-2-dimethylamino-4'-morpholinobutyrophenone (manufactured by Sigma-Aldrich Corporation) | 0.05 g |
| 2,4-diethyl-9H-thioxanthen-9-one (manufactured by Tokyo Chemical Industry Co., Ltd.) | 0.05 g |
| 1,2-propanediol-1-monomethyl ether 2-acetate (manufatctured by Tokyo Chemical Industry Co., Ltd.) | 0.8 g |
| Cyclohexanone (manufatctured by Tokyo Chemical Industry Co., Ltd.) | 0.2 g |

The thus-obtained coloring composition 201 for color filter is applied on a slide glass with a bar-coater Rod No. 10, and the slide glass is dried for 5 minutes in an oven at 80° C. to obtain a coated film of ink.

An appropriate masking is applied on a part of the thus-obtained coated film, and the film is then exposed to a high-pressure mercury lamp with an irradiation condition of 200 mJ/cm$^2$. Thereafter, the film is developed using a 0.5% sodium carbonate aqueous solution at 25° C., and dried for 20 minutes in an oven at 220° C. to obtain a color filter. The optical transmittance of the obtained film is determined with a spectrophotometer (U-3310; manufactured by Hitachi, Ltd.). Also, a wavelength at which the obtained color filter exhibits the lowest transmittance is determined within the wavelength range of 540-610 nm. Results are shown in Table 8.

A coloring composition is prepared in the same manner as in Example 201 except for using the pigment represented by compound D-8 and synthesized in Synthesis Example 2 in place of the pigment used in Example 201. A color filter is prepared by using the thus-obtained coloring composition, and light transmittance is measured. Also, a wavelength at which the obtained color filter exhibits the lowest transmittance is determined within the wavelength range of 540-610 nm. Results are shown in Table 8.

TABLE 6

| | Pigment | Amount of solvent 1 used |
|---|---|---|
| Ex. 201 | D-8 | 5 g |
| Ex. 202 | D-8a | 5 g |

Example 212

When dispersing procedure is conducted in Example 201 by adding 0.5 g of a surfactant (pigment-wetting dispersant BYK-161; manufactured by BYK-Chemie GmbH) as a dispersant for 0.6 g of the pigment, there is obtained a color filter having the same performance as in Example 201 by dispersing for 6 hours.

Examples 213 to 218

When pigment dispersions are prepared in the same manner as in Example 201 using a dispersing shaker (DAS 200; manufactured by LAU Industries) except for using the dispersants shown in Table 4 and changing the amounts thereof used as shown in Table 4, there are respectively obtained color filters having the same performance as in Example 201 by dispersing for 6 hours.

Example 219

The same procedures as in Example 201 are conducted except for using a pigment shown by the compound D-8a synthesized in Synthesis Example 2 to obtain a color filter having the same performance as in Example 201.

TABLE 7

| | Dispersant | Amount of dispersant used |
|---|---|---|
| Ex. 213 | Pigment series additive (SOLSPERSE 22000; manufactured by Zeneca Inc.) | 0.012 g |
| Ex. 214 | Silicone series additive (PAINTAD 32; manufactured by Dow Corning Toray Co., Ltd.) | 0.006 g |
| Ex. 215 | Silicone series additive (PAINTAD 57; manufactured by Dow Corning Toray Co., Ltd.) | 0.0012 g |
| Ex. 216 | Silicone series additive (DK Q8-8011; manufactured by Dow Corning Toray Co., Ltd.) | 0.0012 g |
| Ex. 217 | Surfactant (DISPARLON DA-325; manufactured by Kusumoto Chemicals, Ltd.) | 0.200 g |
| Ex. 218 | Surfactant (DISPARLON DA-1860; manufactured by Kusumoto Chemicals, Ltd.) | 0.120 g |

Comparative Example 201

In absolutely the same manner as in Example 201 except for using C.I. Pigment Red 254 (IRGAPHORE DPP RED; manufactured by BASF SE) in place of the pigment used in Example 201, there is prepared a colored film. Measurement of light transmittance of the thus-obtained film is conducted to determine the wavelength at which the film shows the lowest light transmittance and the light transmittance at 650 nm and at 540 nm. Results are shown in Table 8.

TABLE 8

| | Pigment | Wavelength at which transmittance is the lowest | Transmittance at 650 nm | Transmittance at 540 nm |
|---|---|---|---|---|
| Ex. 201 | D-8 | 571 nm | 93% | 2% |
| Ex. 202 | D-8a | 571 nm | 92% | 2% |
| Comp. Ex. 201 | C.I.P.R.254 | 564 nm | 80% | 8% |

Color filters prepared by using the coloring composition of the invention for color filter containing compounds D-8 and D-8a, respectively, as coloring materials, show a sharp rise in transmittance curve and show a high transmittance in the region of from 650 to 750 nm, thus showing excellent transmittance curves. Further, the color filter of Comparative Example 1 shows a high transmittance at 540 nm, whereas color filters of Examples 201 and 202 show a low transmittance at 540 nm, thus being excellent.

Also, in comparison with the color filter obtained in Comparative Example 201, the color filters prepared by using the coloring compositions of the invention for color filter show an extremely low transmittance for a blue light of 350 to 400 nm, which enables to display red color with high color purity.

That is, the coloring composition of the invention for color filter is useful in that, by selecting the structure of the azo pigment represented by the general formula (1), the wavelength at which transmittance sharply changes can be properly adjusted between about 540 nm and about 590 nm, whereby a red color with an optimal hue can be obtained in accordance with the wavelength of a light source of back light in a display.

[Evaluation of Heat Fastness]

Heat fastness test is conducted using color filters obtained in Examples 201, 202, and Comparative Example 201.

<Method of Testing Heat Fastness>

A color filter is exposed to the atmosphere at 250° C. for 90 minutes, and color difference before and after the exposure ($\Delta E^*_{ab}$) is measured by means of a spectrophotometer (Macbeth Color eye-3000; manufactured by Sakata Inx Eng., Co., Ltd.). Evaluation is conducted according to the following criteria, and the results are shown in Table 9.

<Evaluation Criteria>
A: $\Delta E^*_{ab} < 1.0$
B: $1.0 \leq \Delta E^*_{ab} < 1.1$
C: $1.1 \leq \Delta E^*_{ab}$

TABLE 9

| | Pigment | Results of Heat Fastness Test Color Difference ($\Delta E * ab$) |
|---|---|---|
| Ex. 201 | D-8 | A |
| Ex. 202 | D-8a | A |
| Comp. Ex. 201 | P.R.254 | C |

In comparison with the sample using the pigment of Comparative Example 201, the color filters of Examples 201 and 202 prepared by using the coloring compositions of the invention for color filter respectively containing the azo compounds represented by the general formula (1) as coloring materials show the same or more heat fastness.

(Evaluation)

<Dispersibiity (Average Particle Size)>

Each of the pigment dispersions obtained above are subjected to measurement of volume-average particle size in a conventional manner using a dynamic light-scattering particle size-measuring apparatus (Microtrack UPA150; manufactured by Nikkiso Co., Ltd.). Samples with the volume-average particle size of 50 nm or less are ranked A; samples with the volume-average particle size of from more than 50 nm to 100 nm are ranked B; samples with the volume-average particle size of more than 100 nm are ranked C.

<Evaluation of Light Fastness>

Each of the pigment dispersions obtained above is coated on a photo mat paper ("pigment only") manufactured by Seiko Epson Corporation by using a No. 3 bar coater. Image density of each of the thus-obtained coated products is measured by means of a reflection densitometer (X-Rite 938; manufactured by X-Rite Co.). Each of the coated products of 1.0 in image density is irradiated with xenon light (170000 lux; in the presence of a cut filter which cuts light having a wavelength of 325 nm or less) for 14 days using a fade meter. Image density before and after irradiation with xenon light is measured using the reflection densitometer, and the pigment dispersions are evaluated in terms of colorant maintaining ratio [(density after irradiation/density before irradiation)× 100%].

Samples of 80% or more in a colorant maintaining ratio are ranked A.

Samples of from 60% to less than 80% are ranked B.

Samples of less than 60% are ranked C.

TABLE 10

|  | Pigment | Results of Light Fastness Test Color Difference (ΔE * ab) |
| --- | --- | --- |
| Ex. 201 | D-8 | A |
| Ex. 202 | D-8a | A |
| Comp. Ex. 201 | P.R.254 | C |

In comparison with the samples using the pigments of Comparative Example 201, the color filters of Examples 201 and 202 prepared by using the coloring compositions of the invention for color filter respectively containing the azo compounds represented by the general formula (1) as coloring materials show the same or more light fastness.

(Evaluation of Age-Storage Stability of Dispersion)

Coloring compositions 201 and 202, and comparative coloring composition 1 prepared in Examples 201 and 202 and Comparative Example 1, respectively, are stored in a dark room at room temperature for 2 weeks, and then degree of precipitation of foreign body is visually evaluated according to the following criteria.

<Evaluation Criteria>

A: No precipitation is observed.

B: Slight precipitation is observed.

C: Precipitation is observed.

TABLE 11

|  | Pigment Dispersion | Pigment | Age-storage stability of Dispersion |
| --- | --- | --- | --- |
| Ex. 201 | Coloring composition 201 | D-8 | A |
| Ex. 202 | Coloring composition 202 | D-8a | A |
| Comp. Ex. 201 | Comparative coloring composition 1 | P.R.254 | B |

In comparison with the samples using the pigment of Comparative Example 201, the pigment dispersions 201 and 202 prepared by using the coloring compositions of the invention for color filter respectively containing the azo compounds represented by the general formula (1) as coloring materials do not generate foreign substance with time, thus being excellent in stability of dispersion with time.

Example 220

Preparation of a Green Pigment Dispersion

—Preparation of a Green Pigment Dispersion P1—

A mixture composed of 12.6 parts of a 100/55 (by weight) pigment mixture of C.I. Pigment Green 36 and C.I. Pigment Yellow 139, 5.2 parts of a dispersant of BYK2001 (Disperbyk; manufactured by BYK-Chemie GmbH; solid content: 45.1% by weight), 2.7 parts of a dispersing resin of benzyl methacrylate/methacrylic acid copolymer (acid value: 134 mgKOH/g; Mw=30,000), and 78.3 parts of a solvent of propylene glycol monomethyl ether acetate is mixed and dispersed in a beads mill for 15 hours to obtain a green pigment dispersion P1.

<Preparation of a Red Pigment Dispersion>

—Preparation of a Red Pigment Dispersion P2—

A mixture composed of 12.1 parts of a 100/45 (by weight) pigment mixture of D-8 and C.I. Pigment Yellow 139, 10.4 parts of a dispersant of BYK2001 (Disperbyk; manufactured by BYK-Chemie GmbH; solid content: 45.1% by weight), 3.8 parts of a dispersing resin of benzyl methacrylate/methacrylic acid copolymer (acid value: 134 mgKOH/g; Mw=30,000), and 73.7 parts of a solvent of propylene glycol monomethyl ether acetate is mixed and dispersed in a beads mill for 15 hours to obtain a red pigment dispersion P2.

<Preparation of a Blue Pigment Dispersion>

—Preparation of a Blue Pigment Dispersion P3—

A mixture composed of 14 parts of a 100/25 (by weight) pigment mixture of C.I. Pigment Blue 15:6 and C.I. Pigment Violet 23, 4.7 parts of a dispersant of BYK2001 (Disperbyk; manufactured by BYK-Chemie GmbH; solid content: 45.1% by weight), 3.5 parts of a dispersing resin of benzyl methacrylate/methacrylic acid copolymer (acid value: 134 mgKOH/g; Mw=30,000), and 77.8 parts of a solvent of propylene glycol monomethyl ether acetate is mixed and dispersed in a beads mill for 15 hours to obtain a blue pigment dispersion P3.

<Preparation of Green-Colored Photo-Sensitive Composition (Coating Solution) A-1>

The above-described green pigment dispersion P1 is used, and components of the following formulation are mixed and stirred to prepare a colored photo-sensitive composition A-1.

TABLE 12

| <Formulation> | |
| --- | --- |
| Aforesaid Green pigment dispersion P1 | 83.3 parts |
| Alkali-soluble resin: P-1 | 2.05 parts |
| OXE-01 (photopolymerization initiator; manufactured by BASF SE) | 1.2 parts |
| Monomer 1: KARAYAD DPHA (manufactured by Nippon Kayaku Co., Ltd.) | 1.4 parts |
| Monomer 2: M-305 (manufactured by Toagosei Co., Ltd.) | 1.4 parts |
| p-methoxyphenol | 0.001 part |
| Polyethylene glycol methyl ether acetate [PGMEA (hereinafter, the same abbreviation will be used); solvent] | 7.4 parts |
| Surfactant (trade name: F-781; 0.2% solution of PGMEA; manufactured by DIC Corporation) | 4.2 parts |

<Preparation of Red-Colored Photo-Sensitive Composition (Coating Solution) B-1>

The above-described red pigment dispersion P2 is used, and components of the following formulation are mixed and stirred to prepare a colored photo-sensitive composition B-1.

TABLE 13

| <Formulation> | |
|---|---|
| Aforesaid Red pigment dispersion P2 | 59.6 parts |
| Alkali-soluble resin: P-1 | 1.2 parts |
| OXE-02 (photopolymerization initiator; manufactured by BASF SE) | 0.7 part |
| Monomer 1: KARAYAD DPHA (manufactured by Nippon Kayaku Co., Ltd.) | 1.6 parts |
| Monomer 2: SR-494 (manufactured by Sartomer Company, Inc.) | 1.6 parts |
| p-methoxyphenol | 0.002 part |
| Polyethylene glycol methyl ether acetate [PGMEA (hereinafter, the same abbreviation will be used); solvent] | 31 parts |
| Surfactant (trade name: F-781; 0.2% solution of PGMEA; manufactured by DIC Corporation) | 4.2 parts |

<Preparation of Blue-Colored Photo-Sensitive Composition (Coating Solution) C-1>

The above-described blue pigment dispersion P3 is used, and components of the following formulation are mixed and stirred to prepare a colored photo-sensitive composition C-1.

TABLE 14

| <Formulation> | |
|---|---|
| Aforesaid Blue pigment dispersion P3 | 50.6 parts |
| Alkali-soluble resin: P-1 | 2.1 parts |
| OXE-01 (photopolymerization initiator; manufactured by CIBA Specialty Chemicals) | 1.2 parts |
| Monomer 1: KARAYAD DPHA (manufactured by Nippon Kayaku Co., Ltd.) | 1.2 parts |
| Monomer 2: SR-494 (manufactured by Sartomer Company, Inc.) | 3.5 parts |
| p-methoxyphenol | 0.002 part |
| Polyethylene glycol methyl ether acetate [PGMEA (hereinafter, the same abbreviation will be used); solvent] | 36 parts |
| Surfactant (trade name: F-781; 0.2% solution of PGMEA; manufactured by DIC Corporation) | 4.2 parts |

The green-colored photo-sensitive composition A-1 having been prepared hereinbefore is coated on a silicon wafer on which 8-inch device has been formed and previously sprayed with hexamethyldisilazane, thus a photo-curable coated film being formed. Then, this coated film is subjected to heating treatment (prebake) for 180 seconds using a 100° C. hot plate so that the dry thickness of the coated film becomes 1.0 µm. Subsequently, the film is irradiated through a 1.0-µm square Bayer pattern mask at a wavelength of 365 nm using an i-line stepper exposure apparatus FPA-3000i5+ (manufactured by Canon Inc.) in an irradiation amount of from 50 to 1,000 mJ/cm² (exposure amount being changed stepwise by 50 mJ/cm²). Thereafter, the silicon wafer on which the irradiated coated film is formed is placed on a horizontal rotary table of a spin shower developing machine (model DW-30; manufactured by Chemitronics Co., Ltd.), and paddle development is conducted at 23° C. for 180 seconds using a 40% diluting solution of CD-2000 (manufactured by Fujifilm Electronics Materials Co., Ltd.) to form a colored pattern on the silicon wafer.

The silicon wafer on which the colored pattern is formed is fixed on the aforesaid horizontal rotary table by vacuum-chucking system and, while rotating the silicon wafer at a rotation number of 50 rpm by means of a rotating apparatus, pure water is supplied from above the rotation center through a jet nozzle in a shower state to conduct rinsing treatment, followed by spray drying.

Next, the silicon wafer is heated for 5 minutes on a 200° C. hot plate to obtain a color film on which a pattern is formed.

Further, the same procedures as with Green except for using the above-described Red-colored photo-sensitive composition B-1 and Blue-colored photo-sensitive composition C-1 and exposing through a 1.0-µm square island pattern mask are conducted to thereby form a color filter formed by RGB patterns.

Good spectral characteristics can be confirmed by preparing a camera module using a device wherein this color filter is formed.

Resin: P-1

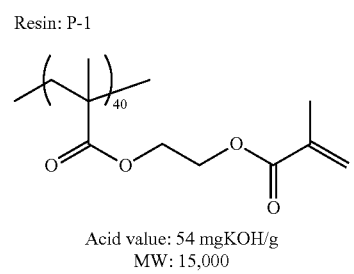

Acid value: 54 mgKOH/g
MW: 15,000

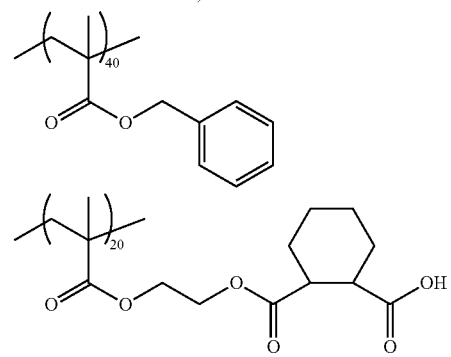

Good spectral characteristics can be confirmed as in Example 5 by preparing a color filter using D-26, D-136, D-209, or D-236 in place of D-1 in Example 212 and preparing a camera module using a device wherein this color filter is formed.

INDUSTRIAL APPLICABILITY

The azo pigments of the invention have high tinctorial strength, excellent coloring characteristics such as hue, and excellent fastness such as light fastness, ozone fastness, and heat fastness.

Further, the pigment dispersion of the invention is a dispersion wherein the azo pigment of the invention is dispersed in various media, and is excellent in coloring characteristics, fastness, ink liquid stability, and dispersion stability.

Also, according to the present invention, there are provided a coloring composition for color filter which has good dispersibility, good dispersion stability with time, heat fastness, and light fastness and which can provide a color filter capable of attaining high contrast required for color liquid crystal displays for various uses and attaining excellent transparency required for camera modules; a color filter; and a process for its preparation.

Although the invention has been described in detail and by reference to specific embodiments, it is apparent to those skilled in the art that it is possible to add various alterations and modifications insofar as the alterations and modifications do not depart from the spirit and the scope of the invention.

This application is based on a Japanese patent application filed on Jan. 15, 2010 (Japanese Patent Application No. 2010-007533), and the contents thereof are incorporated herein by reference.

The invention claimed is:

1. A method for producing an azo pigment represented by the general formula (1), comprising:

preparing a solution comprising a compound represented by the following general formula (2) and an acid; and conducting azo coupling by bringing the solution into contact with a diazonium salt derived from a heterocyclic amine:

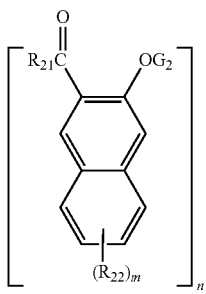
(2)

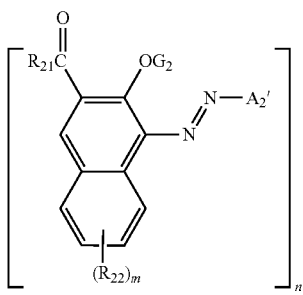
(1)

wherein $G_2$ represents a hydrogen atom, an aliphatic group, an aryl group, or a heterocyclic group;

$R_{21}$ represents an amino group, an aliphatic oxy group, an aliphatic group, an aryl group, or a heterocyclic group;

$R_{22}$ represents a substituent;

$A_2'$ represents the following general formulae (A-1) to (A-18), (A-20) to (A-28), and (A-30) to (A-32);

m represents an integer of from 0 to 5;

n represents an integer of from 1 to 4;

when n=2, the general formulae (1) and (2) each represents a dimer formed through $R_{21}$, $R_{22}$, $G_2$, or $A_2'$;

when n=3, each of the general formulae represents a trimer formed through $R_{21}$, $R_{22}$, $G_2$, or $A_2'$; and when n=4, each of the general formulae represents a tetramer formed through $R_{21}$, $R_{22}$, $G_2$, or $A_2'$:

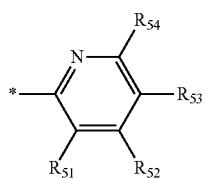
(A-1)

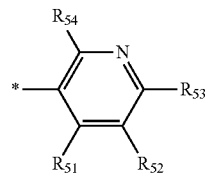
(A-2)

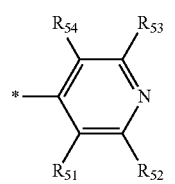
(A-3)

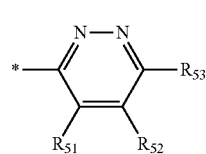
(A-4)

(A-5)

(A-6)

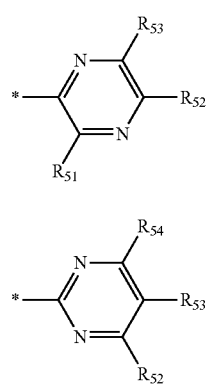
(A-7)

(A-8)

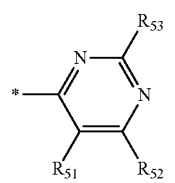
(A-9)

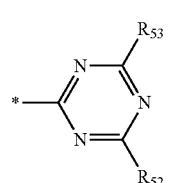

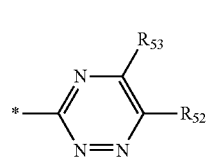
(A-10)

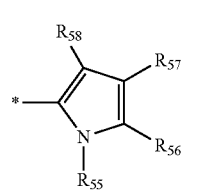

-continued
(A-11) 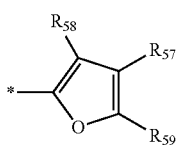
(A-12) 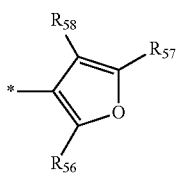
(A-13) 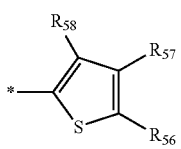
(A-14) 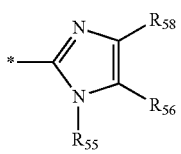
(A-15) 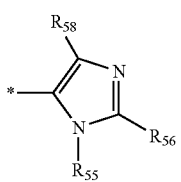
(A-16) 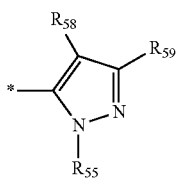
(A-17) 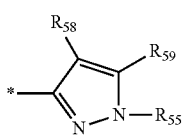
(A-18) 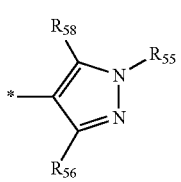
(A-20) 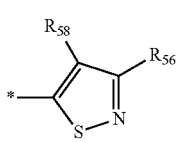
(A-21) 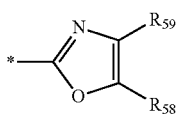
-continued
(A-22) 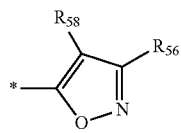
(A-23) 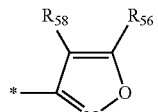
(A-24) 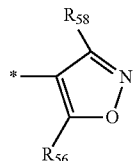
(A-25) 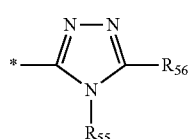
(A-26) 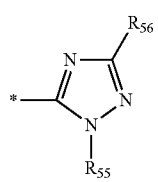
(A-27) 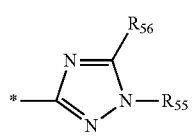
(A-28) 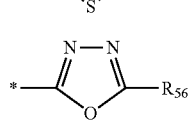
(A-30) 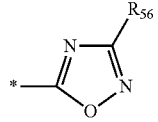
(A-31) 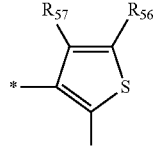
(A-32) 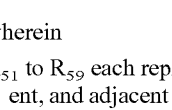
wherein
$R_{51}$ to $R_{59}$ each represents a hydrogen atom or a substituent, and adjacent substituents may be connected to each other to form a 5- or 6-membered ring; and
* shows a site connected to the azo group in the general formula (1).

2. The method for producing an azo pigment according to claim 1,
wherein the compound represented by the formula (1) is a compound represented by the following general formula (1-0):

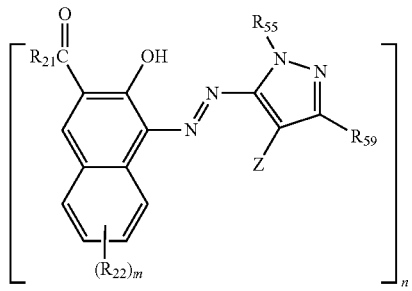

wherein $R_{21}$ represents an amino group, an aliphatic oxy group, an aliphatic group, an aryl group, or a heterocyclic group;

$R_{22}$ represents a substituent m represents an integer of from 0 to 5

Z represents an electron-withdrawing group having a Hammett σp value of 0.2 or more;

$R_{55}$ and $R_{59}$ each represents a hydrogen atom or a substituent;

n represents an integer of from 1 to 4;

when n=2, the general formula (I-0) represents a dimer formed through $R_{21}$, $R_{22}$, $R_{55}$, $R_{59}$, or Z;

when n=3, the general formula represents a trimer formed through $R_{21}$, $R_{22}$, $R_{55}$, $R_{59}$, or Z; and when n=4, the general formula represents a tetramer formed through $R_{21}$, $R_{22}$, $R_{55}$, $R_{59}$, or Z.

3. The method for producing an azo pigment according to claim 1,
wherein the diazonium salt derived from the heterocyclic amine is a compound represented by the following formula (7),
the compound represented by the general formula (2) is a compound represented by the following formula (8), and
the compound represented by the general formula (1) is a compound represented by the following formula (9):

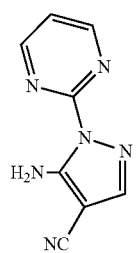

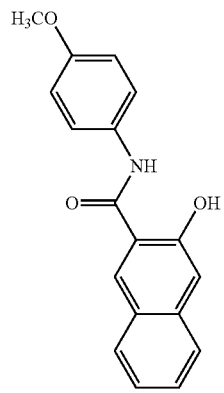

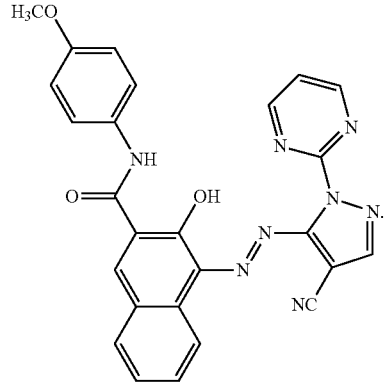

4. The method for producing an azo pigment according to claim 3, wherein the azo pigment represented by the general formula (9) has characteristic peaks at Bragg angles (2θ±0.5°) of 7.1°, 25.3°, 26.0°, and 27.2 in X-ray diffraction with characteristic Cu Kα line.

5. The method for producing an azo pigment according to claim 1,
wherein the solution containing a compound represented by the general formula (2) and an acid, further contains a compound represented by the general formula (3a):

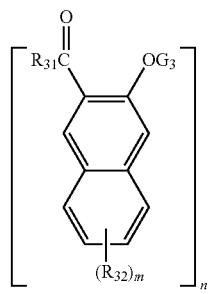

wherein $G_3$ represents a hydrogen atom, an aliphatic group, an aryl group, or a heterocyclic group;

$R_{31}$ represents an amino group, an aliphatic oxy group, an aliphatic group, an aryl group, or a heterocyclic group;

$R_{32}$ represents a substituent;

m represents an integer of from 0 to 5;

n represents an integer of from 1 to 4;

when n=2, the general formula (3a) represents a dimer formed through $R_{31}$, $R_{32}$, or $G_3$;

when n=3, the general formula represents a trimer formed through $R_{31}$, $R_{32}$, or $G_3$; and when n=4, the general formula represents a tetramer formed through $R_{31}$, $R_{32}$, or $G_3$.

6. The method for producing an azo pigment according to claim 5, wherein the compound represented by the general formula (3a) is a compound represented by the general formula (3b):

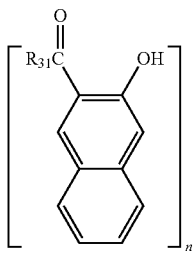

(3b)

wherein $R_{31}$ represents an amino group, an aliphatic oxy group, an aliphatic group, an aryl group, or a heterocyclic group;

n represents an integer of from 1 to 4;

when n=2, the general formula (3b) represents a dimer formed through $R_{31}$;

when n=3, the general formula represents a trimer formed through $R_{31}$; and when n=4, the general formula represents a tetramer formed through $R_{31}$.

7. The method for producing an azo pigment according to claim 5, wherein the content of the compound represented by the general formula (3 a) is from 1% by weight to 30% by weight, based on the weight of the compound represented by the general formula (2).

8. The method for producing an azo pigment according to claim 1, wherein the acid is at least one member selected from among phosphoric acid, acetic acid, methanesulfonic acid, and sulfuric acid.

9. A pigment dispersion comprising an azo pigment or the tautomer thereof, produced by the method according to claim 1.

10. A coloring composition comprising a pigment dispersion according to claim 9.

11. An ink for inkjet recording comprising the coloring composition according to claim 10.

12. A coloring composition for color filter comprising the coloring composition according to claim 10.

13. A color filter produced by using the coloring composition for color filter according to claim 12.

14. The method for producing an azo pigment according to claim 6, wherein the content of the compound represented by the general formula (3b) is from 1% by weight to 30% by weight, based on the weight of the compound represented by the general formula (2).

* * * * *